US012664747B2

(12) United States Patent
Lortie et al.

(10) Patent No.: US 12,664,747 B2
(45) Date of Patent: Jun. 23, 2026

(54) DEVICES, METHODS, AND GRAPHICAL USER INTERFACES FOR INTERACTING WITH VIRTUAL OBJECTS

(71) Applicant: Apple Inc., Cupertino, CA (US)

(72) Inventors: Chase B. Lortie, San Francisco, CA (US); Daniel J. Brewer, Redwood City, CA (US); Julian K. Shutzberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 68 days.

(21) Appl. No.: 18/780,399

(22) Filed: Jul. 22, 2024

(65) Prior Publication Data

US 2025/0029350 A1     Jan. 23, 2025

Related U.S. Application Data

(60) Provisional application No. 63/528,399, filed on Jul. 23, 2023.

(51) Int. Cl.
| | | |
|---|---|---|
| *G06T 19/20* | (2011.01) | |
| *G06F 3/01* | (2006.01) | |
| *G06T 13/40* | (2011.01) | |

(52) U.S. Cl.
CPC .............. *G06T 19/20* (2013.01); *G06F 3/013* (2013.01); *G06T 13/40* (2013.01); *G06T 2219/2004* (2013.01)

(58) Field of Classification Search
CPC . G06T 19/20; G06T 13/40; G06T 2219/2004; G06F 3/013
See application file for complete search history.

(56) References Cited

U.S. PATENT DOCUMENTS

| | | |
|---|---|---|
| 2016/0004408 A1 | 1/2016 | Yun |
| 2016/0048215 A1 | 2/2016 | Shin et al. |
| 2019/0011703 A1 | 1/2019 | Robaina et al. |
| 2022/0374085 A1 | 11/2022 | Nguyen et al. |
| 2023/0074476 A1 | 3/2023 | Bae et al. |
| 2024/0061513 A1 | 2/2024 | Reisman et al. |
| 2024/0370093 A1 | 11/2024 | Nie et al. |
| 2024/0402901 A1 | 12/2024 | Krivoruchko et al. |

OTHER PUBLICATIONS

"Accessibility by design: An Apple Watch for everyone", Available Online at: https://developer.apple.com/videos/play/wwdc2021/10308/, Jun. 10, 2021, 2 pages.
Applicant-Initiated Interview Summary received for U.S. Appl. No. 18/499,970, mailed on Feb. 25, 2025, 4 pages.
Applicant-Initiated Interview Summary received for U.S. Appl. No. 18/499,970, mailed on May 30, 2025, 4 pages.
Applicant-Initiated Interview Summary received for U.S. Appl. No. 18/499,970, mailed on Sep. 18, 2024, 3 pages.
Final Office Action received for U.S. Appl. No. 18/499,970, mailed on Aug. 5, 2025, 10 pages.
Final Office Action received for U.S. Appl. No. 18/499,970, mailed on Dec. 23, 2024, 8 pages.

(Continued)

*Primary Examiner* — Xin Sheng

(74) *Attorney, Agent, or Firm* — YHE Law LLP

(57) ABSTRACT

Techniques and user interfaces for interacting with virtual objects in an extended reality environment.

65 Claims, 35 Drawing Sheets

(56)           References Cited

OTHER PUBLICATIONS

International Preliminary Report on Patentability received for PCT Patent Application No. PCT/US2024/020743, mailed on Jul. 29, 2025, 15 pages.
International Search Report and Written Opinion received for PCT Patent Application No. PCT/US2024/020743, mailed on Jul. 16, 2024, 19 pages.
Non-Final Office Action received for U.S. Appl. No. 18/499,970, mailed on Aug. 13, 2024, 8 pages.
Non-Final Office Action received for U.S. Appl. No. 18/499,970, mailed on Mar. 14, 2025, 7 pages.
Written Opinion received for PCT Patent Application No. PCT/US2024/020743, mailed on Apr. 1, 2025, 14 pages.

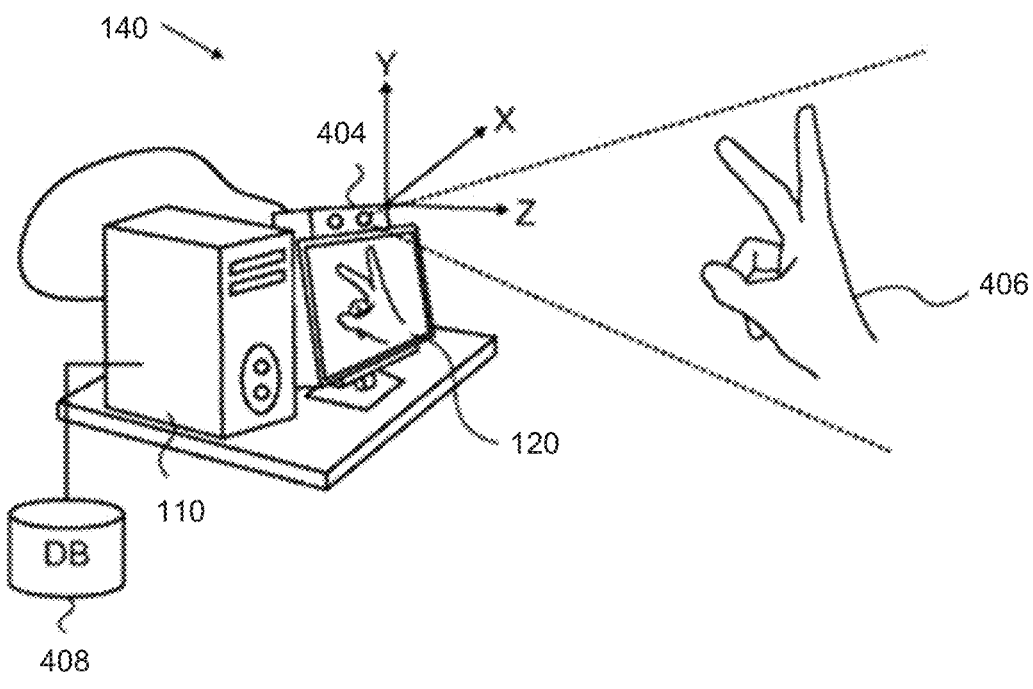
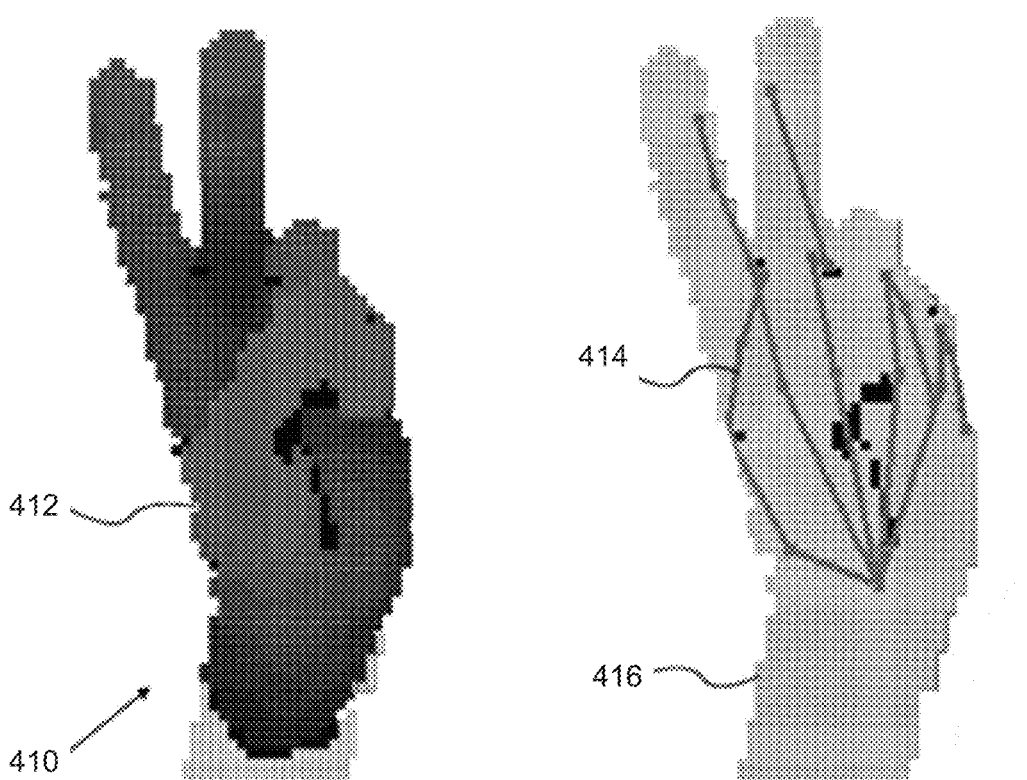
*FIG. 4*

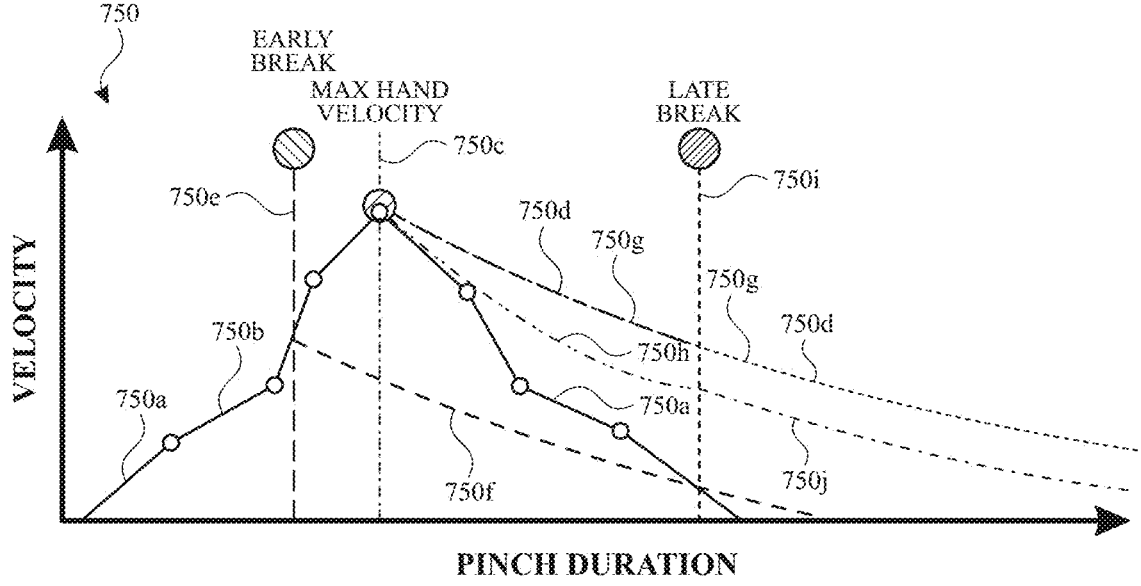
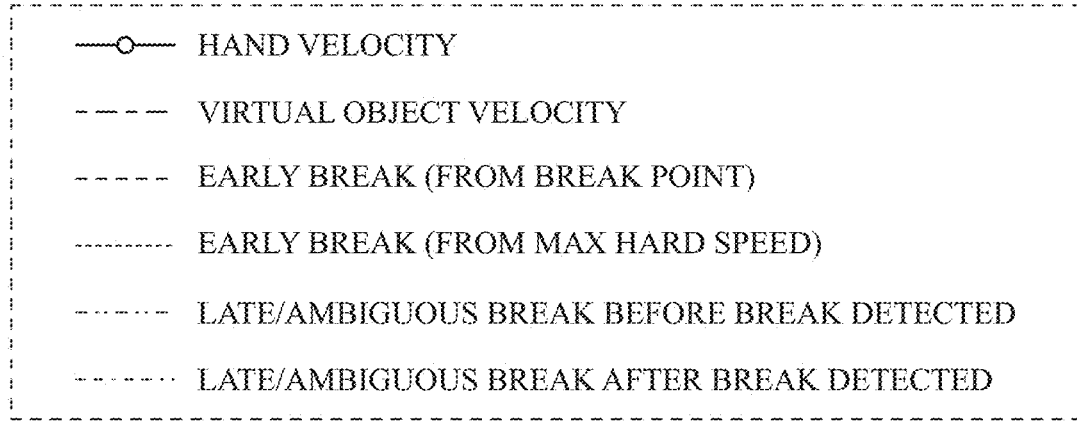
*FIG. 7A*

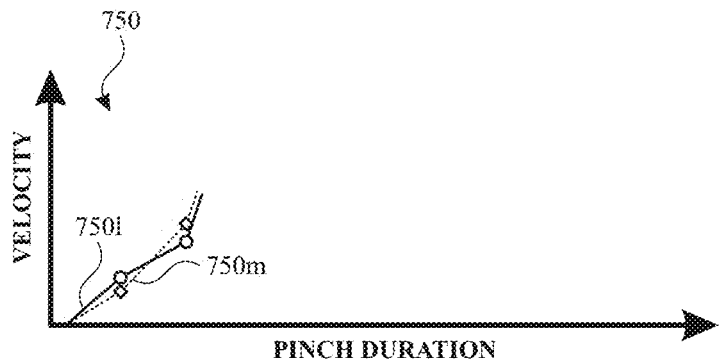
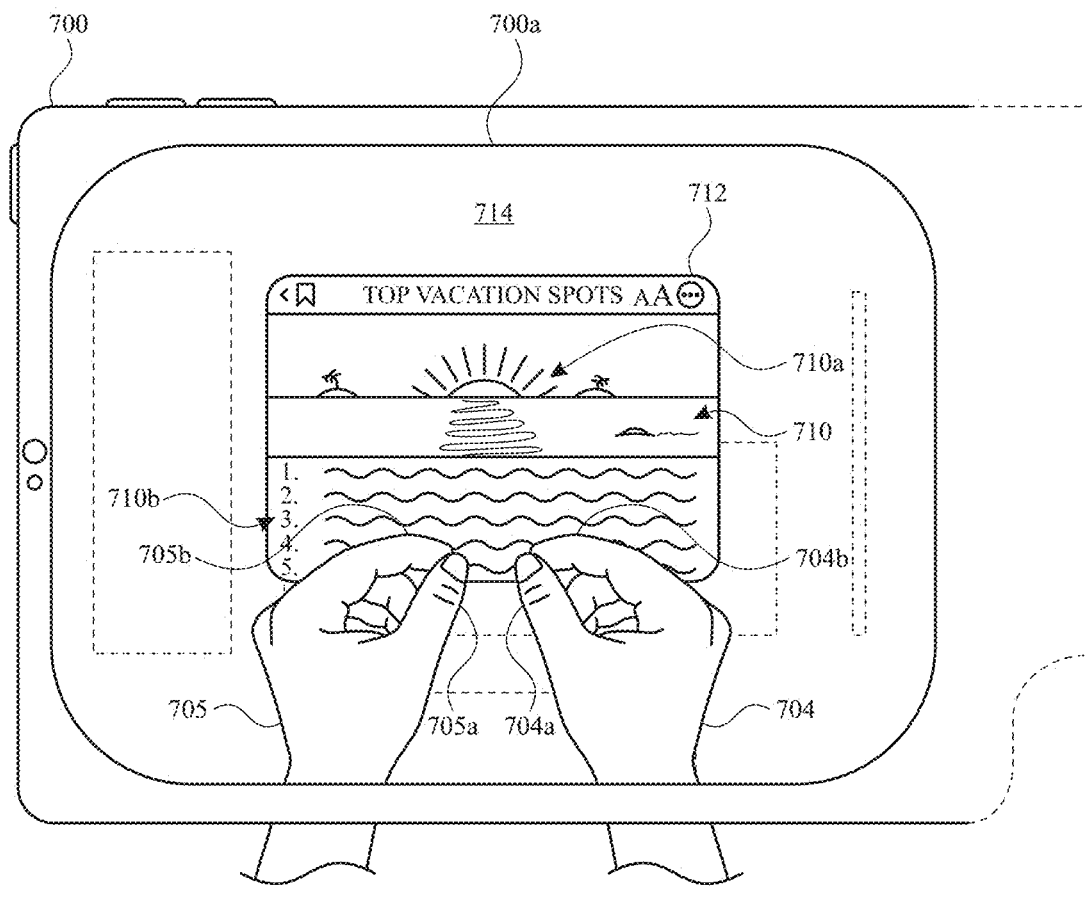
*FIG. 7M*

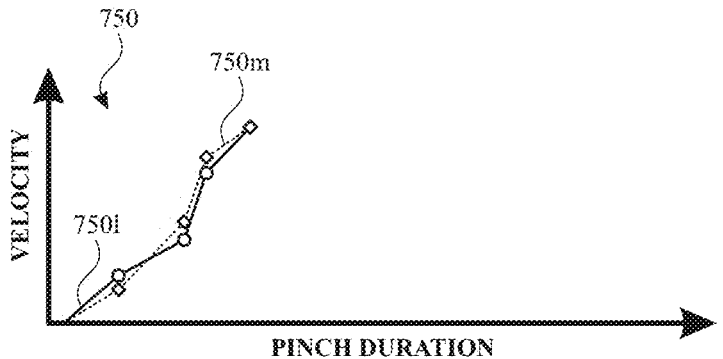
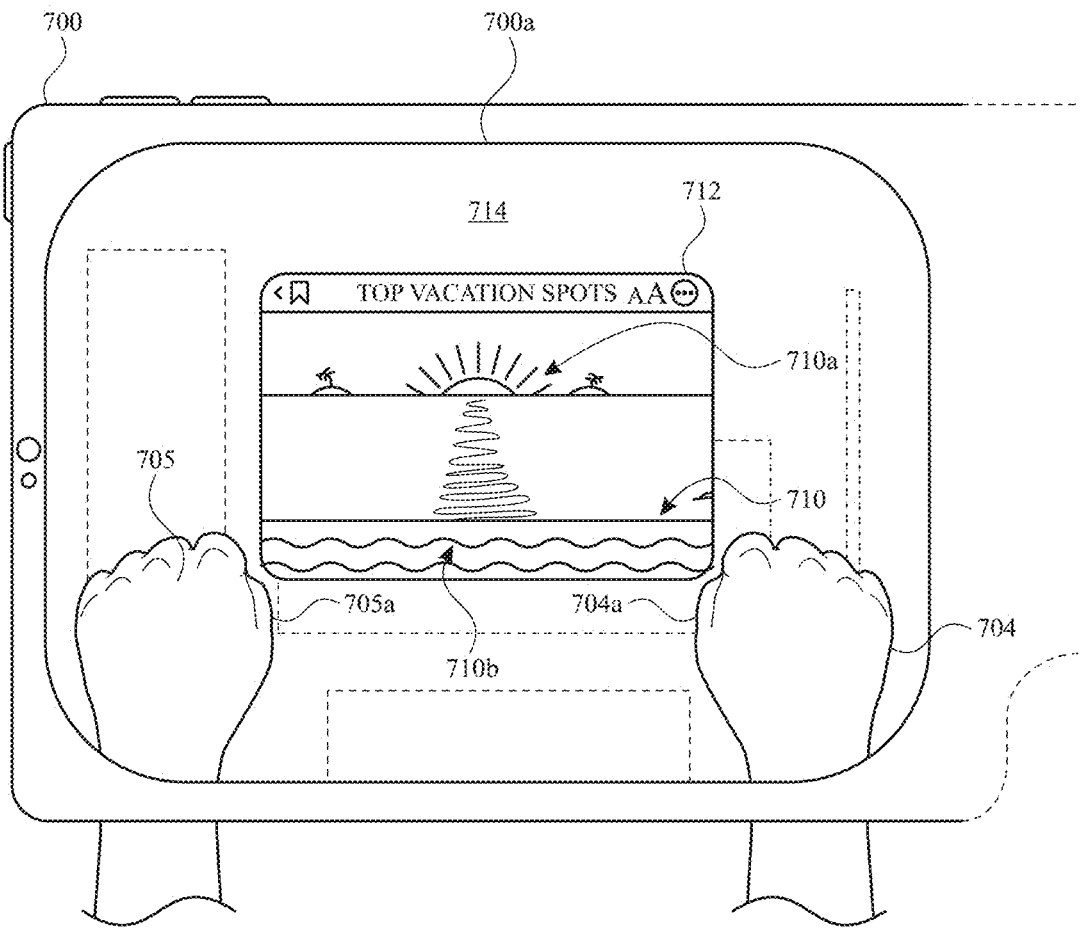
*FIG. 7N*

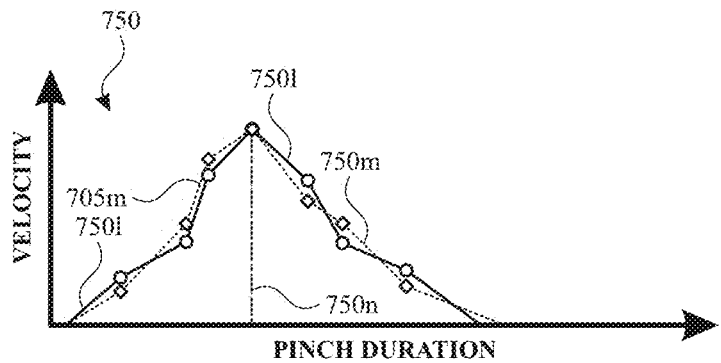
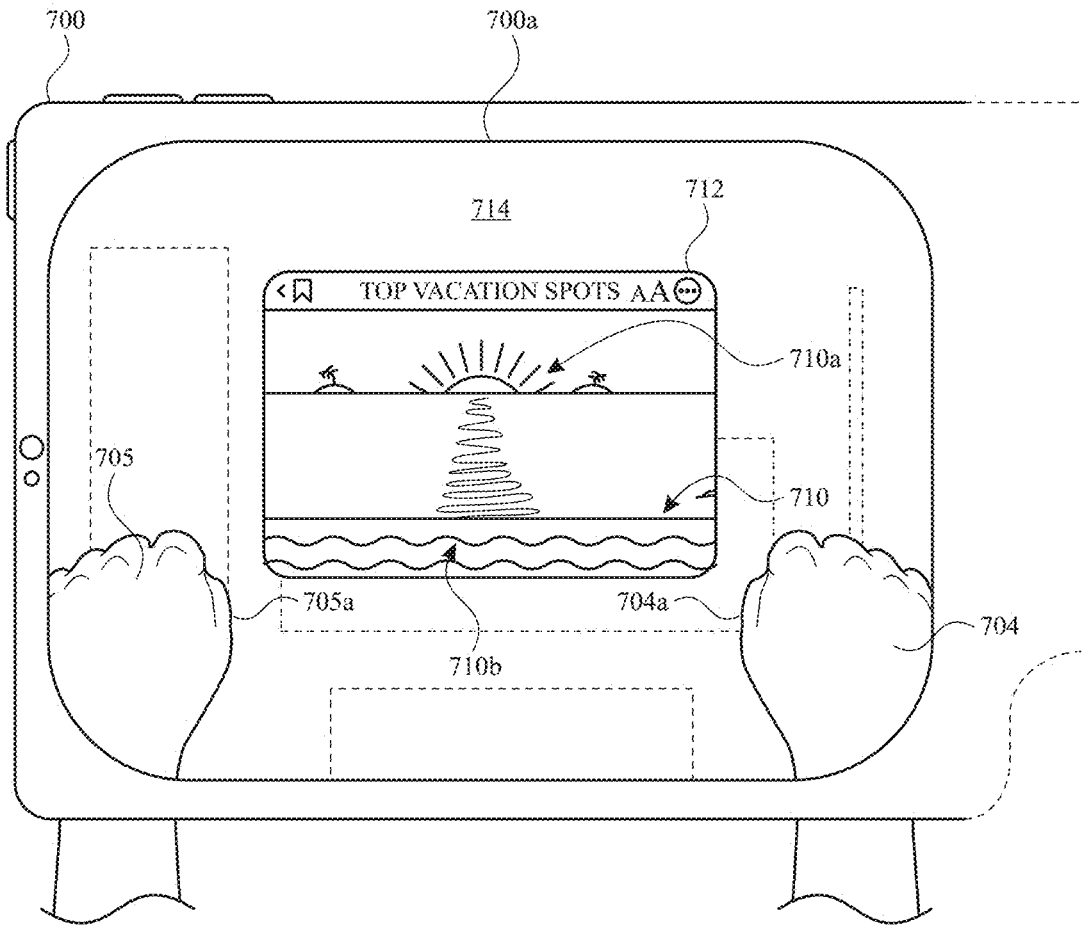
*FIG. 70*

800

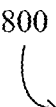

---

802
While detecting, via the one or more input devices, user interaction with a virtual object displayed via the display generation component, where the user interaction includes first movement of an input element, detect, via the one or more input devices, second movement of the input element, where the second movement of the input element is a continuation of the first movement of the input element.

---

804
In response to detecting the second movement of the input element:

---

806
In accordance with a determination that a change in the user interaction that corresponds to an ambiguous input-end event was detected prior to detecting the second movement of the input element, update an appearance of the virtual object with a first appearance update, where the first appearance update is based on at least a portion of the first movement of the input element that occurred before the ambiguous input-end event was detected.

---

808
In accordance with a determination that the user interaction corresponding to the virtual object was continuous during the first movement of the input element and during the second movement of the input element, update the appearance of the virtual object with a second appearance update that is based on at least a portion of the second movement of the input element, where the second appearance update is different from the first appearance update.

DEVICES, METHODS, AND GRAPHICAL USER INTERFACES FOR INTERACTING WITH VIRTUAL OBJECTS

CROSS-REFERENCE TO RELATED APPLICATIONS

This application claims priority to U.S. Provisional Patent Application Ser. No. 63/528,399, entitled "DEVICES, METHODS, AND GRAPHICAL USER INTERFACES FOR INTERACTING WITH VIRTUAL OBJECTS," filed on Jul. 23, 2023. The content of which is hereby incorporated by reference in its entirety.

TECHNICAL FIELD

The present disclosure relates generally to computer systems that are in communication with a display generation component and one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touchscreen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for interacting with virtual objects of an environment more efficient and intuitive for a user. Such methods and interfaces optionally complement or replace conventional methods for interacting with virtual objects. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has (e.g., includes or is in communication with) a display generation component (e.g., a display device such as a head-mounted display (HMD), a display, a projector, a touch-sensitive display (also known as a "touch screen" or "touch-screen display"), or other device or component that presents visual content to a user, for example on or in the display generation component itself or produced from the display generation component and visible elsewhere). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with virtual objects. Such methods and interfaces may complement or replace conventional methods for interacting with virtual objects. Such methods and interfaces provide a more seamless user experience, reduce the number, extent, and/or the nature of the inputs from a user, and produce a more efficient human-machine interface. For battery-operated computing devices, such methods and interfaces conserve power and increase the time between battery charges.

In accordance with some embodiments, a method is described. The method comprises: at a computer system that is in communication with a display generation component and one or more input devices: while detecting, via the one or more input devices, user interaction with a virtual object displayed via the display generation component, wherein the user interaction includes first movement of an input element, detecting, via the one or more input devices, second movement of the input element, wherein the second movement of the input element is a continuation of the first movement of the input element; and in response to detecting the second movement of the input element: in accordance with a determination that a change in the user interaction that corresponds to an ambiguous input-end event was detected prior to detecting the second movement of the input element, updating an appearance of the virtual object with a first appearance update, wherein the first appearance update is based on at least a portion of the first movement of the input element that occurred before the ambiguous input-end event was detected; and in accordance with a determination that the user interaction corresponding to the virtual object was continuous during the first movement of the input element and during the second movement of the input element, updating the appearance of the virtual object with a second appearance update that is based on at least a portion of the second movement of the input element, wherein the second appearance update is different from the first appearance update.

In accordance with some embodiments, a non-transitory computer-readable storage medium is described. The non-transitory computer-readable storage medium stores one or more programs configured to be executed by one or more processors of a computer system that is in communication with a display generation component and one or more input devices. The one or more programs include instructions for: while detecting, via the one or more input devices, user interaction with a virtual object displayed via the display generation component, wherein the user interaction includes first movement of an input element, detecting, via the one or more input devices, second movement of the input element, wherein the second movement of the input element is a continuation of the first movement of the input element; and in response to detecting the second movement of the input element: in accordance with a determination that a change in the user interaction that corresponds to an ambiguous input-end event was detected prior to detecting the second movement of the input element, updating an appearance of the virtual object with a first appearance update, wherein the first appearance update is based on at least a portion of the first movement of the input element that occurred before the ambiguous input-end event was detected; and in accordance with a determination that the user interaction corresponding to the virtual object was continuous during the first movement of the input element and during the second movement of the input element, updating the appearance of the virtual object with a second appearance update that is based on at least a portion of the second movement of the input element, wherein the second appearance update is different from the first appearance update.

In accordance with some embodiments, a transitory computer-readable storage medium is described. The transitory computer-readable storage medium stores one or more programs configured to be executed by one or more processors of a computer system that is in communication with a display generation component and one or more input devices. The one or more programs include instructions for: while detecting, via the one or more input devices, user interaction with a virtual object displayed via the display generation component, wherein the user interaction includes first movement of an input element, detecting, via the one or more input devices, second movement of the input element, wherein the second movement of the input element is a continuation of the first movement of the input element; and in response to detecting the second movement of the input element: in accordance with a determination that a change in the user interaction that corresponds to an ambiguous input-end event was detected prior to detecting the second movement of the input element, updating an appearance of the virtual object with a first appearance update, wherein the first appearance update is based on at least a portion of the first movement of the input element that occurred before the ambiguous input-end event was detected; and in accordance with a determination that the user interaction corresponding to the virtual object was continuous during the first movement of the input element and during the second movement of the input element, updating the appearance of the virtual object with a second appearance update that is based on at least a portion of the second movement of the input element, wherein the second appearance update is different from the first appearance update.

In accordance with some embodiments, a computer system configured to communicate with a display generation component and one or more input devices is described. The computer system comprises: one or more processors; and memory storing one or more programs configured to be executed by the one or more processors. The one or more programs include instructions for: while detecting, via the one or more input devices, user interaction with a virtual object displayed via the display generation component, wherein the user interaction includes first movement of an input element, detecting, via the one or more input devices, second movement of the input element, wherein the second movement of the input element is a continuation of the first movement of the input element; and in response to detecting the second movement of the input element: in accordance with a determination that a change in the user interaction that corresponds to an ambiguous input-end event was detected prior to detecting the second movement of the input element, updating an appearance of the virtual object with a first appearance update, wherein the first appearance update is based on at least a portion of the first movement of the input element that occurred before the ambiguous input-end event was detected; and in accordance with a determination that the user interaction corresponding to the virtual object was continuous during the first movement of the input element and during the second movement of the input element, updating the appearance of the virtual object with a second appearance update that is based on at least a portion of the second movement of the input element, wherein the second appearance update is different from the first appearance update.

In accordance with some embodiments, a computer system configured to communicate with a display generation component and one or more input devices is described. The computer system comprises: means for, while detecting, via the one or more input devices, user interaction with a virtual object displayed via the display generation component, wherein the user interaction includes first movement of an input element, detecting, via the one or more input devices, second movement of the input element, wherein the second movement of the input element is a continuation of the first movement of the input element; and means for, in response to detecting the second movement of the input element: in accordance with a determination that a change in the user interaction that corresponds to an ambiguous input-end event was detected prior to detecting the second movement of the input element, updating an appearance of the virtual object with a first appearance update, wherein the first appearance update is based on at least a portion of the first movement of the input element that occurred before the ambiguous input-end event was detected; and in accordance with a determination that the user interaction corresponding to the virtual object was continuous during the first movement of the input element and during the second movement of the input element, updating the appearance of the virtual object with a second appearance update that is based on at least a portion of the second movement of the input element, wherein the second appearance update is different from the first appearance update.

In accordance with some embodiments, a computer program product is described. The computer program product comprises one or more programs configured to be executed by one or more processors of a computer system that is in communication with a display generation component and one or more input devices. The one or more programs include instructions for: while detecting, via the one or more input devices, user interaction with a virtual object displayed via the display generation component, wherein the user interaction includes first movement of an input element, detecting, via the one or more input devices, second movement of the input element, wherein the second movement of the input element is a continuation of the first movement of the input element; and in response to detecting the second movement of the input element: in accordance with a determination that a change in the user interaction that corresponds to an ambiguous input-end event was detected prior to detecting the second movement of the input element, updating an appearance of the virtual object with a first appearance update, wherein the first appearance update is based on at least a portion of the first movement of the input element that occurred before the ambiguous input-end event was detected; and in accordance with a determination that the user interaction corresponding to the virtual object was continuous during the first movement of the input element and during the second movement of the input element, updating the appearance of the virtual object with a second appearance update that is based on at least a portion of the second movement of the input element, wherein the second appearance update is different from the first appearance update.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIG. 8 is a flow diagram of methods of interacting with virtual objects, in accordance with some embodiments.

DESCRIPTION OF EMBODIMENTS

Figure 1A:
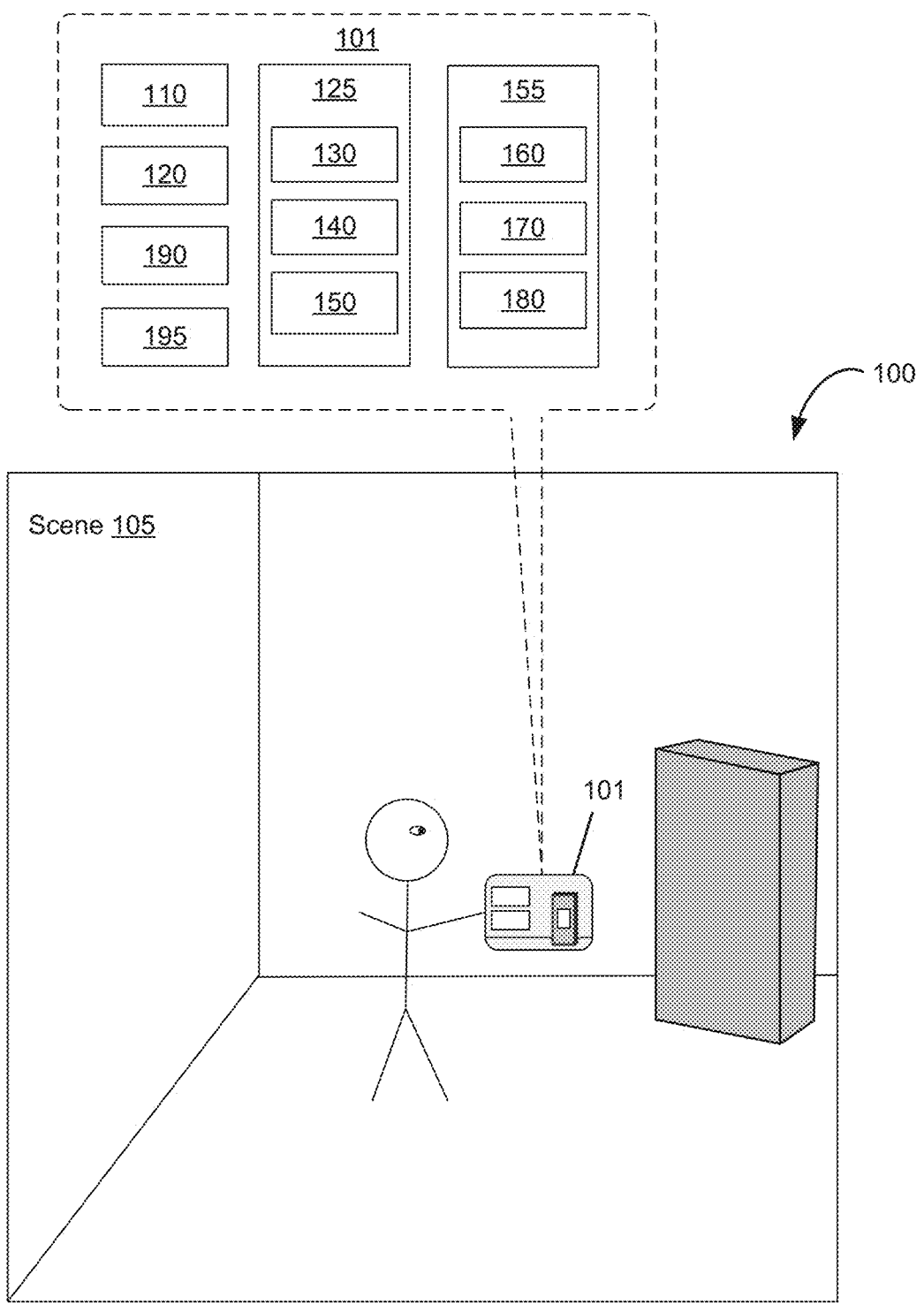
FIG. 1A is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system updates an appearance of a virtual object during user interaction with the virtual object. For instance, the computer system detects user interaction with the virtual object, where the user interaction includes first and second movements of an input element, such as a body part of a user of the computer system. The computer system updates, modifies, moves, and/or otherwise changes an appearance of the virtual object based on detected changes of the user interaction. As one example, when the computer system detects a change in the user interaction that corresponds to an ambiguous input-end event prior to the second movement of the user interaction, the computer system updates an appearance of the virtual object with a first appearance update that is based on at least a portion of the first movement of the user interaction. In some embodiments, the first appearance update includes causing movement of the virtual object with simulated momentum, where the movement of the virtual object with simulated momentum begins at a time corresponding to the ambiguous input-end event and/or a maximum velocity of movement of the user interaction. In some embodiments, the first appearance update includes causing movement of the virtual object to come to a stop. As another example, when the computer system detects that the user interaction with the virtual object was continuous during the first movement of the user interaction and the second movement of the user interaction, the computer system updates the appearance of the virtual object with a second appearance update, different from the first appearance update, based on at least a portion of the second movement. In some embodiments, the second appearance update includes causing movement of the virtual object to increase or slow down. In some embodiments, the second appearance update includes causing movement of the virtual object with simulated momentum.

FIGS. 1A-6 provide a description of example computer systems for providing XR experiences to users. FIGS. 7A-7O illustrate example techniques for interacting with virtual objects, in some embodiments. FIG. 8 is a flow diagram of methods of interacting with virtual objects, in some embodiments. The user interfaces in FIGS. 7A-7O are used to illustrate the processes in FIG. 8.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques.

These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted display (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location and direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head-mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head-mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, or 50 cm) of the point of reference in one or more dimensions (e.g., up/down, left/right, and/or forward/backward relative to the position of the point of reference).

In some embodiments, spatial media includes spatial visual media and/or spatial audio. In some embodiments, a spatial capture is a capture of spatial media. In some embodiments, spatial visual media (also referred to as stereoscopic media) (e.g., a spatial image and/or a spatial video) is media that includes two different images or sets of images, representing two perspectives of the same or overlapping fields-of-view, for concurrent display. A first image representing a first perspective is presented to a first eye of the viewer and a second image representing a second perspective, different from the first perspective, is concurrently presented to a second eye of the viewer. The first image and the second image have the same or overlapping fields-of-view. In some embodiments, a computer system displays the first image via a first display that is positioned for viewing by the first eye of the viewer and concurrently displays the second image via a second display, different from the first display, that is position for viewing by the second eye of the viewer. In some embodiments, the first image and the second image, when viewed together, create a depth effect and provide the viewer with depth perception for the contents of the images. In some embodiments, a first video representing a first perspective is presented to a first eye of the viewer and a second video representing a second perspective, different from the first perspective, is concurrently presented to a second eye of the viewer. The first video and the second video have the same or overlapping fields-of-view. In some embodiments, the first video and the second video, when viewed together, create a depth effect and provide the viewer with depth perception for the contents of the videos. In some embodiments, spatial audio experiences in headphones are produced by manipulating sounds in the headphone's two audio channels (e.g., left and right) so that they resemble directional sounds arriving in the car-canal. For example, the headphones can reproduce a spatial audio signal that simulates a soundscape around the listener (also referred to as the user). An effective spatial sound reproduction can render sounds such that the listener perceives the sound as coming from a location within the soundscape external to the listener's head, just as the listener would experience the sound if encountered in the real world.

The geometry of the listener's ear, and in particular the outer ear (pinna), has a significant effect on the sound that arrives from a sound source to a listener's eardrum. The spatial audio sound experience is possible by taking into account the effect of the listener's pinna, the listener's head, and/or the listener's torso to the sound that enters to the listener's ear-canal. The geometry of the user's ear is optionally determined by using a three-dimensional scanning device that produces a three-dimensional model of at least a portion of the visible parts of the user's ear. This geometry is optionally used to produce a filter for producing the spatial audio experience. In some embodiments, spatial audio is audio that has been filtered such that a listener of the audio perceives the audio as coming from one or more directions and/or locations in three-dimensional space (e.g., from above, below, and/or in front of the listener).

An example of such a filter is a Head-Related Transfer Function (HRTF) filter. These filters are used to provide an effect that is similar to how a human car, head, and torso filter sounds. When the geometry of the cars of a listener is known, a personalized filter (e.g., a personalized HRTF filter) can be produced so that the sound experienced by that listener through headphones (e.g., in-ear headphones, on-ear headphones, and/or over-car headphones) is more realistic. In some embodiments, two filters are produced—one filter per ear—so that each car of the listener has a corresponding personalized filter (e.g., personalized HRTF filter), as the cars of the listener may be of different geometry.

In some embodiments, a HRTF filter includes some (or all) acoustic information required to describe how sound reflects or diffracts around a listener's head before entering the listener's auditory system. In some embodiments, a personalized HRTF filter can be selected from a database of previously determined HRTFs for users having similar anatomical characteristics. In some embodiments, a personalized HRTF filter can be generated by numerical modeling based on the geometry of the listener's ear. One or more processors of the computer system optionally apply the personalized HRTF filter for the listener to an audio input signal to generate a spatial input signal for playback by headphones that are connected (e.g., wirelessly or by wire) to the computer system.

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3A. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
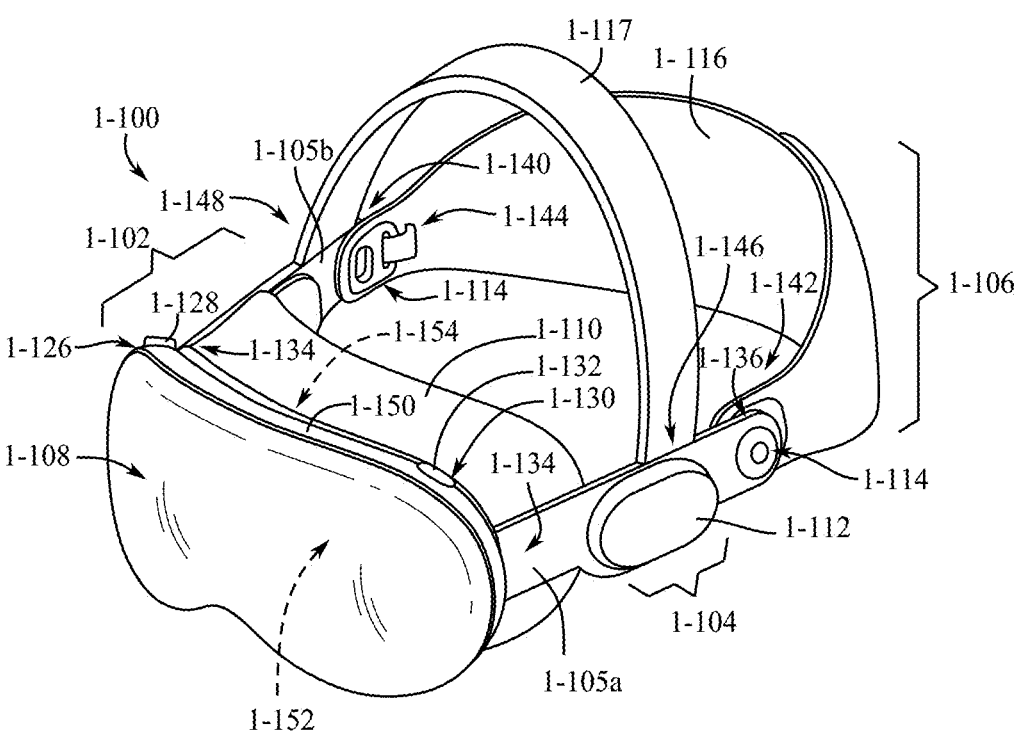
FIGS. 1B-1P are examples of a computer system for providing XR experiences in the operating environment of FIG. 1A.
Figure 1C:
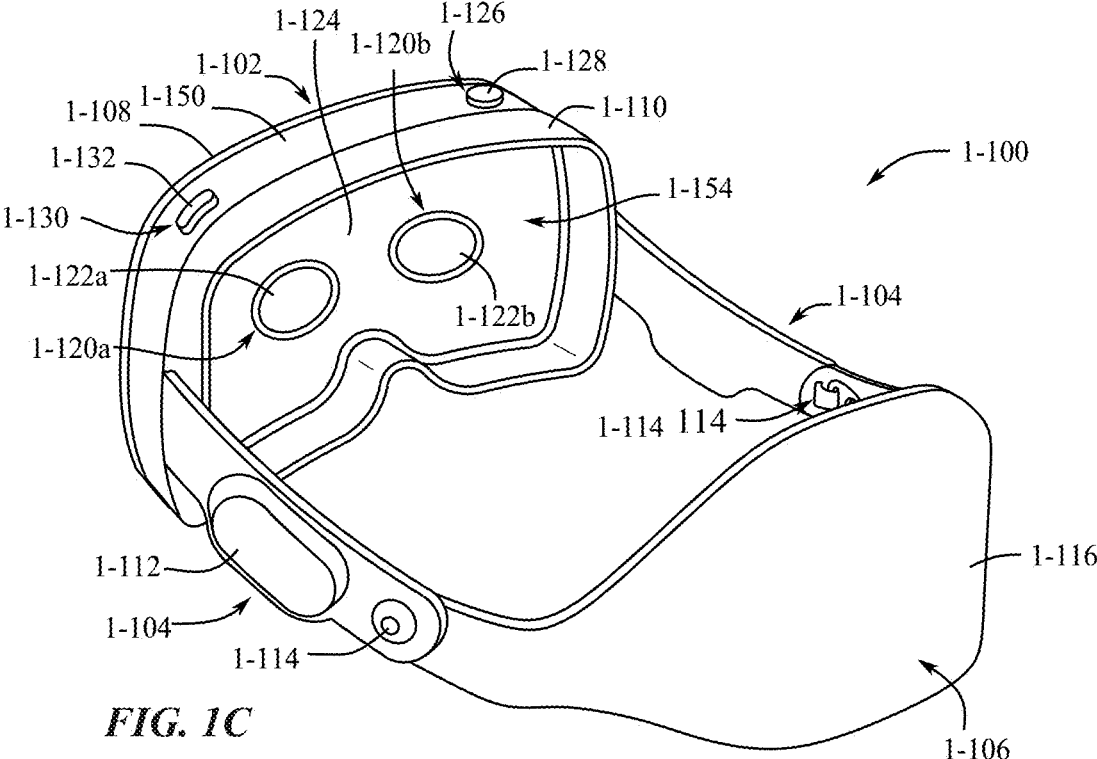
Figure 1D:
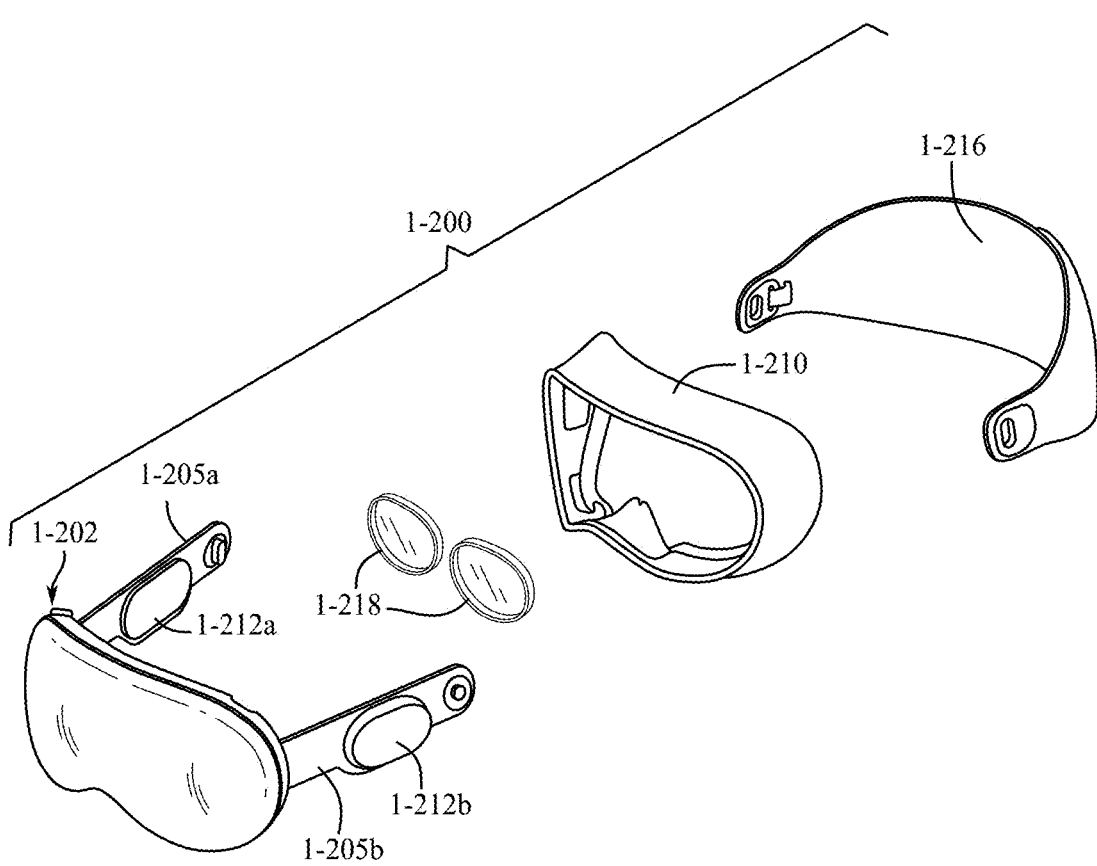
Figure 1E:
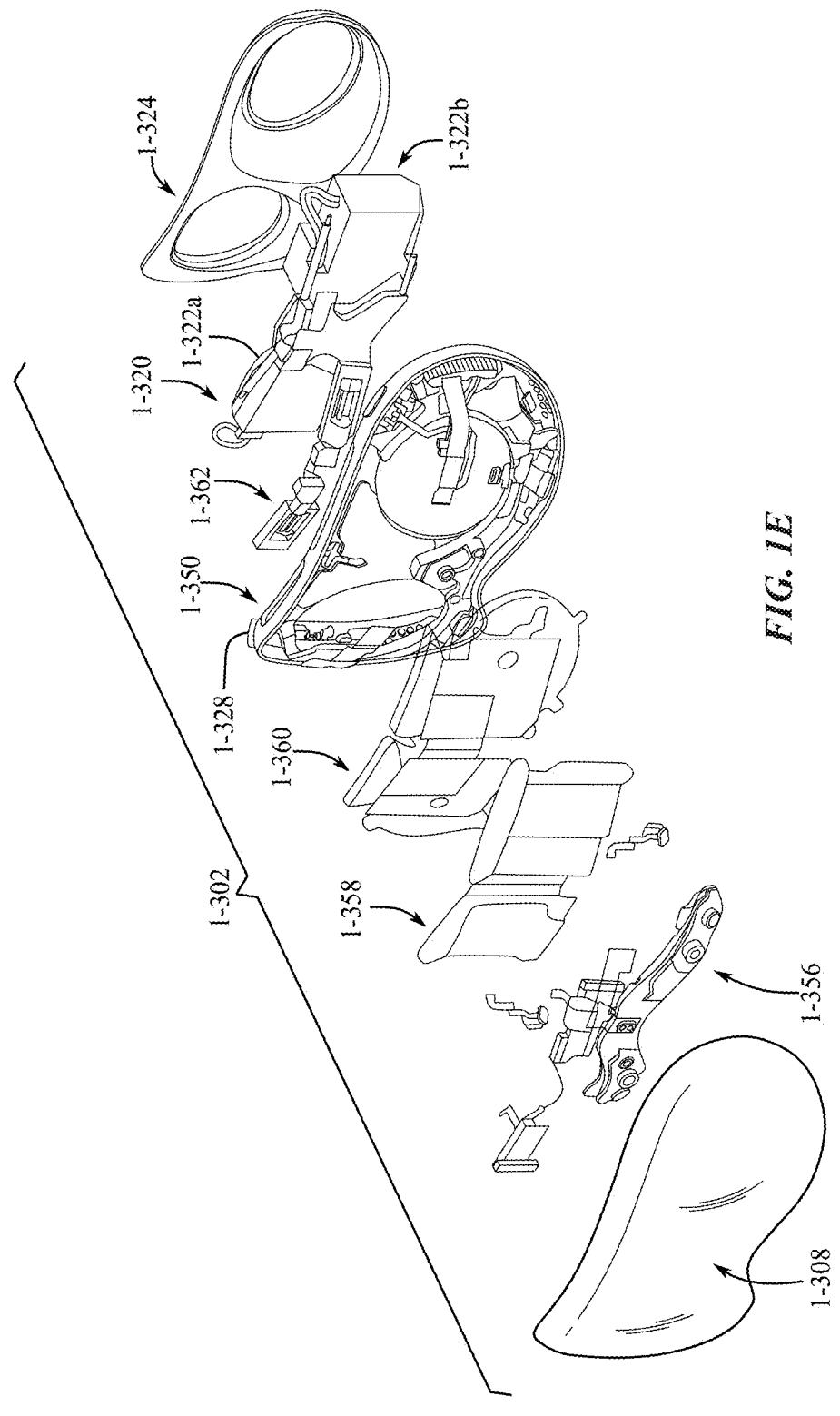
Figure 1F:
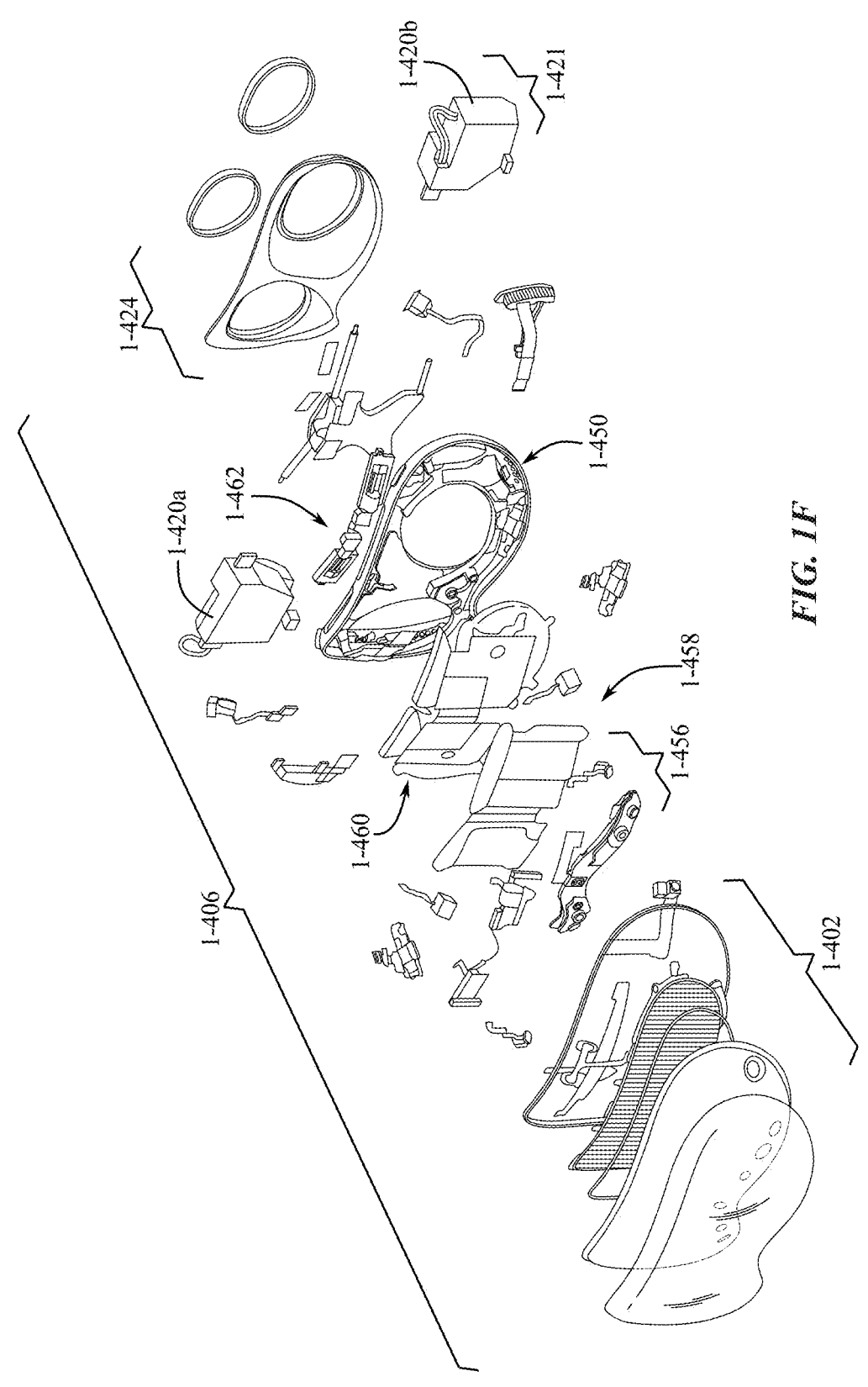
Figure 1G:
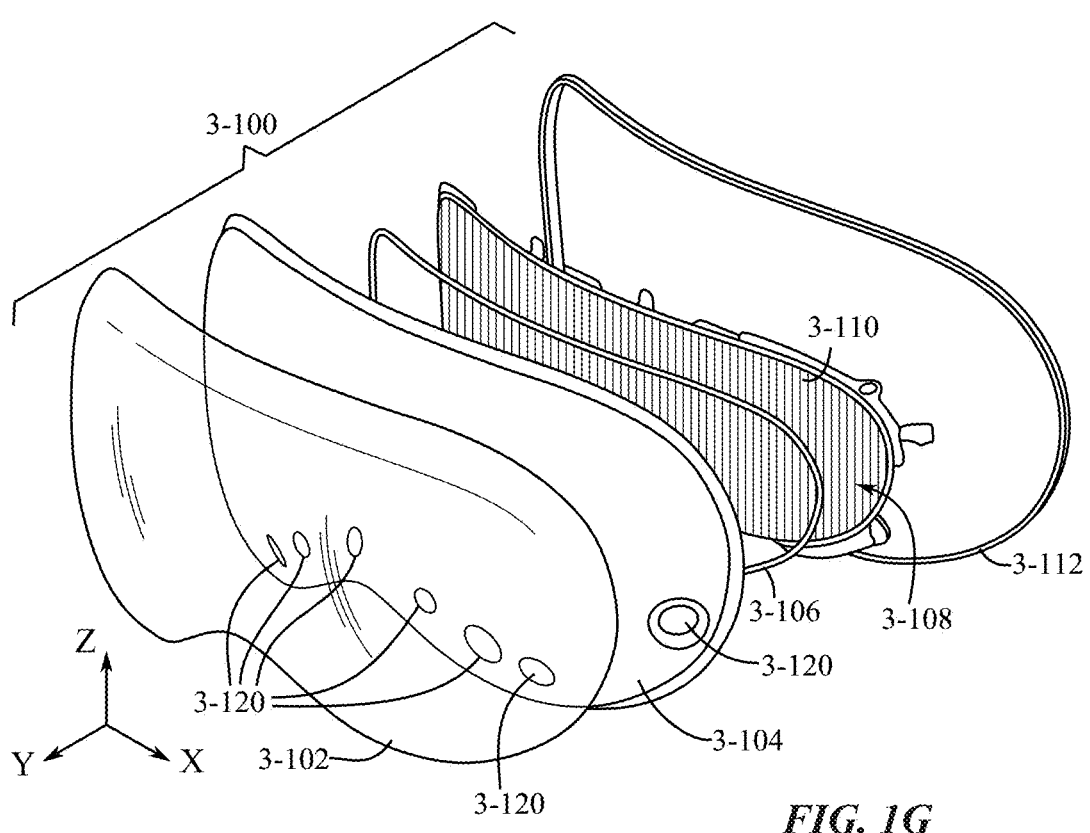
Figure 1H:
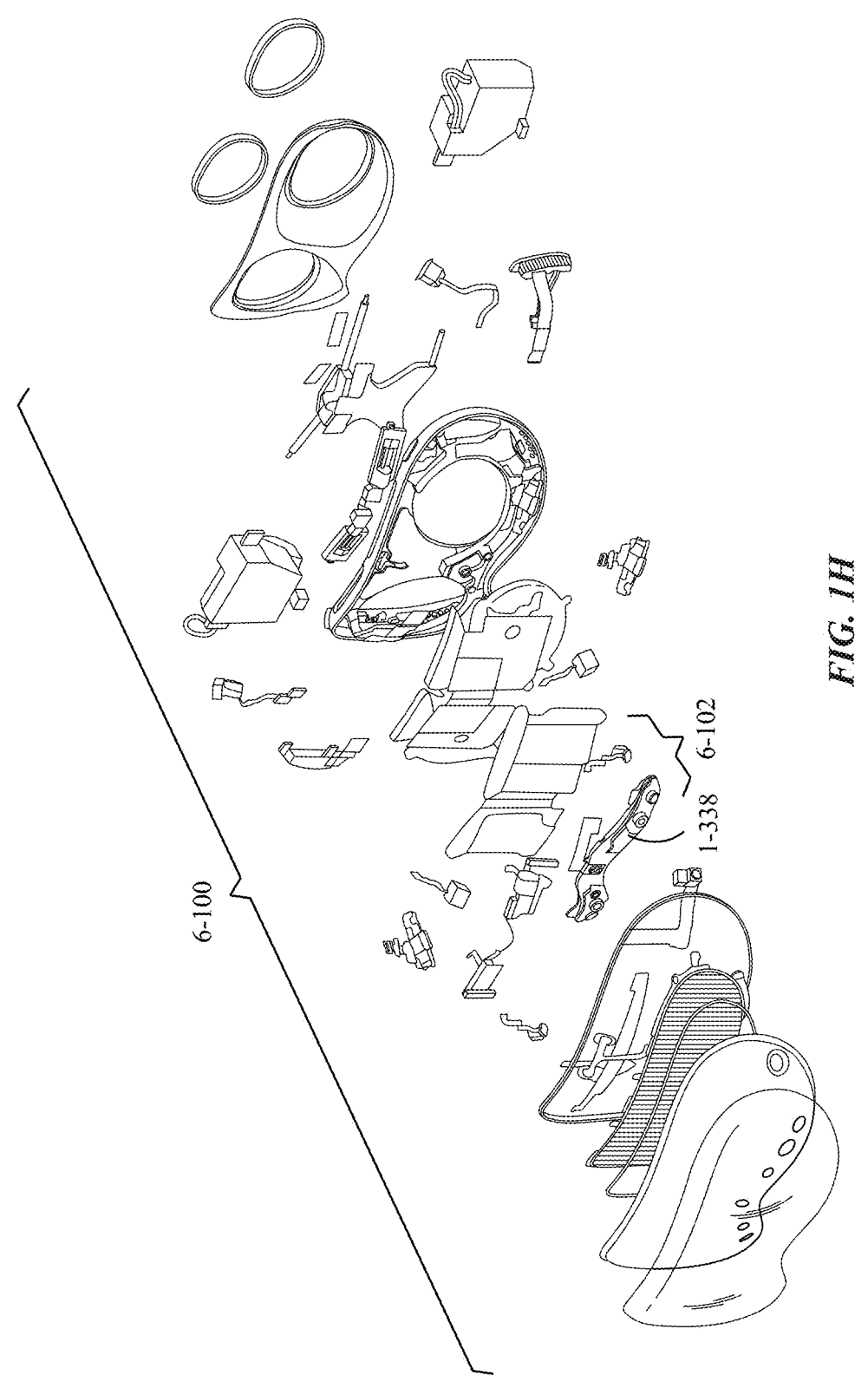
Figure 1I:
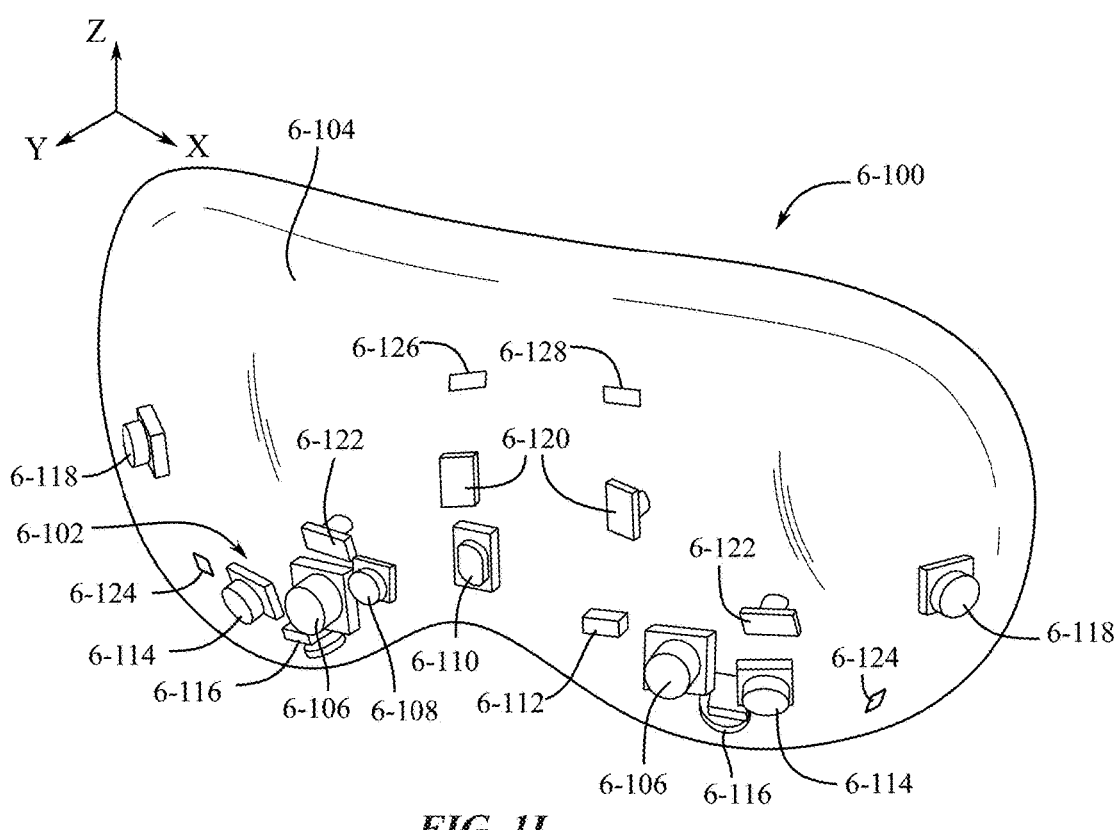
Figure 1J:
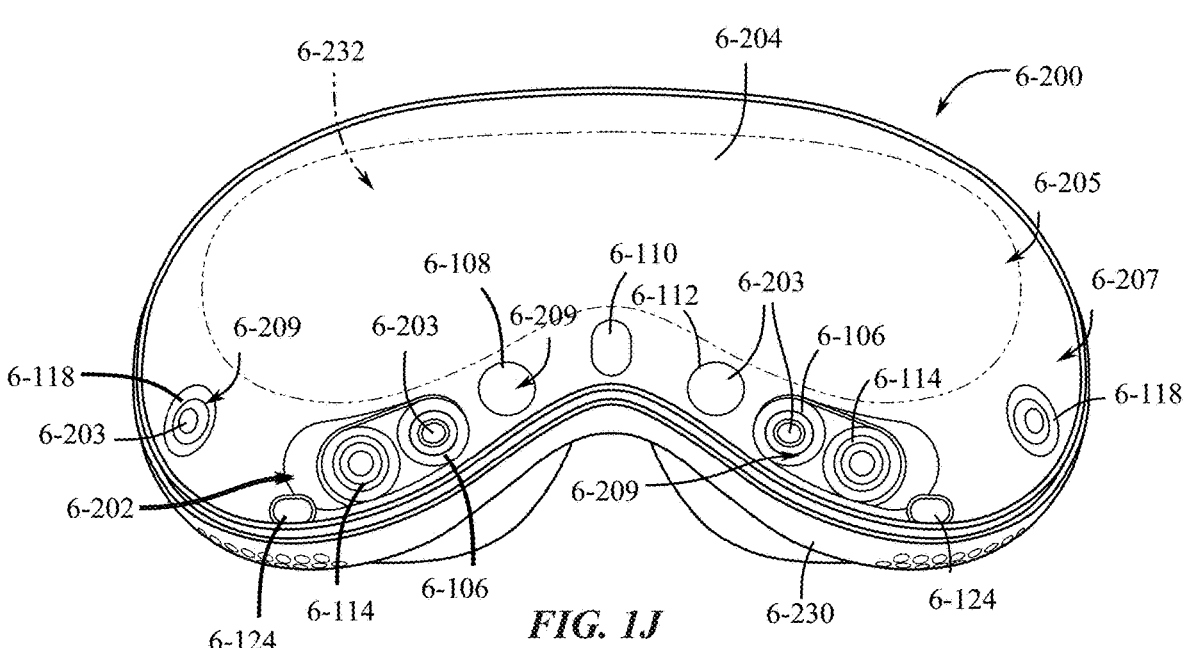
Figures 1K, 1L:
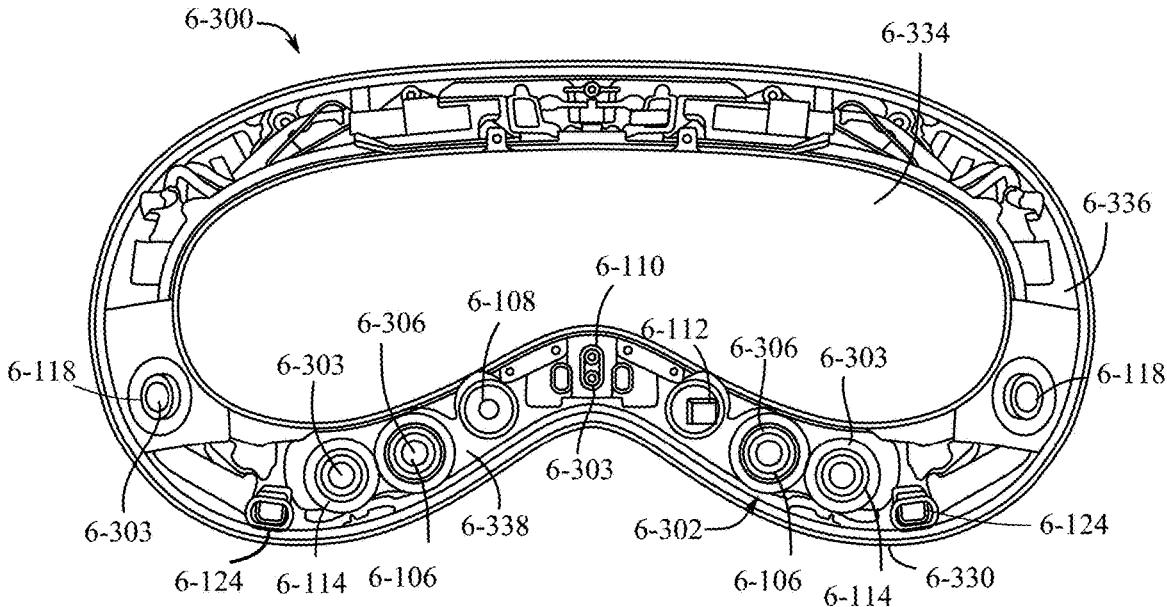
Figure 1M:
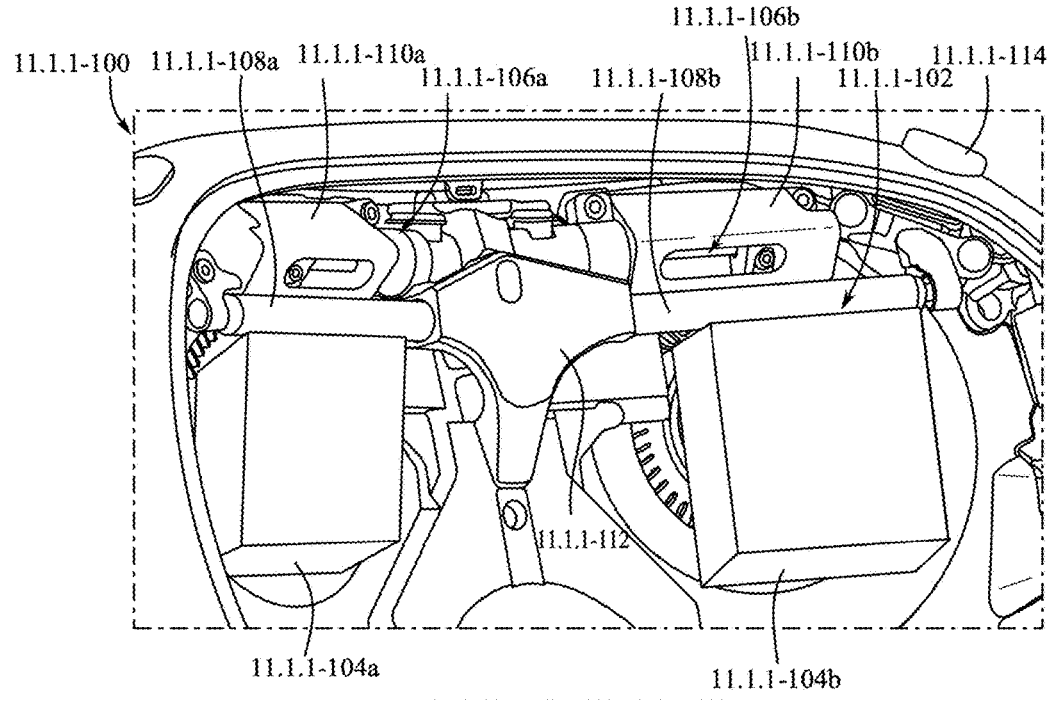
Figure 1N:
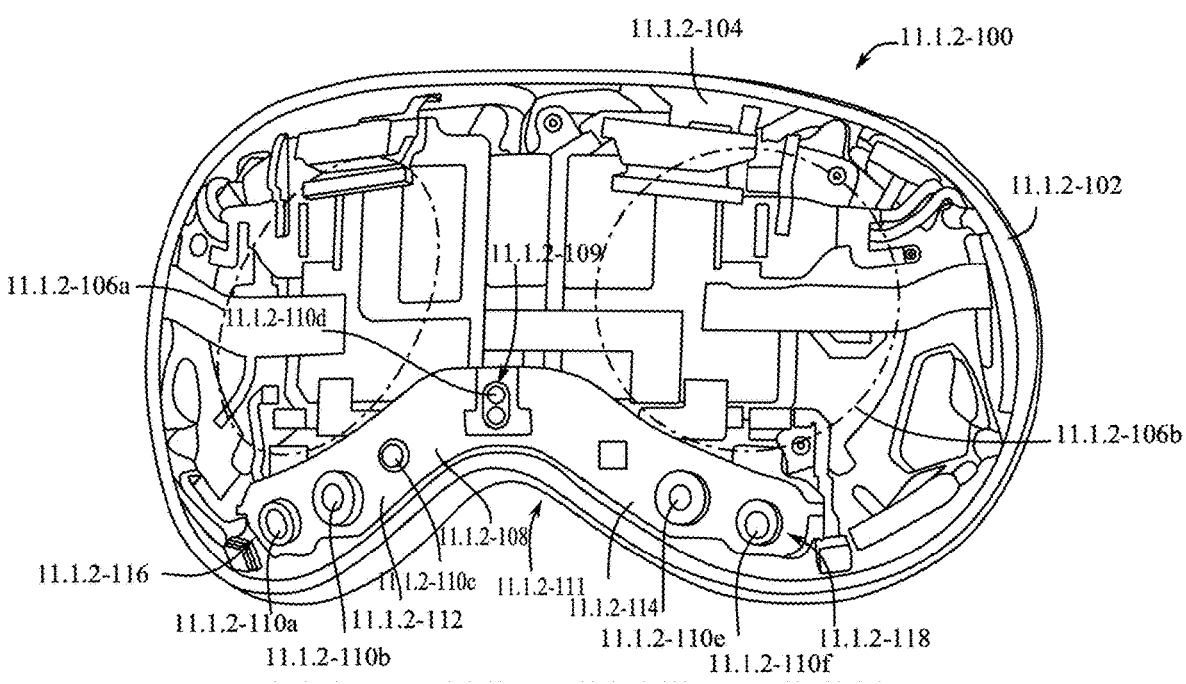
Figure 1O:
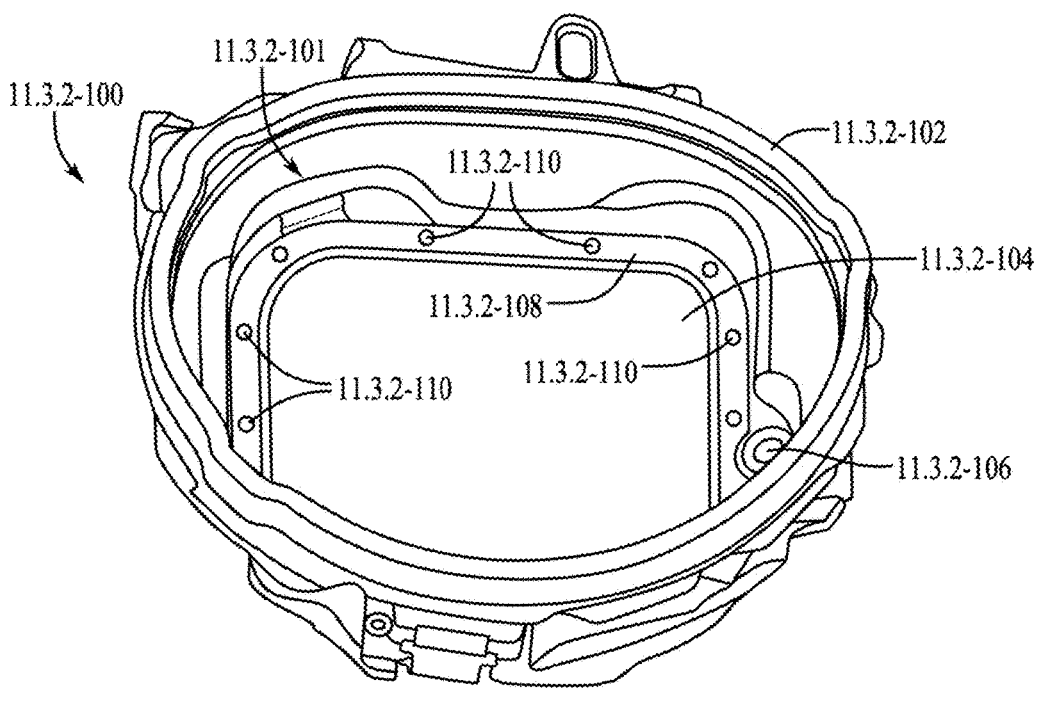
Figure 1P:
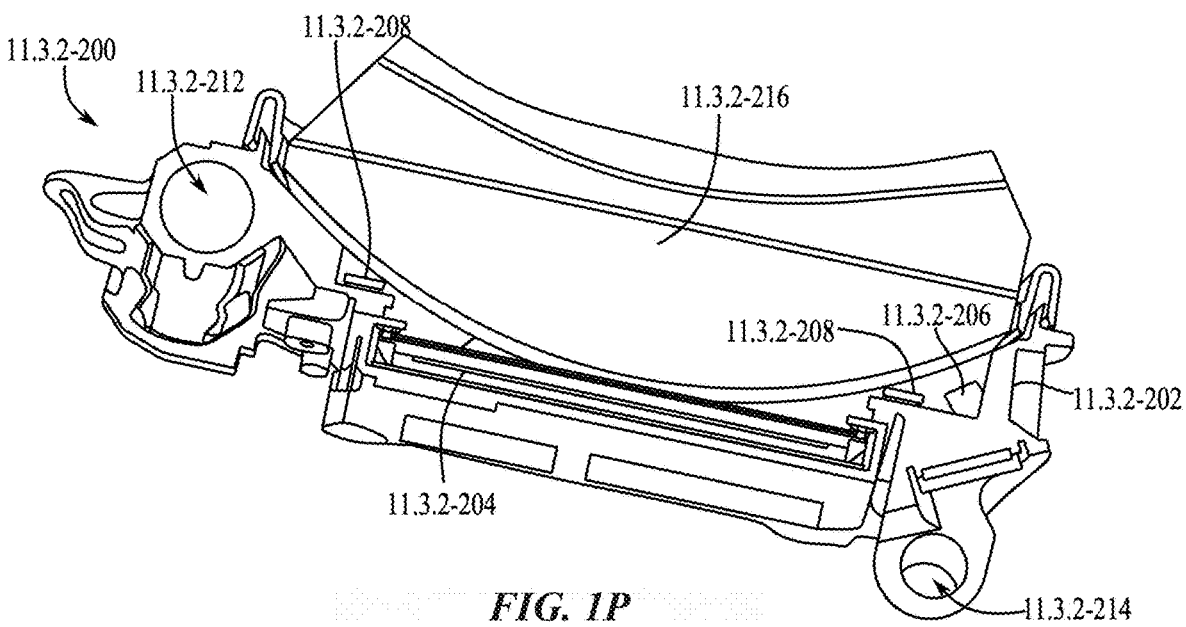

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward-facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-302 of an HMD. The display unit 1-302 can include a front display assembly 1-308, a frame/housing assembly 1-350, and a curtain assembly 1-324. The display unit 1-302 can also include a sensor assembly 1-356, logic board assembly 1-358, and cooling assembly 1-360 disposed between the frame assembly 1-350 and the front display assembly 1-308. In at least one example, the display unit 1-302 can also include a rear-facing display assembly 1-320 including first and second rear-facing display screens 1-322*a*, 1-322*b* disposed between the frame 1-350 and the curtain assembly 1-324.

In at least one example, the display unit 1-302 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-302 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of an HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the display assembly 1-108 of the HMD 1-100 shown in FIG. 1B or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112.

The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HMD device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward-facing display screen of the HMD device 6-100 described elsewhere herein. The downward cameras 6-114, for example, can be used to capture facial expressions and movements for the face of the user below the HMD device 6-100, including the checks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin.

In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, cither alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HMD 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 11 and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 11-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 11-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 11-1K and described herein. Likewise, any of the features, components, and/or parts, including the arrangements and configurations thereof shown and described with reference to FIGS. 11-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106a, 11.1.2-106b. The apertures 11.1.2-106a-b are shown in dotted lines in FIG. 1N because a view of the apertures 11.1.2-106a-b can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106a-b.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106a-b such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110a-f. Each sensor of the plurality of sensors 11.1.2-110a-f can include various types of sensors, including cameras, IR sensors, and so forth. In some examples, one or more of the sensors 11.1.2-110a-f can be used for object recognition in three-dimensional space such that it is important to maintain a precise relative position of two or more of the plurality of sensors 11.1.2-110a-f. The cantilevered nature of the mounting bracket 11.1.2-108 can protect the sensors 11.1.2-110a-f from damage and altered positioning in the case of accidental drops by the user. Because the sensors 11.1.2-110a-f are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110a-f coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, cither alone or in any combination, in the example of the devices, features, components, and parts shown in FIG. 1N.

FIG. 1O illustrates an example of an optical module 11.3.2-100 for use in an electronic device such as an HMD, including HMD devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights

11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, cither alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, cither alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
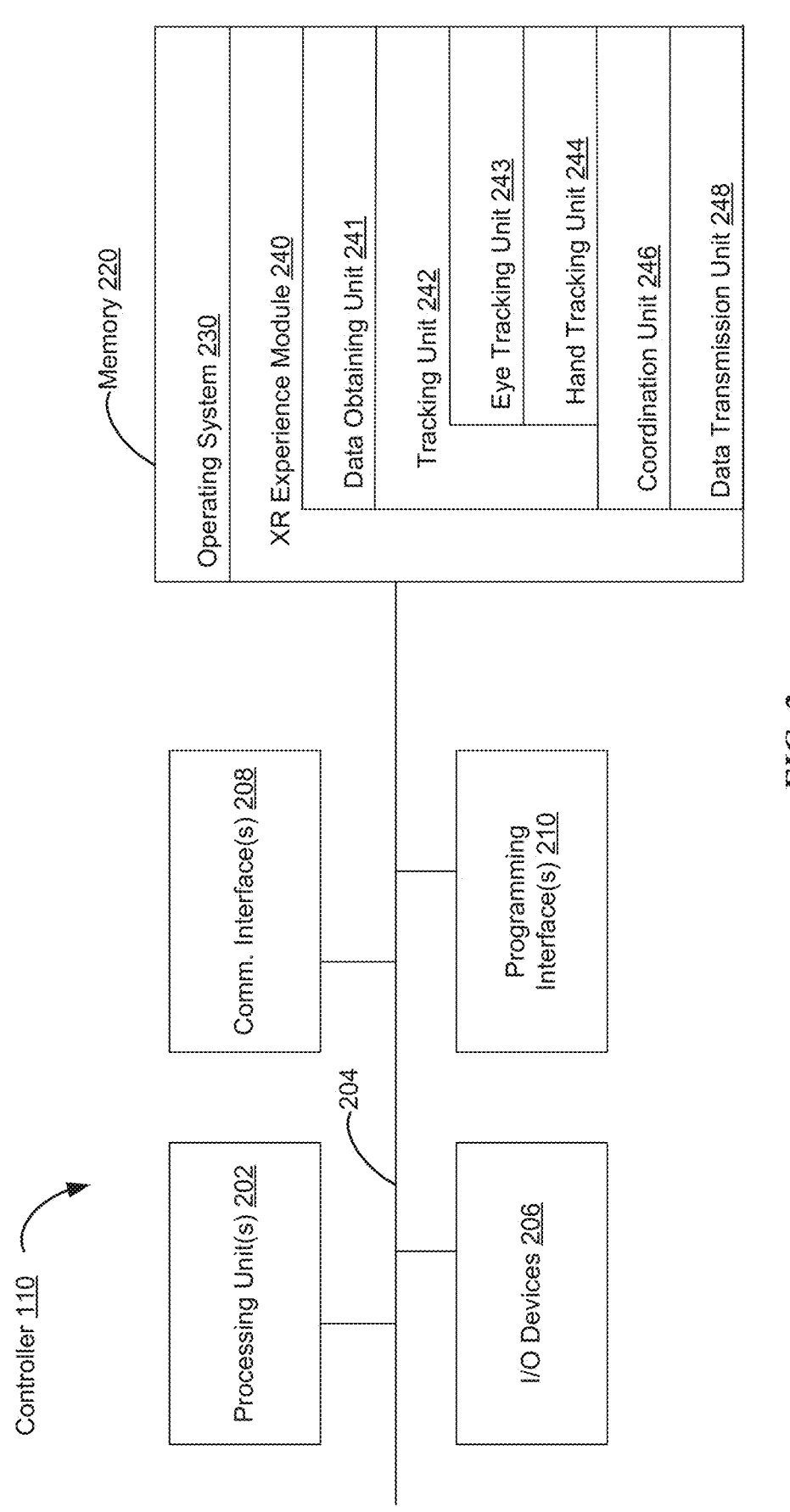
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and an XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments.

The actual number of modules and the division of particular functions and how features are allocated among them will vary from one implementation to another and, in some embodiments, depends in part on the particular combination of hardware, software, and/or firmware chosen for a particular implementation.

Figure 3A:
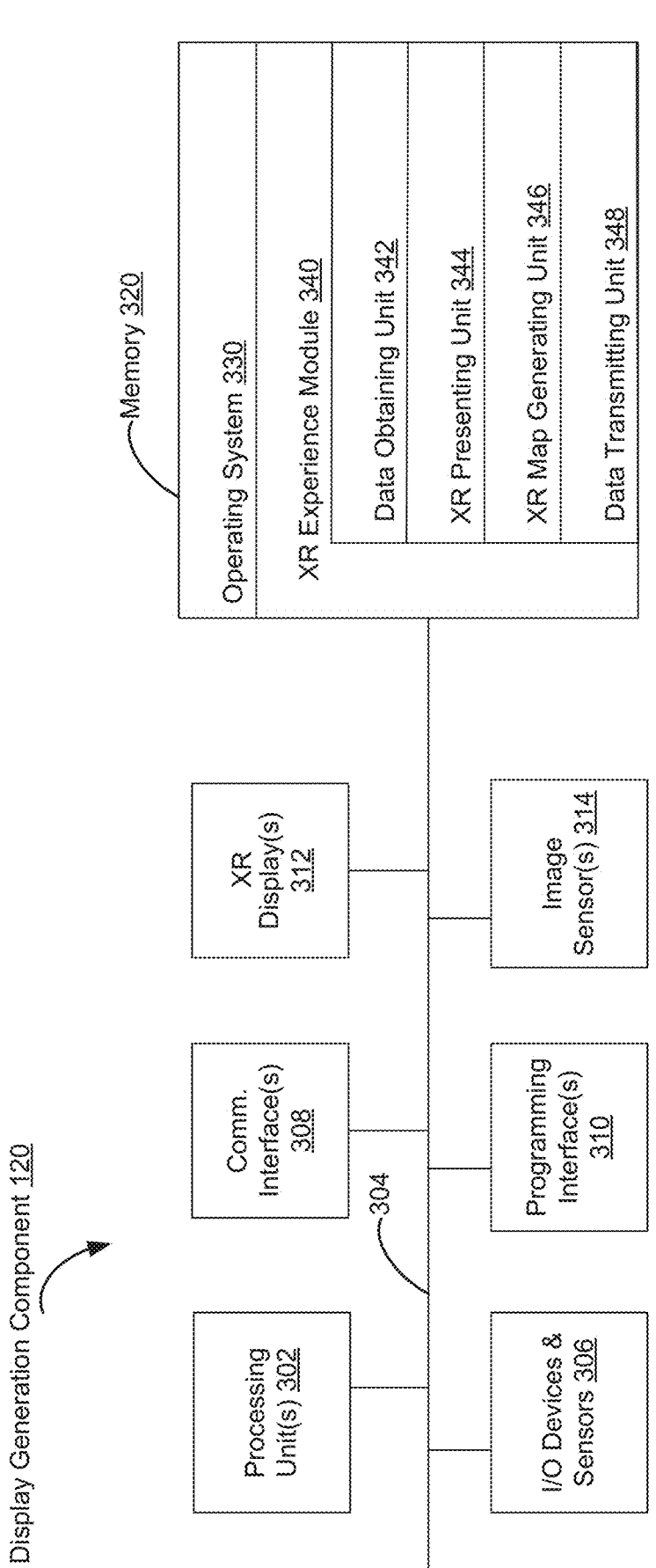
FIG. 3A is a block diagram illustrating a display generation component of a computer system that is configured to provide a visual component of the XR experience to the user in accordance with some embodiments.

FIG. 3A is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3A is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3A could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Implementations within the scope of the present disclosure can be partially or entirely realized using a tangible computer-readable storage medium (or multiple tangible computer-readable storage media of one or more types) encoding one or more computer-readable instructions. It should be recognized that computer-readable instructions can be organized in any format, including applications, widgets, processes, software, and/or components.

Figure 3B:
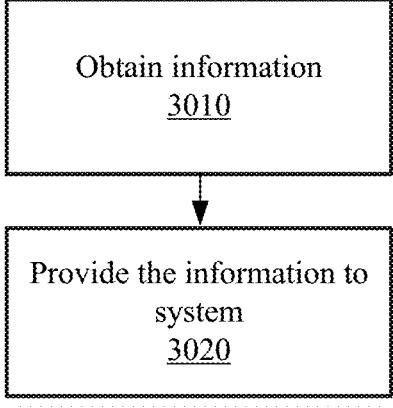
FIGS. 3B-3G illustrate the use of Application Programming Interfaces (APIs) to perform operations.
Figure 3C:
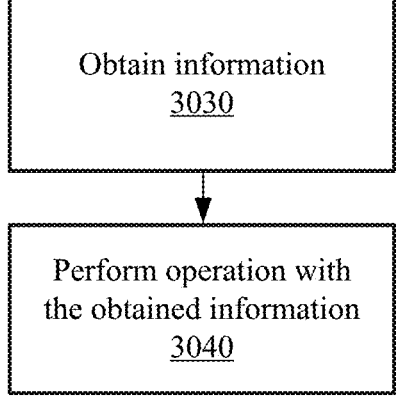

Implementations within the scope of the present disclosure include a computer-readable storage medium that encodes instructions organized as an application (e.g., application 3160) that, when executed by one or more processing units, control an electronic device (e.g., device 3150) to perform the method of FIG. 3B, the method of FIG. 3C, and/or one or more other processes and/or methods described herein.

It should be recognized that application 3160 (shown in FIG. 3D) can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application. In some embodiments, application 3160 is an application that is pre-installed on device 3150 at purchase (e.g., a first-party application). In some embodiments, application 3160 is an application that is provided to device 3150 via an operating system update file (e.g., a first-party application or a second-party application). In some embodiments, application 3160 is an application that is provided via an application store. In some embodiments, the application store can be an application store that is pre-installed on device 3150 at purchase (e.g., a first-party application store). In some embodiments, the application store is a third-party application store (e.g., an application store that is provided by another application store, downloaded via a network, and/or read from a storage device).

Figure 3D:
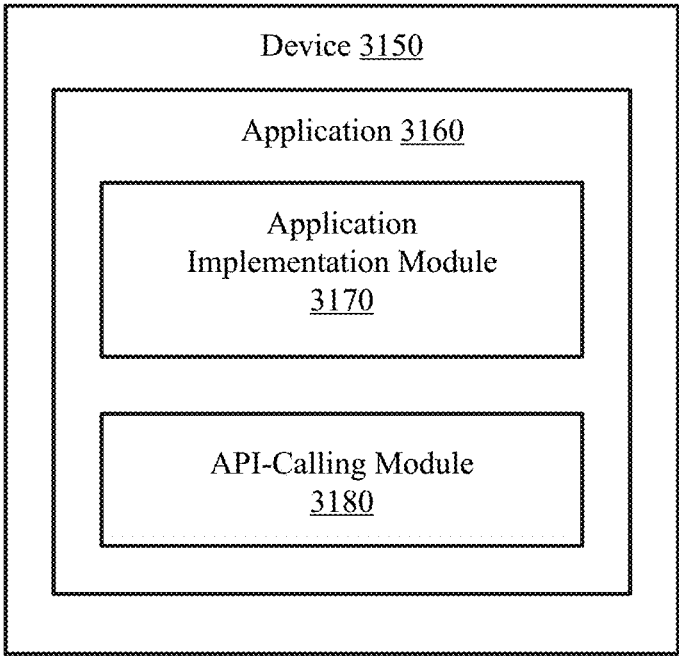
Figure 3E:
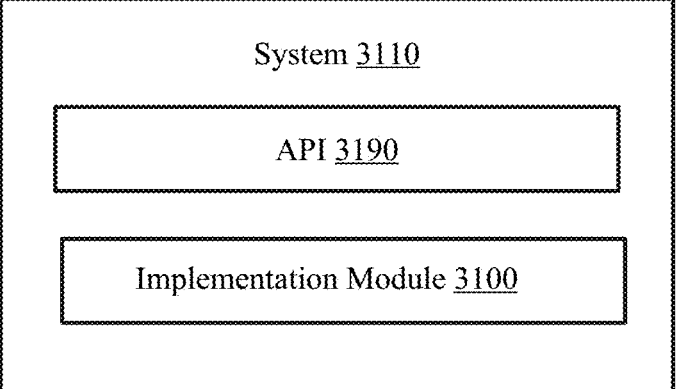
Figure 3F:
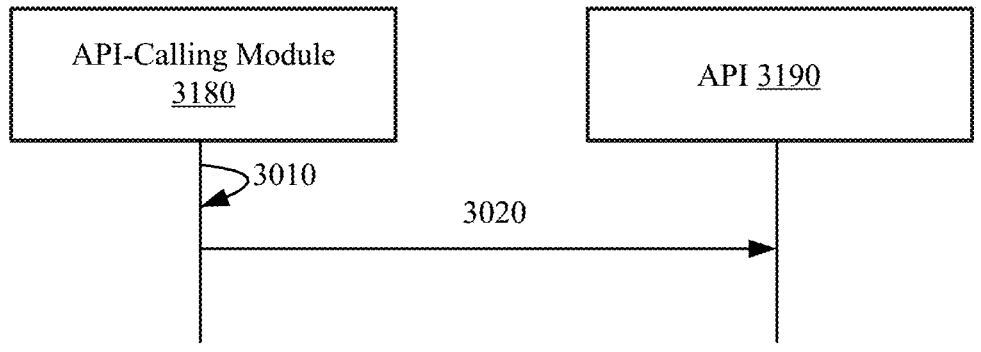

Referring to FIG. 3B and FIG. 3F, application 3160 obtains information (e.g., 3010). In some embodiments, at 3010, information is obtained from at least one hardware component of device 3150. In some embodiments, at 3010, information is obtained from at least one software module of device 3150. In some embodiments, at 3010, information is obtained from at least one hardware component external to device 3150 (e.g., a peripheral device, an accessory device, and/or a server). In some embodiments, the information obtained at 3010 includes positional information, time information, notification information, user information, environment information, electronic device state information, weather information, media information, historical information, event information, hardware information, and/or motion information. In some embodiments, in response to and/or after obtaining the information at 3010, application 3160 provides the information to a system (e.g., 3020).

In some embodiments, the system (e.g., 3110 shown in FIG. 3E) is an operating system hosted on device 3150. In some embodiments, the system (e.g., 3110 shown in FIG. 3E) is an external device (e.g., a server, a peripheral device, an accessory, and/or a personal computing device) that includes an operating system.

Figure 3G:
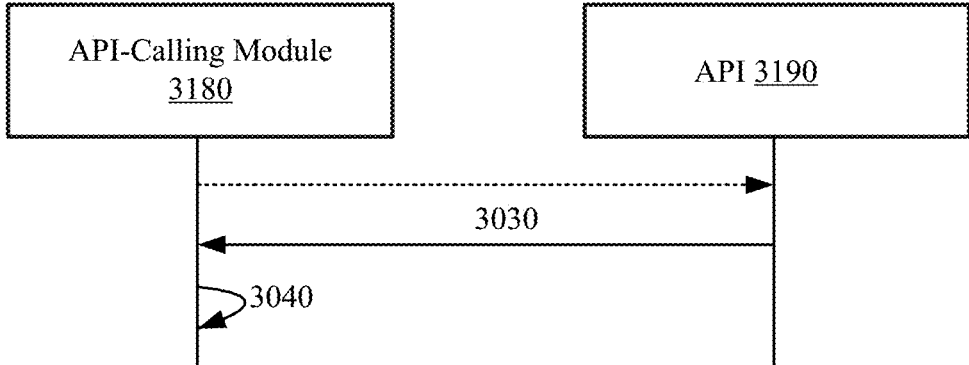

Referring to FIG. 3C and FIG. 3G, application 3160 obtains information (e.g., 3030). In some embodiments, the information obtained at 3030 includes positional information, time information, notification information, user information, environment information electronic device state information, weather information, media information, historical information, event information, hardware information, and/or motion information. In response to and/or after obtaining the information at 3030, application 3160 performs an operation with the information (e.g., 3040). In some embodiments, the operation performed at 3040 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 3110 based on the information.

In some embodiments, one or more steps of the method of FIG. 3B and/or the method of FIG. 3C is performed in response to a trigger. In some embodiments, the trigger includes detection of an event, a notification received from system 3110, a user input, and/or a response to a call to an API provided by system 3110.

In some embodiments, the instructions of application 3160, when executed, control device 3150 to perform the method of FIG. 3B and/or the method of FIG. 3C by calling an application programming interface (API) (e.g., API 3190) provided by system 3110. In some embodiments, application 3160 performs at least a portion of the method of FIG. 3B and/or the method of FIG. 3C without calling API 3190.

In some embodiments, one or more steps of the method of FIG. 3B and/or the method of FIG. 3C includes calling an API (e.g., API 3190) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 3D, device 3150 is illustrated. In some embodiments, device 3150 is a personal computing device, a smart phone, a smart watch, a fitness tracker, a head mounted display (HMD) device, a media device, a communal device, a speaker, a television, and/or a tablet. As illustrated in FIG. 3D, device 3150 includes application 3160 and an operating system (e.g., system 3110 shown in FIG. 3E). Application 3160 includes application implementation module 3170 and API-calling module 3180. System 3110 includes API 3190 and implementation module 3100. It should be recognized that device 3150, application 3160, and/or system 3110 can include more, fewer, and/or different components than illustrated in FIGS. 3D and 3E.

In some embodiments, application implementation module 3170 includes a set of one or more instructions corresponding to one or more operations performed by application 3160. For example, when application 3160 is a messaging application, application implementation module 3170 can include operations to receive and send messages. In some embodiments, application implementation module 3170 communicates with API-calling module 3180 to communicate with system 3110 via API 3190 (shown in FIG. 3E).

In some embodiments, API 3190 is a software module (e.g., a collection of computer-readable instructions) that provides an interface that allows a different module (e.g., API-calling module 3180) to access and/or use one or more functions, methods, procedures, data structures, classes, and/or other services provided by implementation module 3100 of system 3110. For example, API-calling module 3180 can access a feature of implementation module 3100 through one or more API calls or invocations (e.g., embodied by a function or a method call) exposed by API 3190 (e.g., a software and/or hardware module that can receive API calls, respond to API calls, and/or send API calls) and can pass data and/or control information using one or more parameters via the API calls or invocations. In some embodiments, API 3190 allows application 3160 to use a service provided by a Software Development Kit (SDK) library. In some embodiments, application 3160 incorporates a call to a function or method provided by the SDK library and provided by API 3190 or uses data types or objects defined in the SDK library and provided by API 3190. In some embodiments, API-calling module 3180 makes an API call via API 3190 to access and use a feature of implementation module 3100 that is specified by API 3190. In such embodiments, implementation module 3100 can return a value via API 3190 to API-calling module 3180 in response to the API call. The value can report to application 3160 the capabilities or state of a hardware component of device 3150, including those related to aspects such as input capabilities and state, output capabilities and state, processing capability, power state, storage capacity and state, and/or communications capability. In some embodiments, API 3190 is implemented in part by firmware, microcode, or other low level logic that executes in part on the hardware component.

In some embodiments, API 3190 allows a developer of API-calling module 3180 (which can be a third-party developer) to leverage a feature provided by implementation module 3100. In such embodiments, there can be one or more API-calling modules (e.g., including API-calling module 3180) that communicate with implementation module 3100. In some embodiments, API 3190 allows multiple API-calling modules written in different programming languages to communicate with implementation module 3100 (e.g., API 3190 can include features for translating calls and returns between implementation module 3100 and API-calling module 3180) while API 3190 is implemented in terms of a specific programming language. In some embodiments, API-calling module 3180 calls APIs from different providers such as a set of APIs from an OS provider, another set of APIs from a plug-in provider, and/or another set of APIs from another provider (e.g., the provider of a software library) or creator of the another set of APIs.

Examples of API 3190 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodiments, the sensor API is an API for accessing data associated with a sensor of device 3150. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor, and/or biometric sensor.

In some embodiments, implementation module 3100 is a system (e.g., operating system and/or server system) software module (e.g., a collection of computer-readable instructions) that is constructed to perform an operation in response to receiving an API call via API 3190. In some embodiments, implementation module 3100 is constructed to provide an API response (via API 3190) as a result of processing an API call. By way of example, implementation module 3100 and API-calling module 3180 can each be any one of an operating system, a library, a device driver, an API, an application program, or other module. It should be understood that implementation module 3100 and API-calling module 3180 can be the same or different type of module from each other. In some embodiments, implementation module 3100 is embodied at least in part in firmware, microcode, or hardware logic.

In some embodiments, implementation module 3100 returns a value through API 3190 in response to an API call from API-calling module 3180. While API 3190 defines the syntax and result of an API call (e.g., how to invoke the API call and what the API call does), API 3190 might not reveal how implementation module 3100 accomplishes the function specified by the API call. Various API calls are transferred via the one or more application programming interfaces between API-calling module 3180 and implementation module 3100. Transferring the API calls can include issuing, initiating, invoking, calling, receiving, returning, and/or responding to the function calls or messages. In other words, transferring can describe actions by either of API-calling module 3180 or implementation module 3100. In some embodiments, a function call or other invocation of API 3190 sends and/or receives one or more parameters through a parameter list or other structure.

In some embodiments, implementation module 3100 provides more than one API, each providing a different view of or with different aspects of functionality implemented by implementation module 3100. For example, one API of implementation module 3100 can provide a first set of functions and can be exposed to third-party developers, and another API of implementation module 3100 can be hidden (e.g., not exposed) and provide a subset of the first set of functions and also provide another set of functions, such as testing or debugging functions which are not in the first set of functions. In some embodiments, implementation module 3100 calls one or more other components via an underlying API and thus is both an API-calling module and an implementation module. It should be recognized that implementation module 3100 can include additional functions, methods, classes, data structures, and/or other features that are not specified through API 3190 and are not available to API-calling module 3180. It should also be recognized that API-calling module 3180 can be on the same system as implementation module 3100 or can be located remotely and access implementation module 3100 using API 3190 over a network. In some embodiments, implementation module 3100, API 3190, and/or API-calling module 3180 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

An application programming interface (API) is an interface between a first software process and a second software process that specifies a format for communication between the first software process and the second software process. Limited APIs (e.g., private APIs or partner APIs) are APIs that are accessible to a limited set of software processes (e.g., only software processes within an operating system or only software processes that are approved to access the limited APIs). Public APIs that are accessible to a wider set of software processes. Some APIs enable software processes to communicate about or set a state of one or more input devices (e.g., one or more touch sensors, proximity sensors, visual sensors, motion/orientation sensors, pressure sensors, intensity sensors, sound sensors, wireless proximity sensors, biometric sensors, buttons, switches, rotatable elements, and/or external controllers). Some APIs enable software processes to communicate about and/or set a state of one or more output generation components (e.g., one or more audio output generation components, one or more display generation components, and/or one or more tactile output generation components). Some APIs enable particular capabilities (e.g., scrolling, handwriting, text entry, image editing, and/or image creation) to be accessed, performed, and/or used by a software process (e.g., generating outputs for use by a software process based on input from the software process). Some APIs enable content from a software process to be inserted into a template and displayed in a user interface that has a layout and/or behaviors that are specified by the template.

Many software platforms include a set of frameworks that provides the core objects and core behaviors that a software developer needs to build software applications that can be used on the software platform. Software developers use these objects to display content onscreen, to interact with that content, and to manage interactions with the software platform. Software applications rely on the set of frameworks for their basic behavior, and the set of frameworks provides many ways for the software developer to customize the behavior of the application to match the specific needs of the software application. Many of these core objects and core behaviors are accessed via an API. An API will typically specify a format for communication between software processes, including specifying and grouping available variables, functions, and protocols. An API call (sometimes referred to as an API request) will typically be sent from a sending software process to a receiving software process as a way to accomplish one or more of the following: the sending software process requesting information from the receiving software process (e.g., for the sending software process to take action on), the sending software process providing information to the receiving software process (e.g., for the receiving software process to take action on), the sending software process requesting action by the receiving software process, or the sending software process providing information to the receiving software process about action taken by the sending software process. Interaction with a device (e.g., using a user interface) will in some circumstances include the transfer and/or receipt of one or more API calls (e.g., multiple API calls) between multiple different software processes (e.g., different portions of an operating system, an application and an operating system, or different applications) via one or more APIs (e.g., via multiple different APIs). For example, when an input is detected the direct sensor data is frequently processed into one or more input events that are provided (e.g., via an API) to a receiving software process that makes some determination based on the input events, and then sends (e.g., via an API) information to a software process to perform an operation (e.g., change a device state and/or user interface) based on the determination. While a determination and an operation performed in response could be made by the same software process, alternatively the determination could be made in a first software process and relayed (e.g., via an API) to a second software process, that is different from the first software process, that causes the operation to be performed by the second software process. Alternatively, the second software process could relay instructions (e.g., via an API) to a third software process that is different from the first software process and/or the second software process to perform the operation. It should be understood that some or all user interactions with a computer system could involve one or more API calls within a step of interacting with the computer system (e.g., between different software components of the computer system or between a software component of the computer system and a software component of one or more remote computer systems). It should be understood that some or all user interactions with a computer system could involve one or more API calls between steps of interacting with the computer system (e.g., between different software components of the computer system or between a software component of the computer system and a software component of one or more remote computer systems).

In some embodiments, the application can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application.

In some embodiments, the application is an application that is pre-installed on the first computer system at purchase (e.g., a first-party application). In some embodiments, the application is an application that is provided to the first computer system via an operating system update file (e.g., a first-party application). In some embodiments, the application is an application that is provided via an application store. In some embodiments, the application store is pre-installed on the first computer system at purchase (e.g., a first-party application store) and allows download of one or more applications. In some embodiments, the application store is a third-party application store (e.g., an application store that is provided by another device, downloaded via a network, and/or read from a storage device). In some embodiments, the application is a third-party application (e.g., an app that is provided by an application store, downloaded via a network, and/or read from a storage device). In some embodiments, the application controls the first computer system to perform method 800 (FIG. 8) by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, a photos API, a camera API, and/or an image processing API.

In some embodiments, at least one API is a software module (e.g., a collection of computer-readable instructions) that provides an interface that allows a different module (e.g., API-calling module 3180) to access and use one or more functions, methods, procedures, data structures, classes, and/or other services provided by an implementation module of the system process. The API can define one or more parameters that are passed between the API-calling module and the implementation module. In some embodiments, API 3190 defines a first API call that can be provided by API-calling module 3180. The implementation module is a system software module (e.g., a collection of computer-readable instructions) that is constructed to perform an operation in response to receiving an API call via the API. In some embodiments, the implementation module is constructed to provide an API response (via the API) as a result of processing an API call. In some embodiments, the implementation module is included in the device (e.g., 3150) that runs the application. In some embodiments, the implementation module is included in an electronic device that is separate from the device that runs the application.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105 or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture (e.g., an air drag gesture or an air swipe gesture) includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, e.g., the measured z distance from the image sensors 404, with the shade of gray growing darker with increasing depth. The controller 110 processes these depth values in order to identify and segment a component of the image (e.g., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
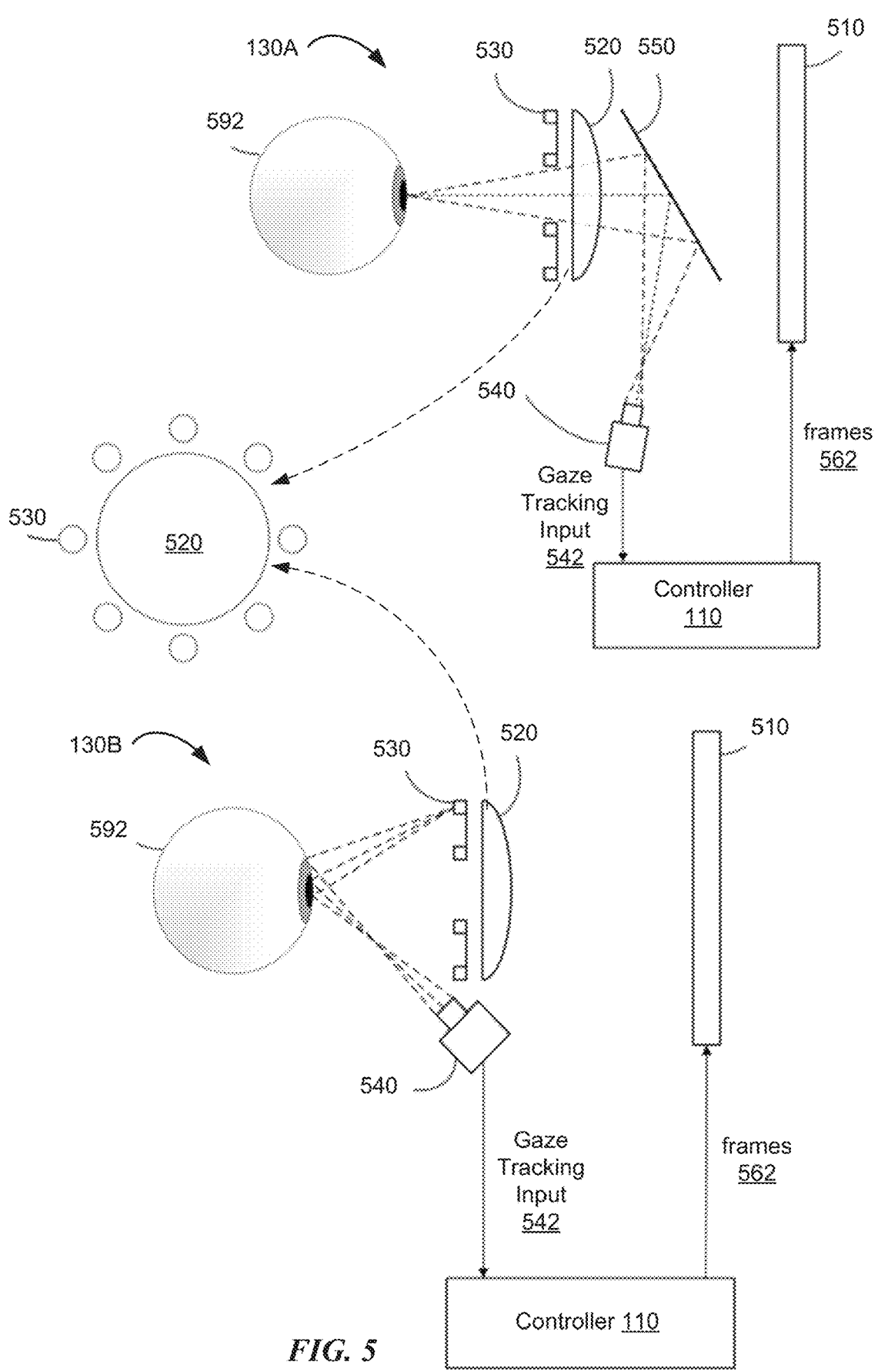
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device and is optionally used in conjunction with a head-mounted display generation component. In some embodiments, the eye tracking device 130 is not a head-mounted device and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)) mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
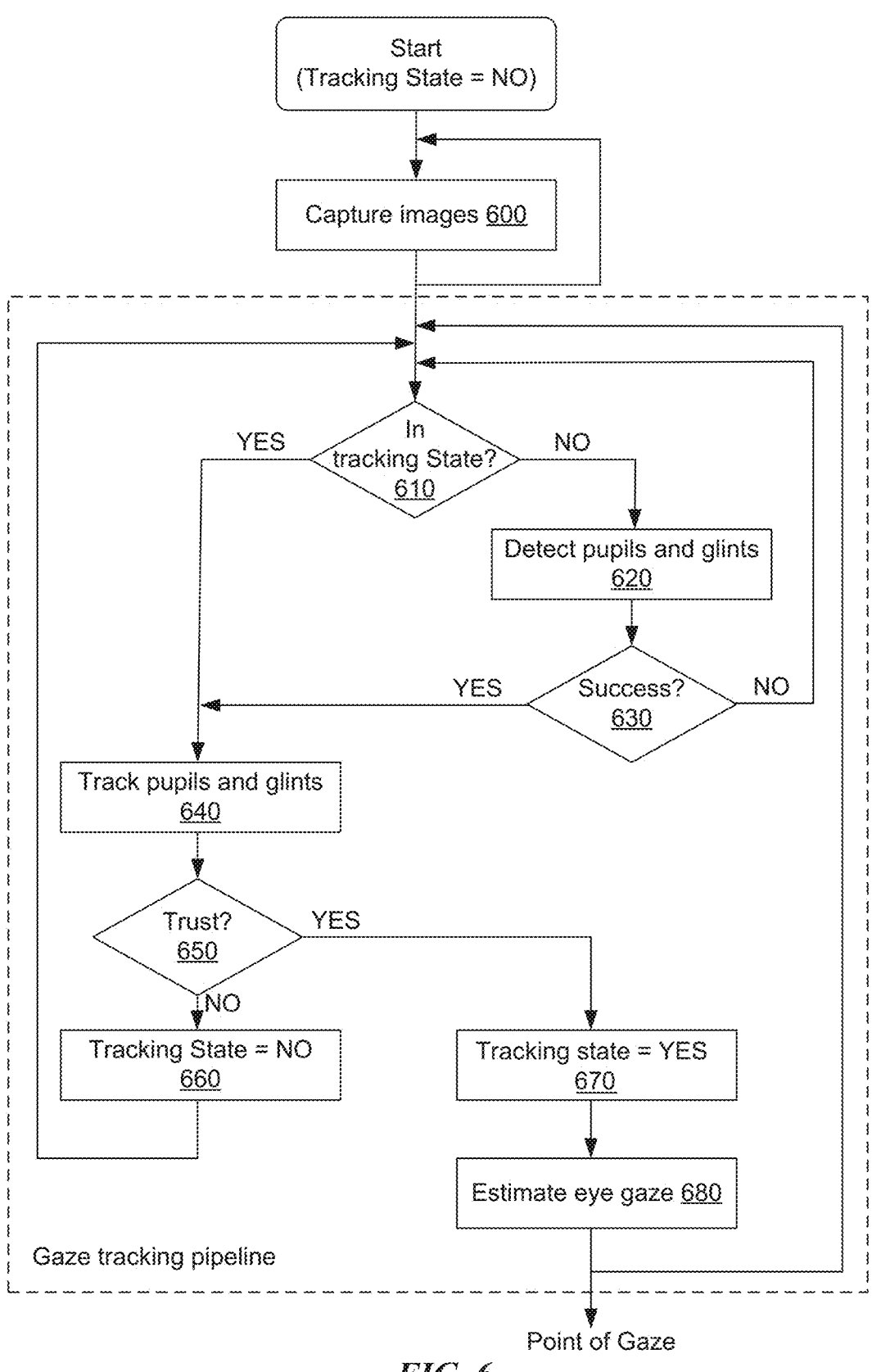
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real-world environment 602 are used to provide a XR experience to the user, for example, a mixed reality environment in which one or more virtual objects are superimposed over representations of real-world environment 602.

Thus, the description herein describes some embodiments of three-dimensional environments (e.g., XR environments) that include representations of real-world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head-mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component, one or more input devices, and (optionally) one or cameras.

Figure 7B:
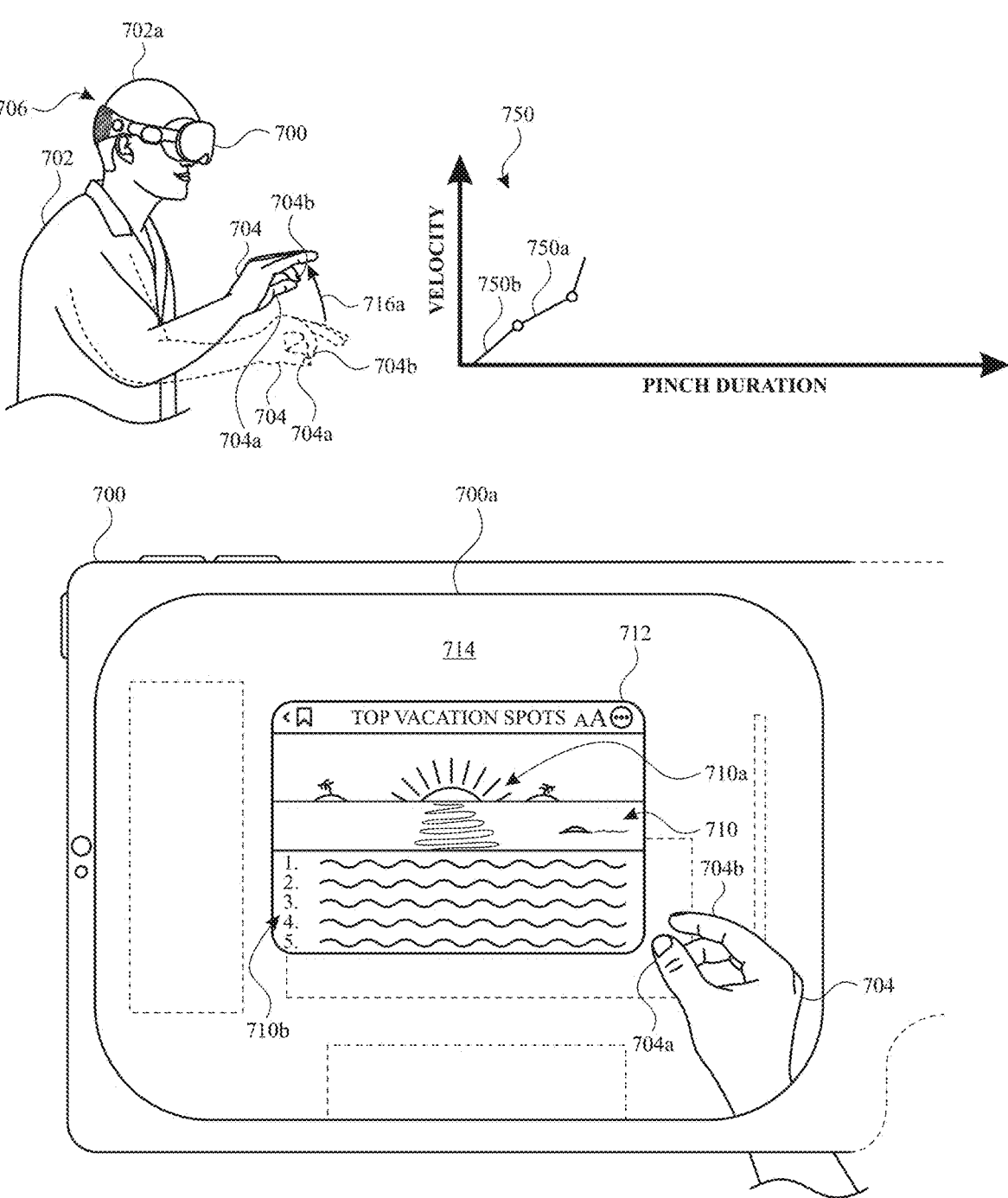
FIGS. 7A-7O illustrate example techniques for interacting with virtual objects, in accordance with some embodiments.

FIGS. 7A-7O illustrate examples of techniques and user interfaces for interacting with virtual objects. FIG. 8 is a flow diagram of an exemplary method 800 for interacting with virtual objects. The user interfaces in FIGS. 7A-7O are used to illustrate the processes described below, including the processes in FIG. 8. In some embodiments, the user interfaces described in FIGS. 7B-7O are displayed on a head-mounted device and a user provides inputs (e.g., to interact with virtual objects as described below) using air gestures, voice commands, and/or inputs on a remote control.

FIG. 7A illustrates graphical representation 750 of different techniques for adjusting an appearance of a virtual object based on movement of an input element detected by a computer system, such as computer system 700 shown in FIGS. 7B-7O. In some embodiments, computer system 700 is a head-mounted device. In some embodiments, any of the features, components, and/or parts, including the arrangements and configurations thereof shown in FIGS. 1B-1P can be included, either alone or in any combination, in computer system 700.

Computer system 700 is configured to detect movement of an input element, such as a hand (e.g., hand 704 and/or hand 705 shown in FIGS. 7B-7O) of a user (e.g., user 702 shown in FIGS. 7B-7O), via one or more sensors. Based on the detected movement of the input element, computer system 700 performs various functions and/or operations. In some embodiments, in response to detecting movement of the input element, computer system 700 causes an appearance of a virtual object (e.g., virtual object 712 and/or content 710 of virtual object 712 shown in FIGS. 7B-7O) to change and/or update. For instance, computer system 700 moves, translates, drags, scrolls, and/or otherwise modifies an appearance of the virtual object in response to detecting movement of the input element. In some embodiments, computer system 700 causes movement of the virtual object in response to detecting movement of hand 704 of user 702 when fingers 704a and 704b of hand 704 are pinched, in contact with one another, and/or positioned within a threshold distance relative to one another. In some embodiments, in response to detecting that fingers 704a and 704b of hand 704 are no longer pinched, no longer in contact with one another, and/or are positioned outside of the threshold distance relative to one another, computer system 700 causes movement of the virtual object to decrease and eventually stop (e.g., movement of the virtual object reaches zero velocity).

For example, as shown at FIG. 7A, computer system 700 detects movement of hand 704, as represented by hand velocity representation 750a of graphical representation 750. In some embodiments, computer system 700 initiates movement of a virtual object based on the movement of hand 704 when fingers 704a and 704b are in a predetermined position relative to one another (e.g., pinched, in contact with one another, and/or within a threshold distance of one another). As shown in graphical representation 750, while fingers 704a and 704b are in the predetermined position relative to one another, computer system 700 causes the virtual object to move at the same velocity as hand 704 until a set of criteria is met, as indicated by virtual object velocity representation 750b (e.g., virtual object velocity representation 750b overlaps with hand velocity representation 750a). In some embodiments, the set of criteria includes detecting the end of a gesture and/or input performed by user 702 (e.g., an input-end event), such as a change in the position of fingers 704a and 704b so that fingers 704a and 704b are no longer in the predetermined position (e.g., fingers 704a and 704b are not pinched, not in contact with one another, and/or positioned outside of the threshold distance relative to one another).

For instance, at FIG. 7A, computer system 700 detects a change in the position of fingers 704a and 704b relative to one another indicating the end of the gesture and/or input at time 750c. At FIG. 7A, movement of the hand is at a maximum velocity at time 750c, as represented by a peak in hand velocity representation 750a. In response to detecting the end of the gesture and/or input at time 750c, computer system 700 causes the virtual object to move independent of the movement of hand 704 at time 750c, as indicated by first break velocity representation 750d. In some embodiments, computer system 700 gradually reduces the velocity of the virtual object based on a first exponential decay in response to detecting the end of the gesture and/or input at time 750c. In some embodiments, the first exponential decay includes a first decay rate that causes movement of the virtual object to decrease to zero velocity over time. In some embodiments, computer system 700 gradually reduces the velocity of the virtual object based on the first exponential decay in response to detecting the end of the gesture and/or input within a threshold time range (e.g., within 10 milliseconds, 20 milliseconds, 30 milliseconds, 40 milliseconds, 50 milliseconds, or 100 milliseconds) of time 750c (e.g., the time corresponding to the maximum hand velocity of hand velocity representation 750a).

As described below, computer system 700 causes the virtual object to move based on various exponential decays (and independent of the movement of hand 704) when a time at which computer system 700 detects the end of the input and/or gesture is not at time 750c and/or when computer system 700 is unable to directly observe hand 704, finger 704a, and/or finger 704b of user 702. In some instances, applying the first exponential decay with the first decay rate to movement of the virtual object at the time computer system 700 detects the end of the input and/or gesture affects an ability of user 702 to interact with the virtual object. For example, when user 702 intends to scroll content associated with the virtual object and user 702 releases contact between fingers 704a and 704b after the velocity of movement of hand 704 reaches a maximum velocity (e.g., after time 750c), the first exponential decay with the first decay rate causes movement of the virtual content to stop abruptly instead of gradually decrease to zero velocity. As such, the virtual object does not move in the manner intended by the user, thereby leading to user frustration and/or leading to the user having to provide additional inputs to perform the intended operation.

Computer system 700 is therefore configured to cause movement of the virtual object based on different exponential decays to reduce user frustration and to provide a more seamless user experience. For instance, at FIG. 7A, graphical representation 750 indicates that computer system 700 detects an end of the gesture and/or input performed by user 702 at time 750c, which occurs before time 750c corresponding to a maximum velocity of hand velocity representation 750a. In some embodiments, computer system 700 causes movement of the virtual object based on a second exponential decay, as represented by second break velocity representation 750f, at time 750e. In some embodiments, the second exponential decay includes a second decay rate that causes movement of the virtual object to gradually decrease to zero velocity starting from the velocity of the virtual object (and the velocity of hand 704) corresponding to time 750c. In some embodiments, the second exponential decay is the same as the first exponential decay. In some embodiments, the second exponential decay is different from the first exponential decay. For instance, in some embodiments, the second decay rate is greater than or less than the first decay rate. As shown at FIG. 7A, second break velocity representation 750f reaches zero velocity at a time before first break velocity representation 750d because computer system 700 starts applying the second exponential decay at time 750c, which includes a velocity of movement of the virtual object that is less than the velocity of movement of the virtual object at time 750c.

In some embodiments, computer system 700 continues to cause movement of the virtual object based on movement of hand 704 after detecting the input-end event at time 750c. For instance, when computer system 700 detects that the velocity of hand 704, as represented by hand velocity representation 750a, continues to increase after time 750e, computer system 700 determines that the velocity of hand 704 has not reached a maximum velocity. In some embodiments, based on a determination that the velocity of hand 704 has not reached the maximum velocity at time 750c, computer system 700 continues to increase the speed of the virtual object based on (e.g., proportionate to) the velocity of hand 704 until the velocity of hand 704 reaches the maximum velocity. As shown at FIG. 7A, in some embodiments, computer system 700 continues to increase the velocity of the virtual object proportionate to the velocity of hand 704 until time 750c even though computer system detected the input-end event at time 750c, as indicated by virtual object velocity representation 750b overlapping with hand velocity representation 750a between times 750e and 750c. In response to detecting that the velocity of hand 704 reaches the maximum velocity at time 750c, computer system 700 causes movement of the virtual object to gradually decrease based on a third exponential decay, as represented by third break velocity representation 750g. In some embodiments, the third exponential decay includes a third decay rate that causes movement of the virtual object to gradually decrease to zero velocity starting from the maximum hand velocity at time 750c. At FIG. 7A, the third exponential decay is the same as the first exponential decay. In some embodiments, the third exponential decay is the same as the second exponential decay. In some embodiments, the third exponential decay is different from the first exponential decay and/or the second exponential decay. For instance, in some embodiments, the third decay rate is greater than or less than the first decay rate and/or the second decay rate.

In some embodiments, computer system 700 does not detect the end of the gesture and/or input performed by user 702 at times 750e and 750c (e.g., before or at the maximum velocity of hand 704). For instance, fingers 704a and 704b of hand 704 of user 702 may remain in the predetermined position (e.g., pinched, in contact with one another, and/or positioned within a threshold distance of one another) at a time that is past time 750c corresponding to the maximum velocity of hand 704. As another example, hand 704 of user 702 may be positioned so that sensors of computer system 700 cannot directly determine and/or detect the position of fingers 704a and 704b relative to one another at time 750c, such as fingers 704a and 704b being blocked by another body part of user 702 and/or fingers 704a and 704b otherwise being out of a sensing range of sensors of computer system 700. In some embodiments, computer system 700 determines that user 702 intended to end the gesture and/or input (e.g., user 702 positioned fingers 704a and 704b so that fingers 704a and 704b are not pinched, fingers 704a and 704b are not in contact with one another, and/or fingers 704a and 704b are positioned outside of a threshold range relative to one another, but sensors of computer system 700 could not directly detect fingers 704a and 704b at time 750c. For instance, computer system 700 determines that user 702 intended for the input-end event to occur at time 750c based on contextual characteristics of movement of hand 704 (e.g., speed, velocity, acceleration, position, and/or direction of movement of hand 704), previous movements of hand 704 (e.g., movements of hand 704 that occurred prior to a time corresponding to graphical representation 750), and/or a gaze of user 702.

When computer system 700 determines that user 702 intended to end the gesture and/or input at time 750c but computer system 700 does not directly detect the end of the gesture and/or input at time 750c, computer system 700 causes movement of virtual object to gradually decrease based on a fourth exponential decay for a predetermined amount of time starting at time 750c, as indicated by fourth break velocity representation 750h. Accordingly, computer system 700 causes the virtual object to move independent of movement of hand 704 even though computer system 700 does not directly detect the end of the gesture and/or input. In some embodiments, the fourth exponential decay includes a fourth decay rate that causes movement of the virtual object to gradually decrease toward zero velocity starting from the maximum hand velocity at time 750c. At FIG. 7A, the fourth exponential decay is different from the first exponential decay, the second exponential decay, and the third exponential decay. In some embodiments, the fourth decay rate is greater than or less than the first decay rate, the second decay rate, and/or the third decay rate. In some embodiments, a larger decay rate causes the virtual object to stop moving more slowly as compared to a smaller decay rate. At FIG. 7A, the fourth decay rate causes movement of the virtual object to reach zero velocity more quickly than the first decay rate, the second decay rate, and the third decay rate.

At FIG. 7A, after computer system 700 causes movement of the virtual object to decrease based on the fourth exponential decay at time 750c, computer system 700 detects the end of the gesture and/or input at time 750i, which occurs after time 750c corresponding to the maximum velocity of hand 704. In some embodiments, computer system 700 detects that fingers 704a and 704b are no longer in the predetermined position (e.g., fingers 704a and 704b are not pinched, fingers 704a and 704b are not in contact with one another, and/or fingers 704a and 704b are positioned outside of a threshold distance relative to one another), thereby indicating the end of the gesture and/or input performed by user 702. In some embodiments, time 750i is a time at which sensors of computer system 700 directly detect fingers 704a and 704b after sensors were unable to directly detect fingers 704a and 704b (e.g., at time 750c). In some embodiments, time 750i is a time at which user 702 caused fingers 704a and 704b to no longer be in the predetermined position after inadvertently maintaining fingers 704a and 704b in the predetermined position beyond time 750c.

At time 750i, computer system 700 transitions from causing movement of the virtual object to decrease based on the fourth exponential decay to causing movement of the virtual object to decrease based on the first exponential decay, as indicated by fifth break velocity representation 750j. Accordingly, when computer system 700 confirms that user 702 intended to end the gesture and/or input at time 750i, computer system 700 causes movement of the virtual object to decrease toward zero velocity more slowly when compared to computer system 700 causing movement of the virtual object based on the fourth exponential decay from times 750c to 750i. As set forth below, in some embodiments, causing movement of the virtual object to decrease with the fourth exponential decay enables computer system 700 to confirm the intent of the user before causing movement of the virtual object to decrease based on the first exponential decay.

The techniques and scenarios described above with respect to FIG. 7A are further described and depicted in the embodiments illustrated in FIGS. 7B-7O.

Turning to FIG. 7B, computer system 700 is a head-mounted device that is worn by user 702, as shown in representation 706. Representation 706 includes computer system 700 being worn on head 702a of user 702, such that display 700a of computer system 700 is positioned in front of and/or over the eyes of user 702. FIG. 7B also includes graphical representation 750, which illustrates movement of hand 704 of user 702 and movement of content 710 associated with virtual object 712 displayed via display 700a of computer system 700 over time. Representation 706 and graphical representation 750 are not displayed via display 700a of computer system 700 but are provided to facilitate description of the disclosed embodiments.

In some embodiments, computer system 700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display 700a includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, computer system 700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, computer system 700 includes any of the features, components, and/or parts of any of first button 1-128, button 11.1.1-114, second button 1-132, and or dial or button 1-328, either alone or in any combination. In some embodiments, computer system 700 includes one or more audio output components (e.g., electronic component 1-112) for generating audio feedback (e.g., audio output), optionally generated based on detected events and/or user inputs detected by computer system 700.

At FIG. 7B, computer system 700 displays, via display 700a, virtual object 712, which includes content 710. In addition, computer system 700 displays virtual object 712 overlaid on a representation of physical environment 714, which is based on information received from one or more sensors (e.g., a view of one or more cameras) of computer system 700. Content 710 includes image 710a and numbered list 710b. Numbered list 710b is illustrated to depict a relative position of content 710 as content 710 is moved based on user interactions with computer system 700.

At FIG. 7B, computer system 700 detects user 702 making a gesture and/or input requesting to interact with content 710 of virtual object 712. For instance, computer system 700 detects that fingers 704a and 704b of hand 704 of user 702 are in a predetermined position relative to one another. In some embodiments, the predetermined position of fingers 704a and 704b includes fingers 704a and 704b being pinched, in contact with one another, and/or positioned within a threshold distance from one another. In addition, while detecting that fingers 704a and 704b are in the predetermined position, computer system 700 detects first movement 716a of hand 704, which includes upward movement of hand 704 from a first position to a second position. First movement 716a of hand 704 is indicated by hand velocity representation 750a of graphical representation 750. Based on detecting that fingers 704a and 704b are in the predetermined position and/or based on detecting first movement 716a, computer system 700 determines that user 702 intends to interact with virtual object 712 to cause movement of content 710. For instance, in some embodiments, based on a speed of first movement 716a, a direction of first movement 716a, a gaze of user 702, and/or other contextual factors, computer system 700 determines that user 702 intends to scroll content 710 of virtual object 712 in an upward direction.

In response to detecting that fingers 704a and 704b are in the predetermined position and/or first movement 716a of hand 704, computer system 700 initiates movement of content 710, as indicated by virtual object velocity representation 750b on graphical representation 750. Prior to detecting an end of the gesture and/or input performed by user 702 (and/or prior to determining that user 702 intended to end the gesture and/or input), computer system 700 causes content 710 to move based on movement of hand 704 (e.g., while fingers 704a and 704b are in the predetermined position). For instance, as illustrated by graphical representation 750, virtual object velocity representation 750b overlaps with hand velocity representation 750a, thereby indicating that movement of content 710 is proportional to movement of hand 704. In some embodiments, computer system 700 causes content 710 to move at the same velocity as hand 704 during first movement 716a.

Figure 7C:
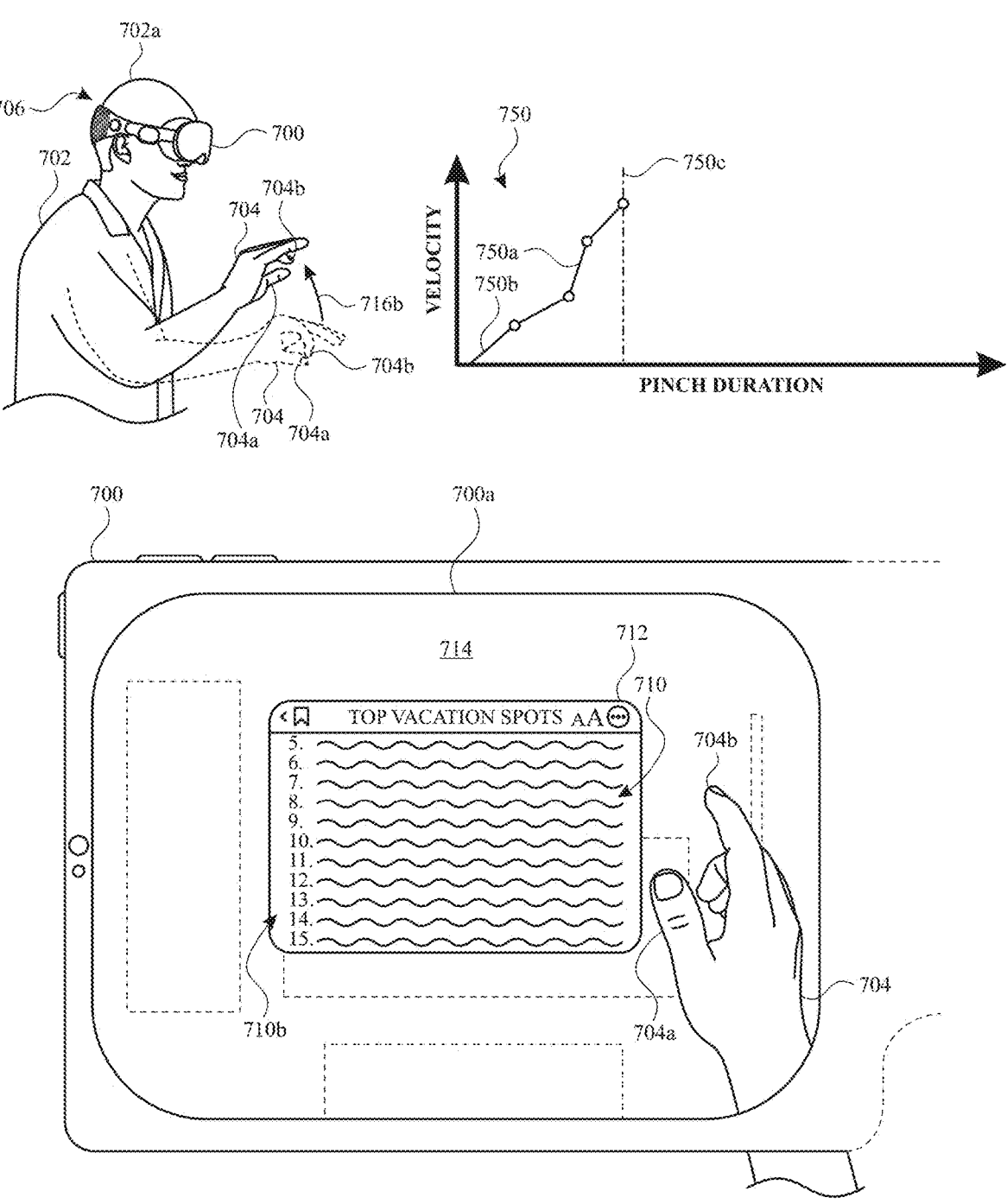

At FIG. 7C, computer system 700 initiates scrolling of content 710, such that content 710 has moved in an upward direction relative to display 700a. For instance, content 710 of virtual object 712 includes items 5-15 of numbered list 710*b* and no longer includes image 710*a* and/or items 1-4 of numbered list 710*b*. As such, scrolling content 710 causes different portions of content 710 to be displayed and/or cease being displayed over time.

In addition, at FIG. 7C, computer system 700 has detected second movement 716*b* of hand 704, which is a continuation of first movement 716*a* (e.g., an uninterrupted continuous movement of hand 704 over time). For instance, hand 704 of user 702 has continued to move upward from the second position shown at FIG. 7B to a third position shown at FIG. 7C. In addition, graphical representation 750 illustrates that a velocity of hand 750 increased while hand 704 was moving via first movement 716*a* and second movement 716*b*. In response to detecting second movement 716*b* (and while fingers 704*a* and 704*b* are in the predetermined position), computer system 700 causes content 710 to move (e.g., scroll and/or translate) at a velocity that is based on the velocity of hand 704 during second movement 716*a*.

At FIG. 7C, computer system 700 detects an end of the gesture and/or input requesting to scroll content 710 (e.g., computer system 700 detects a clear input-end event) at time 750*c*, as indicated by graphical representation 750. Computer system 700 detects that fingers 704*a* and 704*b* are no longer in the predetermined position relative to one another, thereby indicating the end of the gesture and/or input. For instance, computer system 700 detects that fingers 704*a* and 704*b* of hand 704 are not pinched, not in contact with one another, and/or positioned more than a predetermined distance away from one another. In some embodiments, user 702 requests to end the gesture and/or input by breaking contact between (e.g., de-pinching and/or separating) fingers 704*a* and 704*b*. In response to detecting the end of the gesture and/or input (e.g., a clear input-end event), computer system 700 ceases to cause movement of content 710 based on movement of hand 704. In other words, computer system 700 causes content 710 to move (e.g., gradually stop moving) independent of movement of hand 704 after detecting the request to end the gesture and/or input.

Figure 7D:
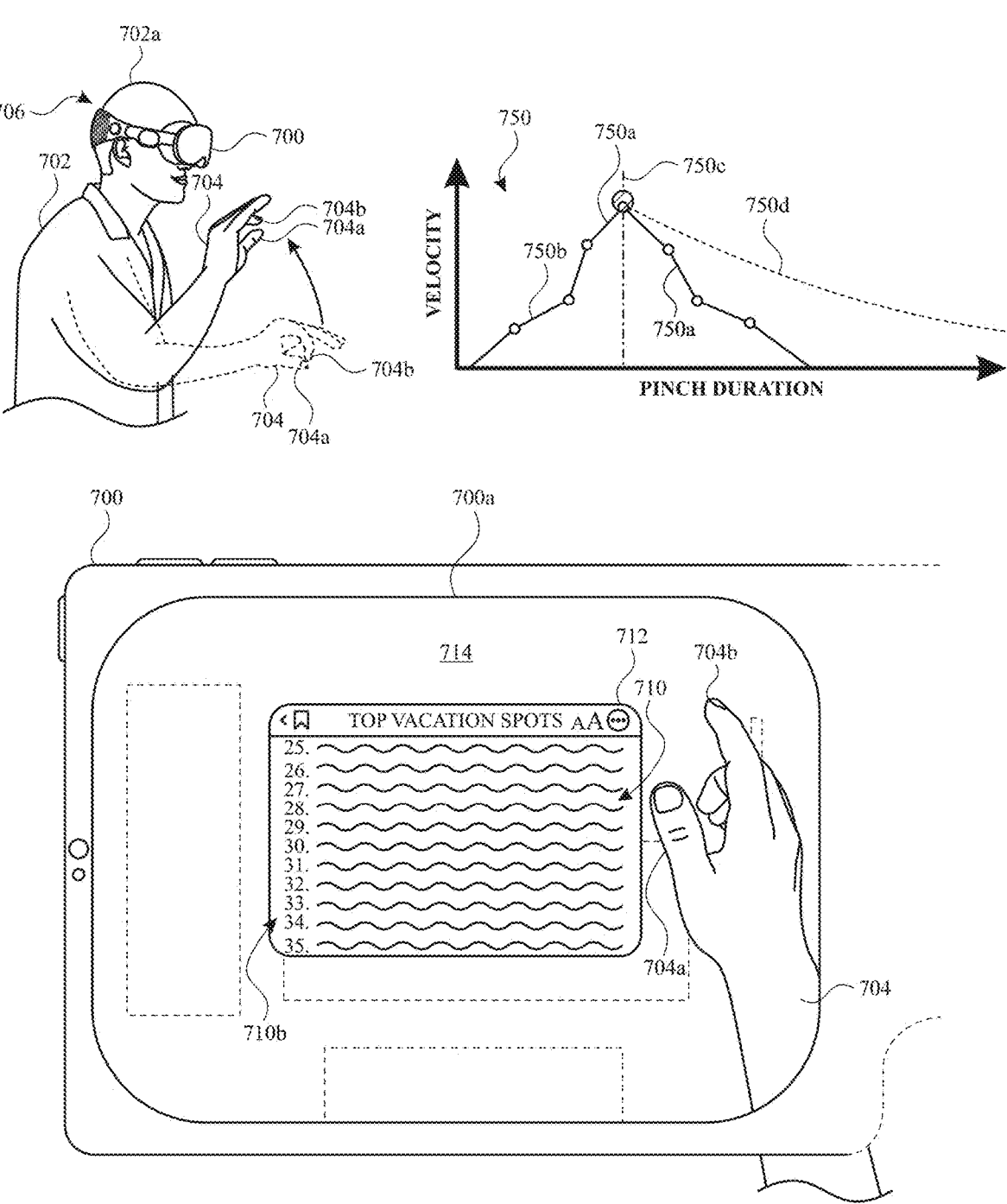

Turning to FIG. 7D, in response to detecting the end of the gesture and/or input based on the break in contact between fingers 704*a* and 704*b*, computer system 700 causes content 710 to move independent of movement of hand 704. For instance, graphical representation 750 includes first break velocity representation 750*d* indicating movement of content 710 that occurs after time 750*c*, which is the time at which computer system 700 detects the end of the gesture and/or input. In addition, hand velocity representation 750*a* after time 750*c* indicates that hand 704 continues to move after time 750*c*, but movement of content 710 after time 750*c* and movement of hand 704 after time 750*c* are different from one another. As such, computer system 700 causes content 710 to continue to move after time 750*c*, but movement of content 710 after time 750*c* is not based on and/or proportional to movement of hand 704 because computer system 700 detected the end of the gesture and/or input.

In some embodiments, computer system 700 causes movement of content 710 to gradually decrease to zero velocity based on a first exponential decay having a first decay rate at time 750*c*. For instance, computer system 700 applies the first exponential decay to a velocity of movement of content 710 at time 750*c*, such that the velocity of movement of content 710 gradually decreases from the velocity at time 750*c* to zero velocity. In some embodiments, the first exponential decay is an algorithm that includes multiplying the first decay rate by the velocity of movement of content 710 as a function of time. Therefore, the closer a respective decay rate is to a value of one, the longer it takes for the velocity of movement of content 710 to reach zero velocity. In some embodiments, the first decay rate of the first exponential decay includes a fixed value. While graphical representation 750 does not illustrate the velocity of movement of content 710 reaching zero velocity, it should be understood that the velocity of movement of content 710 will ultimately reach zero velocity so that content 710 stops moving.

At FIG. 7D, computer system 700 continues to cause movement of content 710, but movement of content 710 is no longer based on movement of hand 704. For instance, computer system 700 displays, via display 700*a*, items 25-35 of numbered list 710*b* of content 710, which is further down list when compared to numbered list 710*b* shown at FIG. 7C (e.g., FIG. 7C illustrates items 5-15 of numbered list 710*b*). Thus, computer system 710 continues to move content 710 after detecting the end of the gesture and/or input. As set forth above, computer system 700 eventually causes content 710 to stop moving and/or causes the velocity of movement of content 710 to reach zero based on the first exponential decay.

At FIGS. 7B-7D, computer system 700 detects the end of the gesture and/or input at time 750*c*, which corresponds to a maximum velocity of hand 704 (e.g., as indicated by a peak of hand velocity representation 750*a*). In some embodiments, computer system 700 performs a scroll gesture that closely matches an expectation of user 702 when the end of the gesture and/or input is detected at time 750*c*. For instance, causing movement of content 710 based on movement of hand 704 up until time 750*c*, and then causing movement of content 710 based on the first exponential decay after time 750*c*, causes content to move by an amount and/or at a velocity that closely matches what the user intends. In some embodiments, computer system 700 performs the scroll that closely matches the expectation of user 702 when computer system 700 detects the end of the gesture and/or input within a predefined time range of time 750*c* (e.g., within 10 milliseconds, within 20 milliseconds, within 30 milliseconds, within 40 milliseconds, within 50 milliseconds, or within 100 milliseconds of time 750*c*). However, in some instances, computer system 700 detects the end of the gesture and/or input before or after time 750*c* (e.g., before and/or after the predefined time range of time 750*c*) and/or sensors of computer system 700 are unable to determine whether the end of the gesture and/or input occurred due to occlusion of fingers 704*a* and/or 704*b*. In order to improve the user experience during interactions with virtual objects (e.g., avoid abrupt stoppages of movement of content 710 and/or avoid overshoots in movement of content 710), computer system 700 is configured to cause movement of content 710 with various exponential decays having respective decay rates at different times when computer system 700 detects the end of the gesture and/or input before or after time 750*c* and/or when computer system 700 is unable to detect the end of the gesture and/or input at time 750*c*.

Figure 7E:
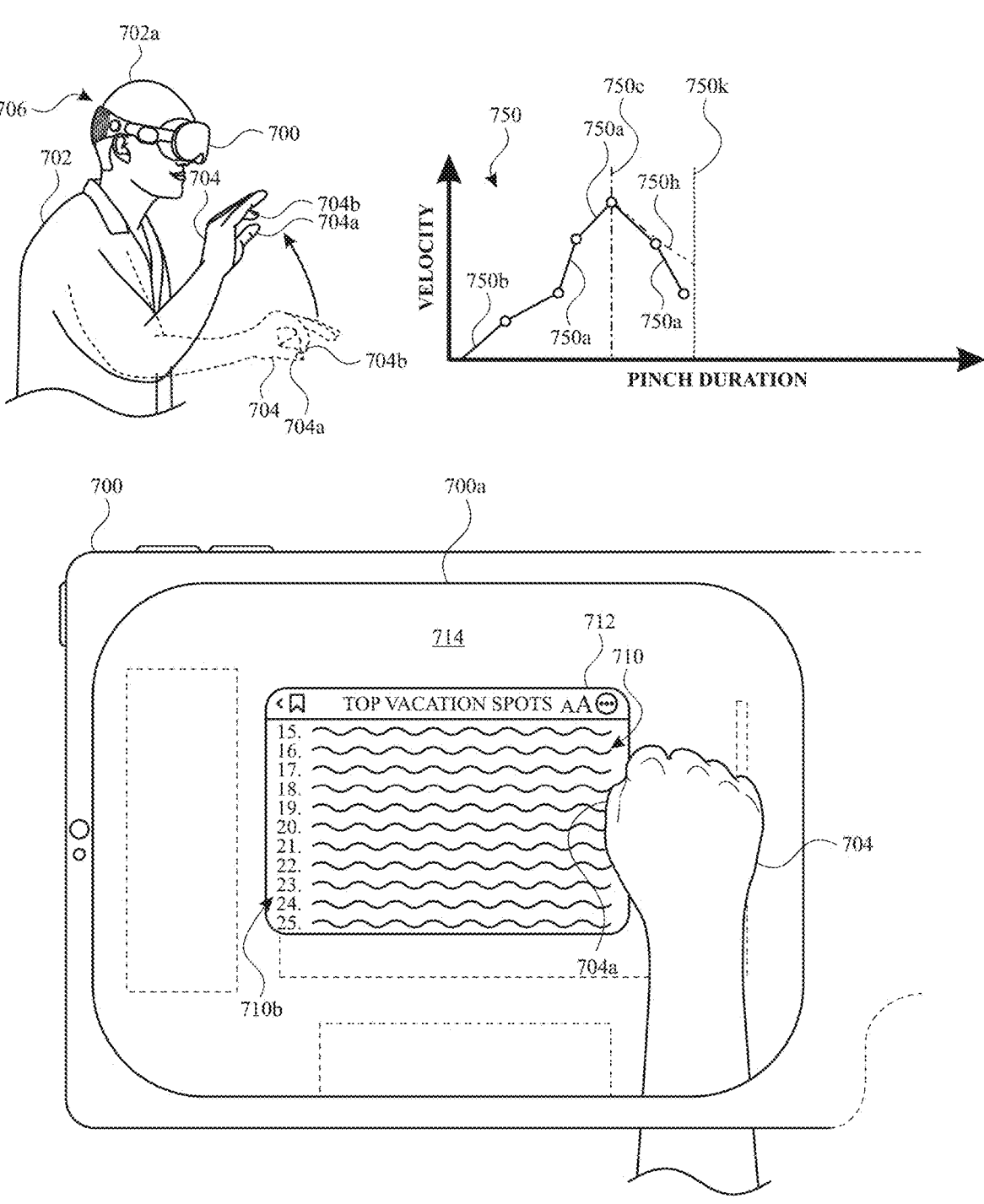

For instance, at FIG. 7E, computer system 700 initially detected first movement 716*a* and second movement 716*b* of hand 704 of user 702 while fingers 704*a* and 704*b* were in the predetermined position. Accordingly, computer system 700 caused content 710 to move based on movement of hand 704, as indicated by virtual object velocity representation 750*b* overlapping with hand velocity representation 750*a* in graphical representation 750 up to time 750*c*. However, at time 750*c*, computer system 700 was unable to detect, via one or more sensors, fingers 704a and 704b of hand 704 of user 702. For instance, as shown at FIG. 7E, hand 704 of user 702 is positioned in such a manner that fingers 704a and 704b are covered and/or blocked by a back portion of hand 704. One or more sensors of computer system 700 were unable to obtain information related to whether fingers 704a and 704b remained in the predetermined position at time 750c and/or whether fingers 704a and 704b were no longer in the predetermined position at time 750c. Because computer system 700 could not determine the positions of fingers 704a and 704b relative to one another at time 750c, computer system 700 causes content 710 to move independent of movement of hand 704 at time 750c.

In some embodiments, computer system 700 causes content 710 to move independent of movement of hand 704 at time 750c even when computer system 700 directly detects fingers 704a and 704b in the predetermined position relative to one another. In some such embodiments, the computer system 700 determines that user 702 intended to request an end of the gesture and/or input, but user 702 inadvertently maintained fingers 704a and 704b in the predetermined position. Causing the content 710 to move independent of movement of hand 704 even when fingers 704a and 704b are directly detected in the predetermined position enables computer system 700 to prevent abrupt stoppages of movement of content 710, thereby improving the user experience when interacting with virtual object 712.

At FIG. 7E, when computer system 700 is unable to directly determine the relative positions of fingers 704a and 704b at time 750c and/or when computer system 700 directly detects that fingers 704a and 704b are in the predetermined position at time 750c, computer system 700 causes content 710 to move with the fourth exponential decay at time 750c, as indicated by fourth break velocity representation 750h of graphical representation 750. As shown at FIG. 7E, computer system 700 causes movement of content 710 to gradually decrease to zero velocity based on the fourth exponential decay and independent of movement of hand 704. For instance, computer system 700 applies the fourth exponential decay to a velocity of content 710 at time 750c, such that the velocity of movement of content 710 gradually decreases from the velocity at time 750c to zero velocity. In some embodiments, the fourth exponential decay is an algorithm that includes multiplying a fourth decay rate of the fourth exponential decay by the velocity of movement of content 710 as a function of time. In some embodiments, the fourth decay rate of the fourth exponential decay is less than the first decay rate of the first exponential decay. In some embodiments, the fourth decay rate is closer to zero than the first decay rate. In some embodiments, the first decay rate is closer to one than the fourth decay rate. Accordingly, when computer system 700 causes content 710 to move based on the fourth exponential decay, movement of content 710 will reach zero velocity faster when compared to causing content 710 to move based on the first exponential decay.

In some embodiments, the fourth decay rate of the fourth exponential decay is a fixed decay rate. In some embodiments, the fourth decay rate of the fourth exponential decay is adjusted, modified, and/or changed based on movement of hand 704. For instance, in some embodiments, computer system 700 adjusts the fourth decay rate based on changes in velocity, changes in acceleration, changes in direction, and/or changes in position of hand 704 that occur after time 750c. In some embodiments, computer system 700 decreases the fourth decay rate when the velocity of movement of hand 704 decreases to zero velocity in a relatively short amount of time (e.g., indicating that user 702 intends to quickly stop movement of content 710).

Computer system 700 applies a different exponential decay when computer system 700 is unable to directly determine the relative positions of fingers 704a and 704b at time 750c and/or when computer system 700 directly detects that fingers 704a and 704b are in the predetermined position at time 750c, so that computer system 700 does not cause content 710 to move by an amount that exceeds what user 702 intended. For instance, in some embodiments, user 702 intends to stop movement of content 710 relatively quickly (e.g., such as when user 702 intends to perform a drag operation instead of a scroll operation). When computer system 700 is unable to directly determine the relative positions of fingers 704a and 704b at time 750c and/or when computer system 700 directly detects that fingers 704a and 704b are in the predetermined position at time 750c, computer system 700 causes movement of content 710 to slow more rapidly (e.g., as compared to causing movement of content 710 based on the first exponential decay) to provide a buffer of time so that computer system 700 can obtain additional information (e.g., via one or more sensors) indicative of what user 702 actually intends. As set forth below with reference to FIG. 7F, computer system 700 causes content 710 to move based on fourth exponential decay for a predetermined period of time (e.g., a predetermined period of time that ends before the velocity of movement of content 710 reaches zero velocity), thereby enabling computer system 700 to receive additional information and ultimately perform an operation that more closely matches the intent of user 702.

While graphical representation 750 does not illustrate the velocity of movement of content 710 based on the fourth exponential decay reaching zero velocity, it should be understood that the velocity of movement of content 710 based on the fourth exponential decay would ultimately reach zero at some point if computer system 700 were to continue to cause movement of content 710 based on the fourth exponential decay indefinitely. However, as set forth below with reference to FIG. 7F, computer system 700 ceases causing movement of content 710 based on the fourth exponential decay before the velocity of movement of content 710 reaches zero velocity.

At FIG. 7E, computer system 700 displays items 15-25 of numbered list 710b of content 710 at time 750k, indicating that computer system 700 causes movement of content 710 to slow more quickly when computer system 700 causes movement of content 710 based on the fourth exponential decay.

Figure 7F:
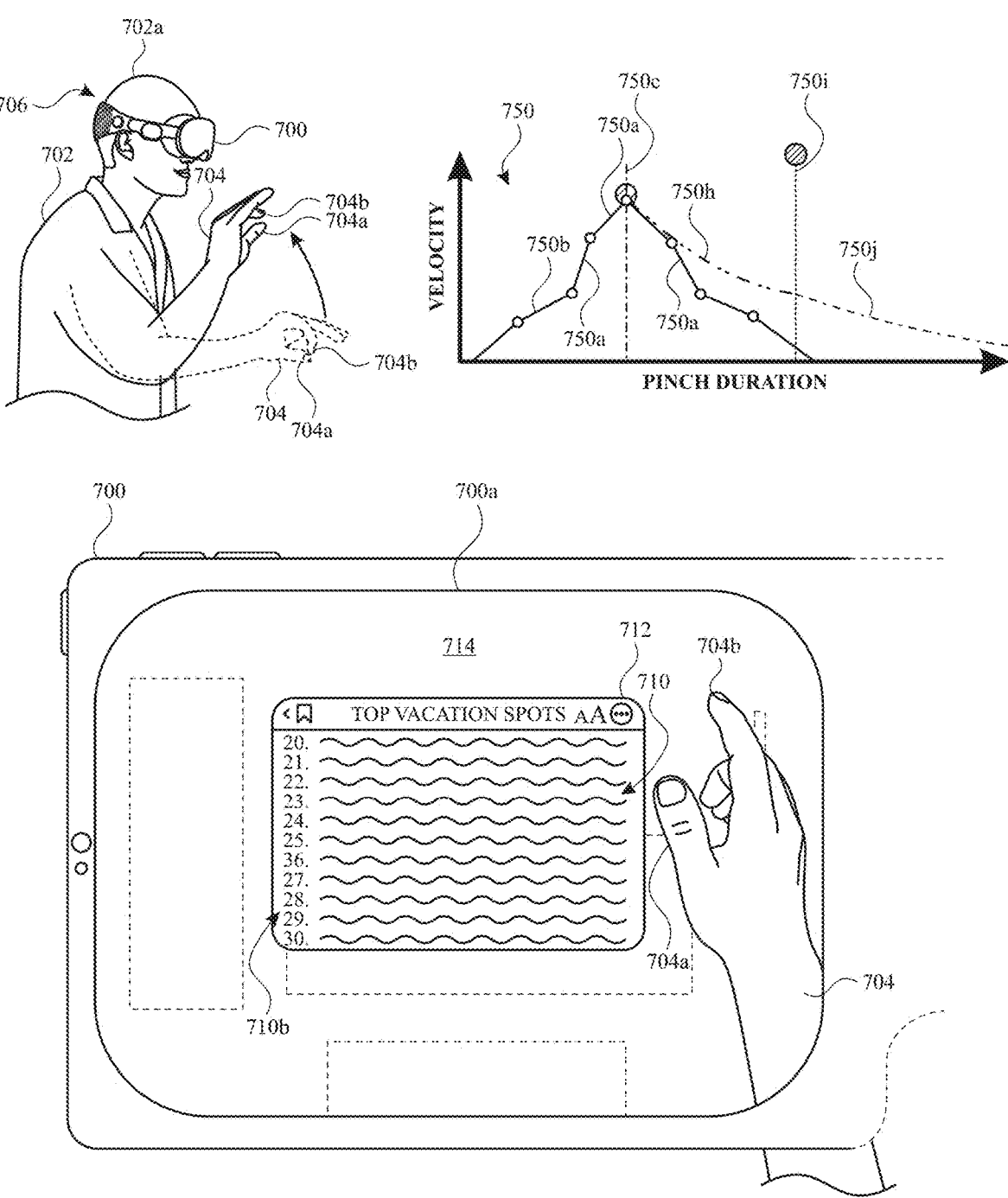

As set forth above, computer system 700 causes movement of content 710 based on the fourth exponential decay for a predetermined period of time. For instance, at FIG. 7F, computer system 700 has detected a request to end the gesture and/or input at time 750i. At time 750i, computer system 700 detects that fingers 704a and 704b are no longer in the predetermined position (e.g., fingers 704a and 704b are not pinched, not in contact with one another, and/or positioned further than a threshold distance away from one another), indicating an end of the gesture and/or input. As shown at FIG. 7F, hand 704 of user 702 is positioned in such a manner that fingers 704a and 704b are no longer covered and/or blocked by a back portion of hand 704. As such, one or more sensors of computer system 700 are able to detect and obtain information related to the relative positions of fingers 704a and 704b at time 750i.

In response to detecting the end of the gesture and/or input, computer system 700 transitions from causing movement of content 710 based on the fourth exponential decay to causing movement of content 710 based on the first exponential decay, as indicated by fifth break velocity representation 750*j*. For instance, at time 750*i*, graphical representation 750 indicates that computer system 700 transitions the decay rate applied to movement of content 710 from the fourth decay rate to the first decay rate, thereby causing movement of content 710 at time 750*i* to decrease (e.g., decrease to zero velocity) more slowly as compared to movement of content 710 before time 750*i*. Computer system 700 causes movement of content 710 based on the first exponential decay to continue from time 750*i* until a time at which the velocity of movement of content 710 reaches zero velocity (e.g., content 710 stops moving).

As shown at FIG. 7F, computer system 700 displays, via display 700*a*, items 20-30 of numbered list 710*b* of content 710. As set forth above, movement of content 710 decreases to zero velocity more quickly when computer system 700 causes movement of content 710 based on the fourth exponential decay (e.g., as compared to causing movement of content based on the first exponential decay). Because computer system 700 caused movement of content 710 based on the fourth exponential decay from time 750*c* to time 750*i*, computer system 700 causes content 710 to move by an amount that is less than an amount when computer system 700 causes movement of content 710 based on first exponential decay from time 750*c* until a time at which the velocity of movement of content 710 reaches zero velocity. Thus, computer system 700 displays items 20-30 of numbered list 710*b* of content 710 at FIG. 7F, indicating that computer system 700 moved content 710 by a lesser amount as compared to FIG. 7D (e.g., where computer system 700 displays items 25-35 of numbered list 710*b* of content 710 because computer system 700 caused movement of content 710 based on the first exponential decay from time 750*c* to a time at which the velocity of movement of content 710 reaches zero velocity).

In some embodiments, at time 750*i* and/or at another time after time 750*c*, computer system 700 detects that fingers 704*a* and 704*b* remain in the predetermined position relative to one another. In some such embodiments, computer system 700 transitions from causing movement of content 710 based on the fourth exponential decay to causing movement of content 710 based on movement of hand 704. In some embodiments, computer system 700 forgoes causing movement of content 710 based on the first exponential decay when computer system detects that fingers 704*a* and 704*b* remain in the predetermined position relative to one another after time 750*c* and/or another time at which the velocity of movement of hand 704 reaches a maximum velocity.

Figure 7G:
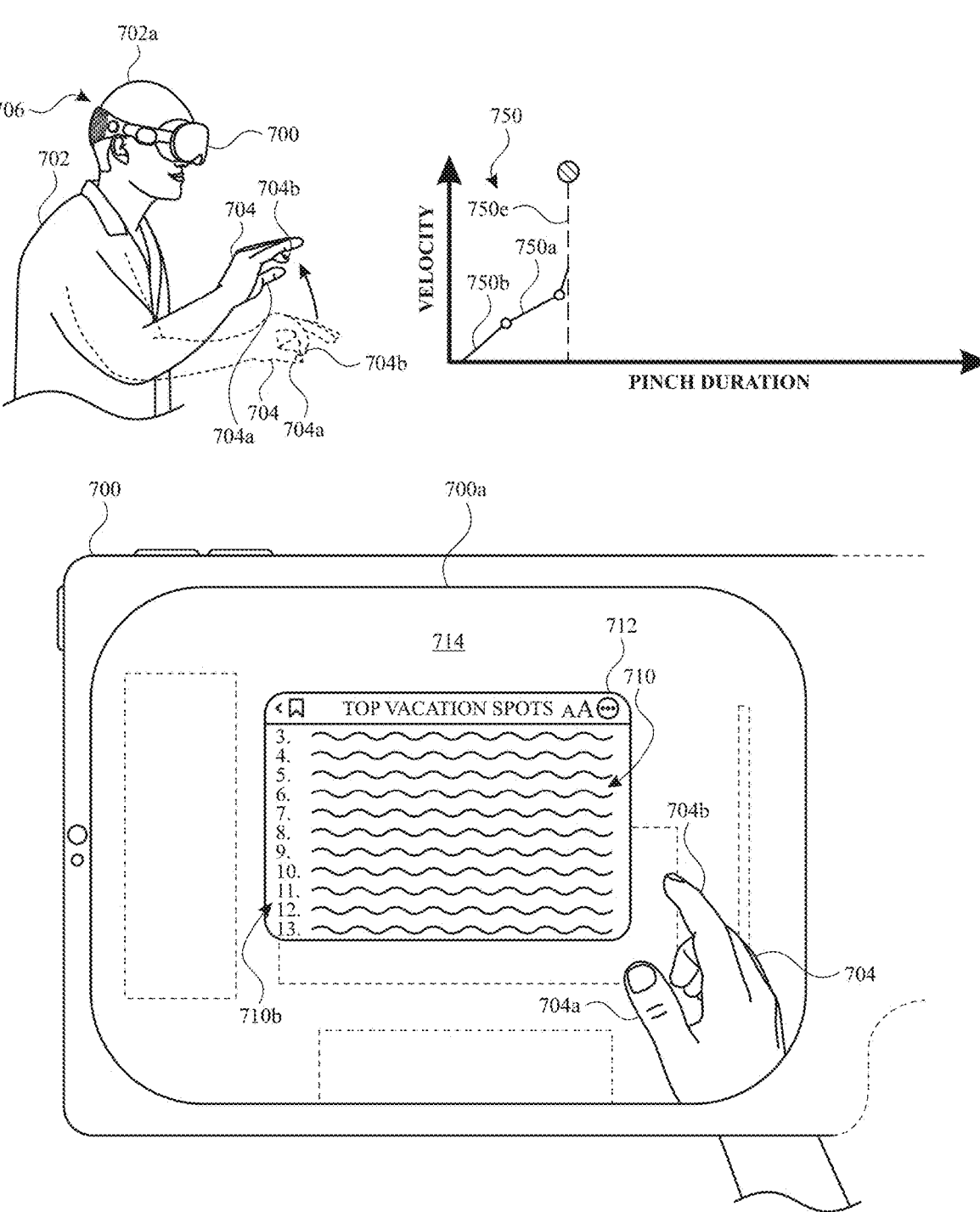

Computer system 700 is also configured to adjust a time at which movement of content 710 is based on exponential decay as opposed to being based on movement of hand 704. In some embodiments, computer system 700 causes movement of content 710 based on exponential decay at different times when computer system 700 detects an end of the gesture and/or input before time 750*c*. For instance, at FIG. 7G, computer system 700 detects the end of the gesture and/or input at time 750*c*, which is a time that occurs before time 750*c*. Prior to detecting the end of the gesture and/or input at time 750*e*, computer system 700 detected the gesture and/or input, as set forth above with reference to FIG. 7B. At FIG. 7G, computer system 700 detects a request to end the gesture and/or input at time 750*e*. For instance, at time 750*c*, computer system 700 detects that fingers 704*a* and 704*b* are no longer in the predetermined position (e.g., fingers 704*a* and 704*b* are not pinched, not in contact with one another, and/or positioned further than a threshold distance away from one another), indicating an end of the gesture and/or input. As shown at FIG. 7G, hand 704 of user 702 is positioned in such a manner that fingers 704*a* and 704*b* are not covered and/or blocked by a back portion of hand 704. As such, one or more sensors of computer system 700 are able to detect and obtain information related to the relative positions of fingers 704*a* and 704*b* at time 750*c*.

Figure 7H:
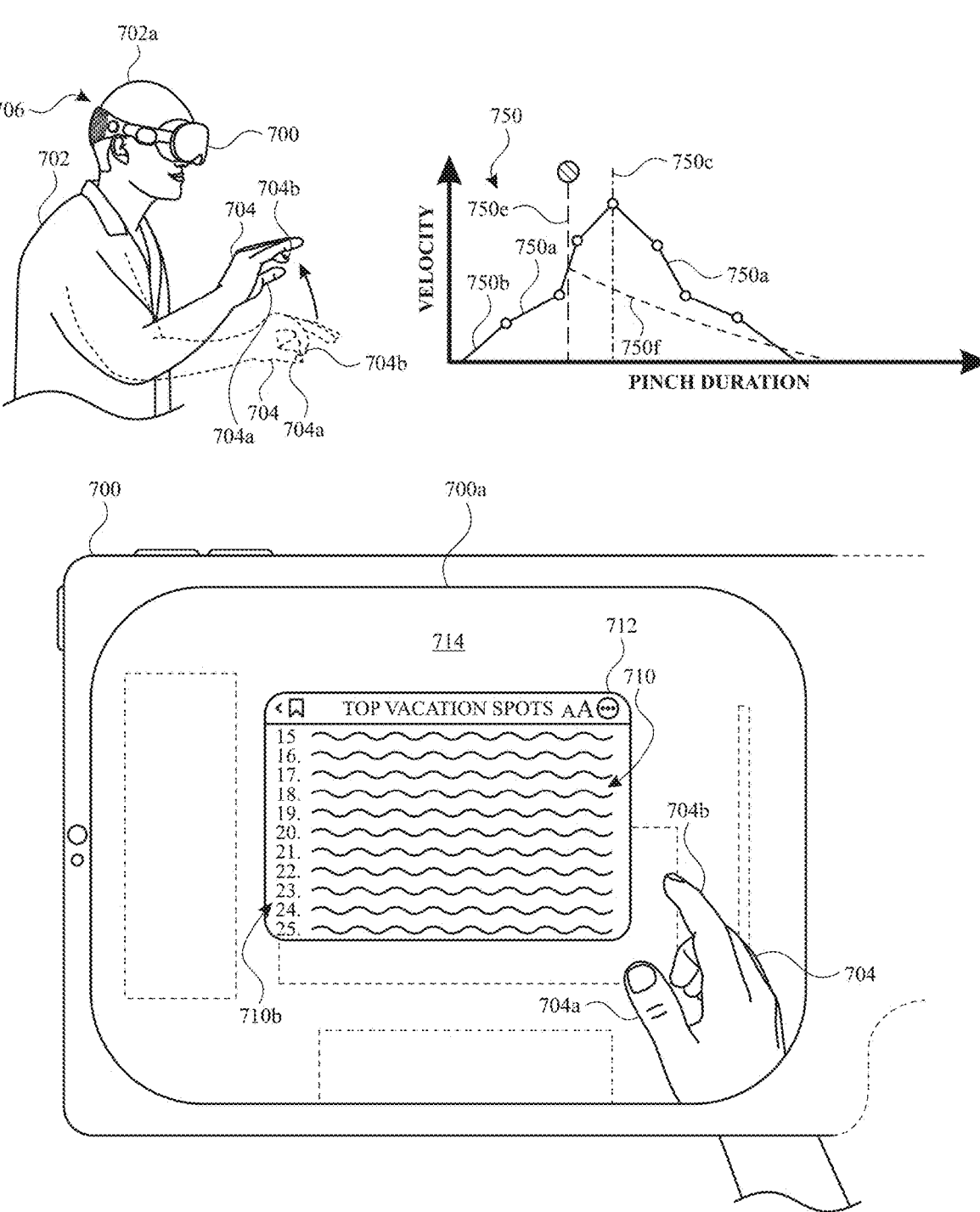
Figure 7I:
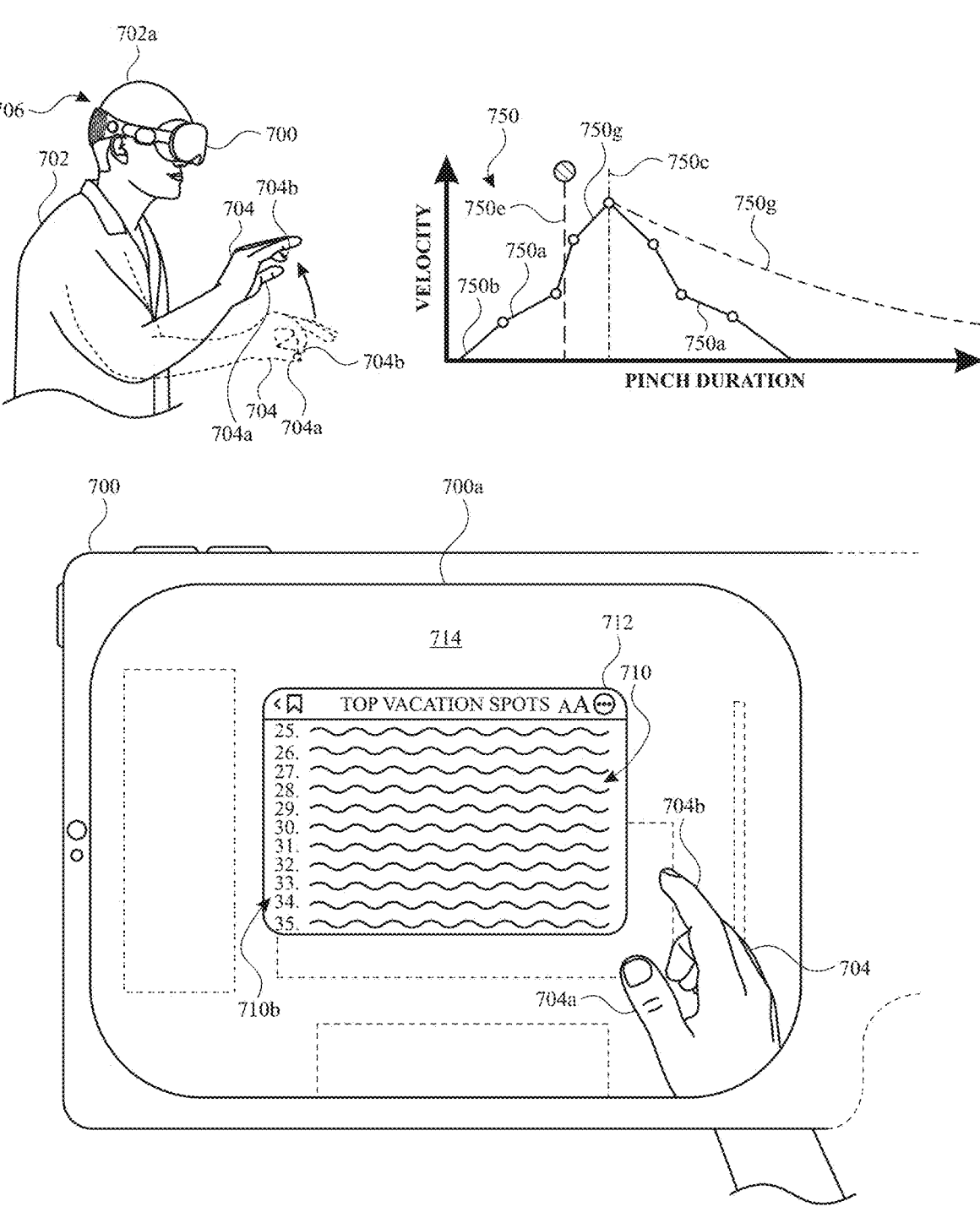

In response to detecting the end of the gesture and/or input, computer system 700 causes movement of content 710 based on the second exponential decay at time 750*c* or the third exponential decay at time 750*c*, as shown at FIGS. 7H and 7I.

At FIG. 7H, computer system 700 causes movement of content 710 based on the second exponential decay at time 750*e*, which is the time at which computer system 700 detected the end of the gesture and/or input. As shown at FIG. 7H, graphical representation 750 includes second break velocity representation 750*f* indicating movement of content 710 caused by computer system 700 at time 750*c*. Second break velocity representation 750*f* indicates that movement of content 710 caused by computer system 700 at time 750*e* and after time 750*c* is independent of movement of hand 704, as indicated by hand velocity representation 750*a* after time 750*c*. For instance, after time 750*c*, second break velocity representation 750*f* does not mirror and/or overlap with hand velocity representation 750*a*, thereby indicating that movement of content 710 after time 750*e* is independent of movement of hand 704.

As set forth above, computer system 700 causes movement of content 710 to gradually decrease from a velocity of movement of content 710 at time 750*e* to zero velocity based on the second exponential decay, which includes a second decay rate. In some embodiments, the second exponential decay and/or the second decay rate are the same as the first exponential decay and/or the first decay rate, but the second exponential decay and/or the second decay rate are applied at a different velocity of movement of content 710 and/or at a different time (e.g., time 750*e* instead of time 750*c*). When computer system 700 causes content 710 to move based on the second exponential decay at time 750*e*, the velocity of movement of content 710 will reach zero velocity before movement of content 710 based on the first exponential decay applied at time 750*c*. This occurs because the velocity of movement of content 710 at time 750*c* is less than a velocity of movement of content 710 at time 750*c*.

At FIG. 7H, computer system 700 displays, via display 700*a*, items 15-25 of numbered list 710*b* of content 710. When computer system 700 causes movement of content 710 based on the second exponential decay at time 750*e*, content 710 moves by an amount that is less than an amount when computer system 700 causes movement of content 710 based on the first exponential decay at time 750*c*. For instance, at FIG. 7D, computer system 700 displays items 25-35 of ordered list 710*b* of content 710, whereas computer system 700 displays items 15-25 of ordered list 710*b* of content 710, at FIG. 7H.

In some embodiments, computer system 700 delays causing movement of content 710 based on exponential decay in response to detecting the end of the user input at time 750*c*. For instance, at FIG. 7I, computer system 700 continues to cause movement of content 710 based on movement of hand 704 until computer system 700 detects a maximum velocity of hand 704. As shown at FIG. 7I, graphical representation 750 includes third break velocity representation 750*g* overlapping with hand velocity representation 750*a* from time 750*e* to time 750*c*. As such, computer system 700 continues to cause movement of content 710 that is proportionate to movement of hand 704 even after detecting the end of the gesture and/or input at time 750*c*.

At FIG. 7I, when computer system 700 detects the maximum velocity of hand 704 at time 750*c*, as indicated by the peak of hand velocity representation 750*a*, computer system 700 causes content 710 to move independent of movement of hand 704. For instance, third break velocity representation 750*g* of graphical representation 750 no longer overlaps with hand velocity representation 750*a* after time 750*c*, thereby indicating that movement of content 710 is independent of movement of hand 704.

When computer system 700 detects the maximum velocity of hand 704 at time 750*c*, computer system 700 causes content 710 to move based on the third exponential decay having a third decay rate. In some embodiments, the third exponential decay and/or the third decay rate are the same as the first exponential decay and/or the first decay rate. In some such embodiments, computer system 700 causes movement of content 710 based on the third exponential decay rate to reach zero velocity at the same time as movement of content 710 based on the first exponential decay (e.g., because they both are the same exponential decay with the same decay rate and applied at the same time and same velocity of movement of content 710). In some embodiments, the third exponential decay and/or the third decay rate are different from the first exponential decay and/or the first decay rate. In some embodiments, the third exponential decay and/or the third decay rate cause movement of content 710 to reach zero velocity faster when compared to the first exponential decay and/or the first decay rate (e.g., when applied at the same time and at the same velocity of movement of content 710).

At FIG. 7I, computer system 700 displays, via display 700*a*, items 25-35 of numbered list 710*b* of content 710. As such, the third exponential decay is the same as the first exponential decay, and thus computer system 700 causes content 710 to move by the same amount as compared to FIGS. 7B-7D.

As set forth above, in some embodiments, computer system 700 does not receive enough information (e.g., from one or more sensors of computer system 700) to determine a type of gesture and/or input for which user 702 intends to perform. In some embodiments, computer system 700 is able to utilize contextual information to perform an operation that is estimated and/or determined to be consistent with user intent. For instance, FIGS. 7J-7L include embodiments in which computer system 700 uses information related to a gaze of user 702 to determine which operation to perform. In some embodiments, computer system 700 additionally or alternatively utilizes information associated with one or more previous gestures and/or inputs performed by user 702, information associated with an acceleration, velocity, and/or speed of movement of a body part of user 702, information associated with a direction of movement of a body part of user 702, information associated with changes in acceleration, velocity, speed, and/or direction of movement of a body part of a user 702, and/or positional information of one or more body parts of user 702 relative to one another to determine which operation to perform when computer system 700 does not receive sufficient information about hand 704, finger 704*a*, and/or finger 704*b*.

Figure 7J:
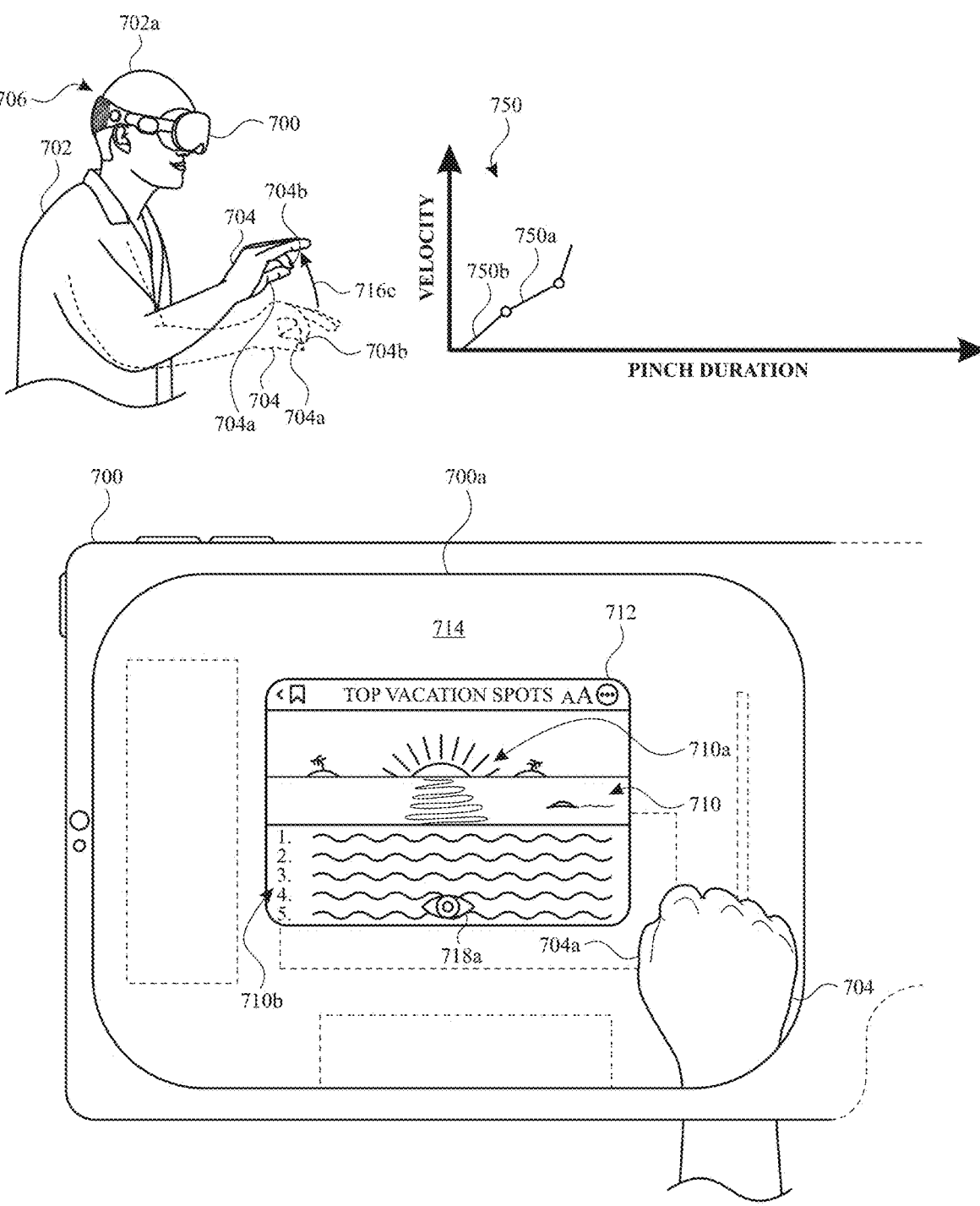

At FIG. 7J, computer system 700 displays, via display 700*a*, virtual object 712 including content 710. While computer system 700 displays content 710, computer system 710 detects third movement 716*c* of hand 704 of user 702. In some embodiments, a velocity associated with third movement 716*c* of hand 704 is not indicative of whether user 702 intends to perform a first operation, such as a scroll operation, or a second operation, such as a drag operation. For instance, third movement 716*c* of hand includes a velocity profile that does not directly indicate that user 702 intends to perform a scroll operation or a drag operation. In some embodiments, the velocity profile of third movement 716*c* includes velocities that are less than velocities associated with a scroll gesture and/or includes velocities that are greater than velocities associated with a drag gesture.

At FIG. 7J, hand 704 of user 702 is positioned in such a manner that fingers 704*a* and 704*b* are covered and/or blocked by a back portion of hand 704. Therefore, one or more sensors of computer system 700 are unable to obtain information related to the relative positions of fingers 704*a* and 704*b* with respect to one another. In some embodiments, hand 704 of user 702 was positioned so that computer system 700 detected that fingers 704*a* and 704*b* were in the predetermined position prior to detecting third movement 716*c*. In some embodiments, hand 704 of user 702 was in the same position illustrated in FIG. 7J at the time at which computer system 700 detected third movement 716*c*.

At FIG. 7J, computer system 700 receives information associated with a gaze of user 702, as indicated by first gaze representation 718*a*, based on the absence of information related to fingers 704*a* and 704*b* and/or the absence of information indicating the type of operation requested by user 702. In some embodiments, computer system 700 includes one or more sensors that are configured to detect one or more portions of eyes of user 702 to determine and/or estimate a location at which the eyes of user 702 are looking and/or directed to with respect to display 700*a*. As set forth below, computer system 700 can estimate and/or determine whether user 702 intends to perform a first operation, such as a scroll operation, or a second operation, such as a drag operation, based on the detected gaze of user 702.

Figure 7K:
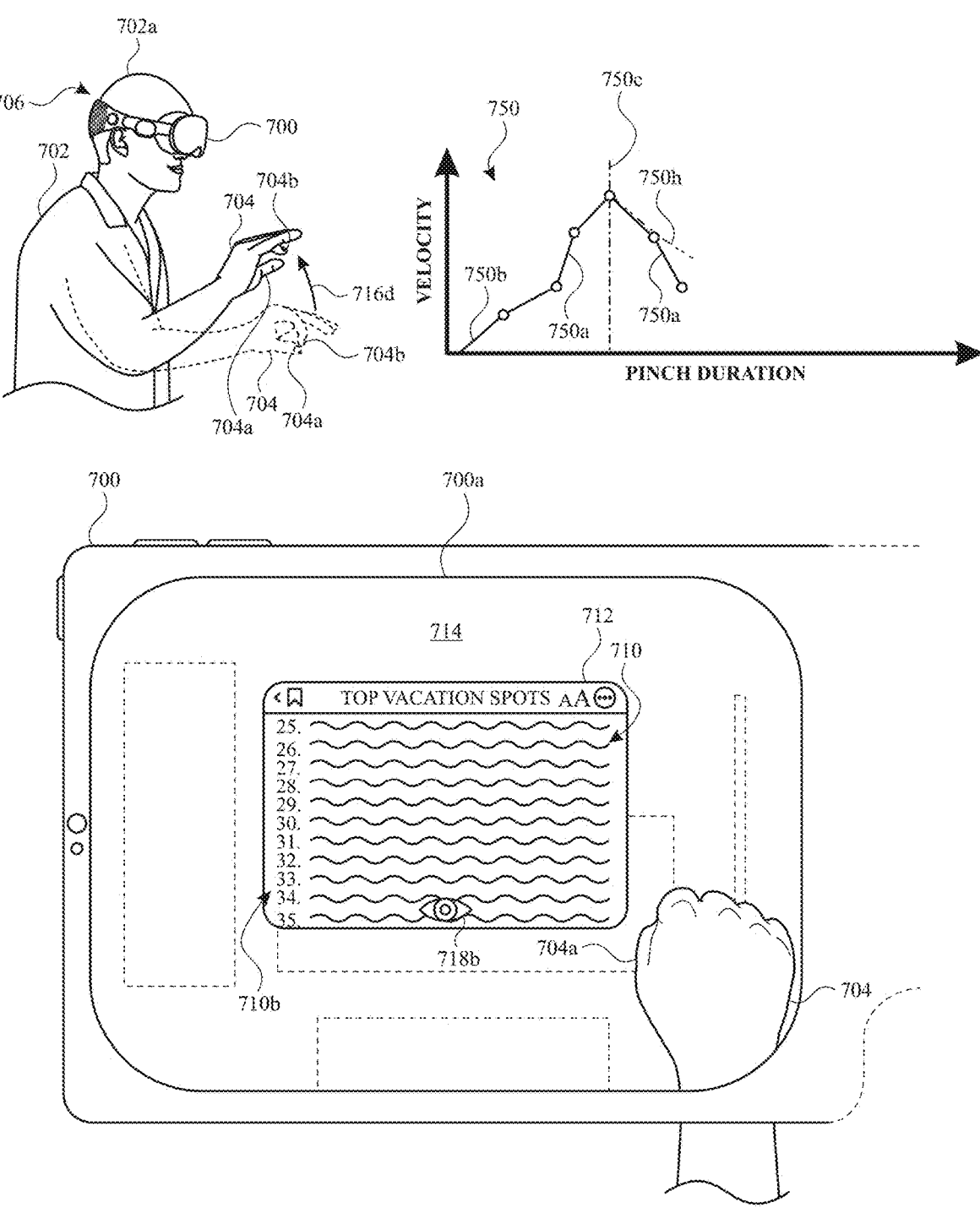

At FIG. 7K, computer system 700 detects fourth movement 716*d* of hand 704 of user 702 indicating that user 702 is requesting to move content 710 with respect to display 700*a*. As such, computer system 700 causes movement of content 710, as shown by items 25-35 of numbered list 710*b* being displayed at FIG. 7K instead of image 710*a* and items 1-5 of numbered list 710*b* shown at FIG. 7J. In some embodiments, computer system 700 uses the information associated with the gaze of user 702 to determine an amount and/or velocity by which content 710 is moved.

After initiating movement of content 710, computer system 700 receives information about the gaze of user 702 and whether the gaze of user 702 is tracking the movement of content 710 or whether the gaze of user 702 is not tracking the movement of content 710 (e.g., the gaze of user 702 is not tracking the movement of content 710 indicates that user 702 is not paying close attention to what portions of content 710 is displayed, but rather indicating that user 702 is looking through content 710 at representation of physical environment 714). For instance, at FIG. 7K, computer system 700 detected the gaze of user 702, as indicated by second gaze indicator 728*b*, after initiating movement of content 710 and determined that the gaze of user 702 remained relatively stationary relative to display 700*a*. For instance, second gaze indicator 718*b* indicates that the gaze of user 702 is directed to a location relative to display 700*a* that is the same as (or approximately the same as) the gaze of user 702 prior to detecting fourth movement 716*d*, as indicated by first gaze indicator 718*a* at FIG. 7J. As such, computer system 700 determines that user 702 is not tracking movement of content 710. In some embodiments, a determination that the gaze of user 702 is not tracking movement of content 710 indicates that user 702 intends to cause a relatively large amount of movement of content 710 (e.g., perform a scroll operation). Based on the determination that user 702 is not tracking movement of content 710, computer system 700 performs a scroll operation so that content 710 is moved by a relatively large amount and at a relatively high velocity.

Figure 7L:
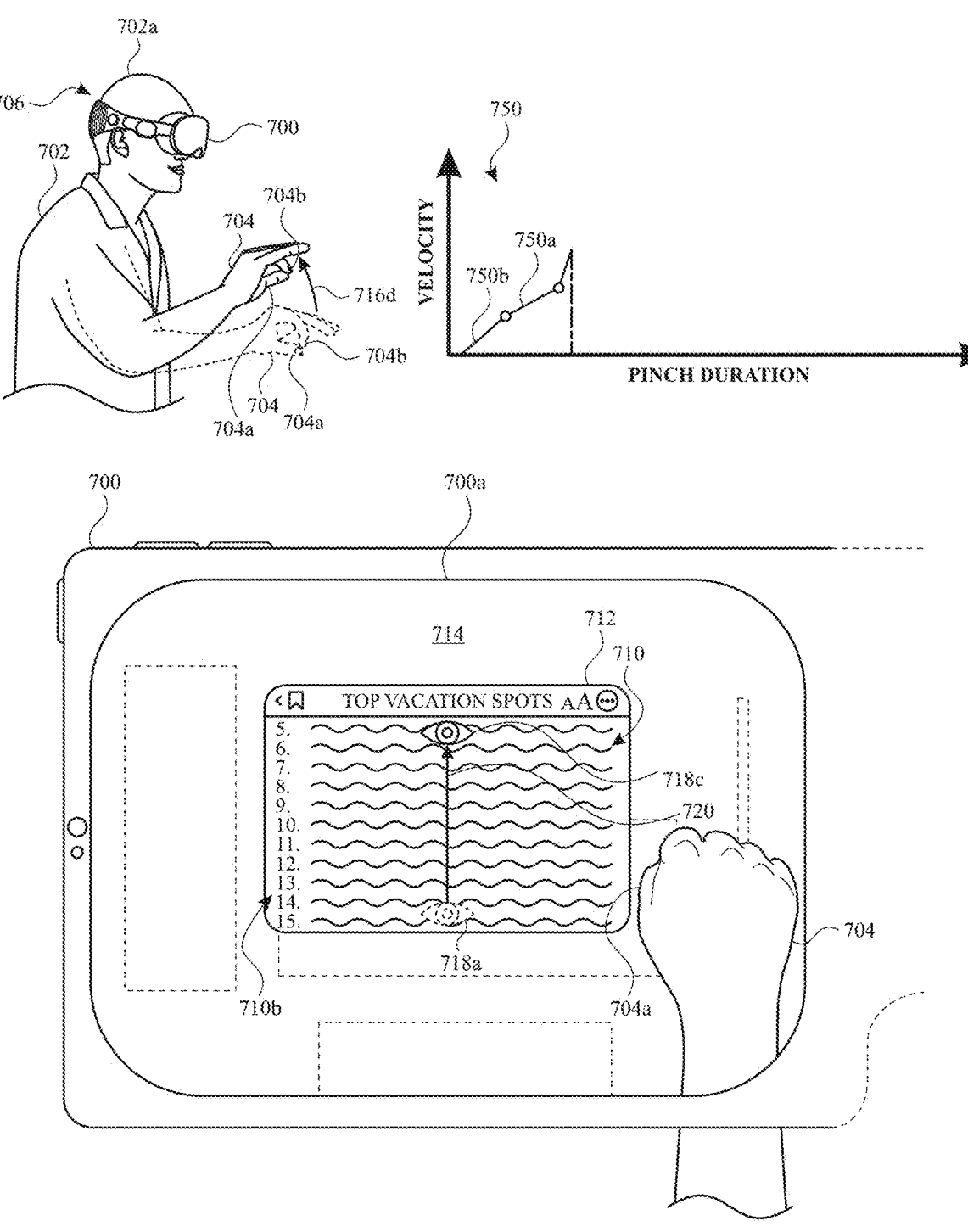

Alternatively, at FIG. 7L, after initiating movement of content 710, computer system 700 detected the gaze of user 702, as indicated by third gaze indicator 728c, and determined that the gaze of user 702 has moved relative to display 700a (e.g., as indicated by arrow 720). For instance, third gaze indicator 718c indicates that the gaze of user 702 is directed to a location relative to display 700a that is substantially different from the gaze of user 702 prior to detecting fourth movement 716d, as indicated by first gaze indicator 718a at FIG. 7J. As such, computer system 700 determines that user 702 is tracking movement of content 710. In some embodiments, a determination that the gaze of user 702 is tracking movement of content 710 indicates that user 702 intends to cause a relatively small amount of movement of content 710 (e.g., perform a drag operation). Based on the determination that user 702 is tracking movement of content 710, computer system 700 performs a drag operation so that content 710 is moved by a relatively small amount and at a relatively low velocity.

In some embodiments, computer system does not cause movement of virtual object 712 and/or content 710 of virtual object 712 to move independent of movement of hand 704 even when computer system 700 determines that the end of the gesture and/or input occurred and/or when computer system 700 cannot determine that the end of the gesture and/or input occurred. For instance, FIGS. 7M-7O illustrate that computer system 700 forgoes causing movement of content 710 independent of movement of hand 704 and movement of hand 705 when computer system 700 cannot determine whether the end of the gesture and/or input occurred because user 702 is performing a two-handed gesture and/or input.

At FIG. 7M, computer system detects hand 704 and hand 705 of user 702. Fingers 704a and 704b of hand 704 are in the predetermined position in that fingers 704a and 704b are pinched, in contact with one another, and/or positioned within a threshold distance relative to one another. Fingers 705a and 705b of hand 705 are also in the predetermined position in that fingers 705a and 705b are pinched, in contact with one another, and/or positioned within a threshold distance relative to one another. At FIG. 7M, computer system 700 detects movement of hand 704 and movement of hand 705, as indicated by first hand velocity representation 750l and second hand velocity representation 750m of graphical representation 750, respectively. Hand 704 and hand 705 are moving away from each other, thereby indicating that user 702 intends to perform a zoom operation.

In response to detecting movement of hand 704 and movement of hand 705, computer system 700 initiates a zoom operation and enlarges content 710 of virtual object 712, as shown at FIG. 7N. At FIG. 7N, hand 704 of user 702 is positioned in such a manner that fingers 704a and 704b are covered and/or blocked by a back portion of hand 704. Therefore, one or more sensors of computer system 700 are unable to obtain information related to the relative positions of fingers 704a and 704b with respect to one another. In addition, hand 705 of user 702 is positioned in such a manner that fingers 705a and 705b are covered and/or blocked by a back portion of hand 705. Therefore, one or more sensors of computer system 700 are unable to obtain information related to the relative positions of fingers 705a and 705b with respect to one another.

At FIG. 7N, computer system 700 continues to detect movement of hand 704 and movement of hand 705 away from one another, as indicated by first hand velocity representation 750l and second hand velocity representation 750m of graphical representation 750, respectively. In addition, computer system 700 detects that the velocity of movement of hand 704 reaches a first maximum velocity and the velocity of movement of hand 705 reaches a second maximum velocity.

At FIG. 7O, computer system 700 continues to detect movement of hand 704 and movement of hand 705 away from one another after both movements have reached their maximum velocities, as indicated by first hand velocity representation 750l and second hand velocity representation 750m of graphical representation 750, respectively. However, because computer system 700 is unable to obtain information relative to fingers 704a and 704b and/or information relative to fingers 705a and 705b, computer system 700 causes movement of content to stop, as indicated by virtual object velocity representation 750n of graphical representation 750. Thus, even though computer system 700 determines that movement of hand 704 reaches the first maximum velocity and that movement of hand 705 reaches the second maximum velocity, computer system 700 does not cause movement of content 710 independent of movement of hands 704 and 705 because the gesture and/or input being performed by user 702 includes both hands 704 and 705.

While FIGS. 7M-7O illustrate both hands 704 and 705 in positions in which one or more sensors of computer system 700 cannot obtain information about fingers 704a, 704b, 705a, and 705b, in some embodiments, computer system 700 forgoes causing movement of content 710 when information about fingers of one hand (instead of both hands) cannot be captured and/or detected by sensors of computer system 700 and user 702 is performing a gesture and/or input using both hands 704 and 705.

Additional descriptions regarding FIGS. 7A-7O are provided below in reference to method 800 described with respect to FIG. 8.

FIG. 8 is a flow diagram of an exemplary method 800 for interacting with virtual objects, in some embodiments. In some embodiments, method 800 is performed at a computer system (e.g., computer system 101 in FIG. 1A) (e.g., HMD 1-100, 1-200, 3-100, 6-100, 6-200, 6-300, 6-400, 11.1.1-100, and/or 11.1.2-100, and/or 700) (e.g., a smartphone, a tablet computer, a laptop computer, a desktop computer, and/or a head mounted device (e.g., a head mounted augmented reality and/or extended reality device)) that is in communication with a display generation component (e.g., display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, display/display region 6-334, and/or display 700a) (e.g., a display, a display device, a display controller, a touch-sensitive display system, a monitor, and/or a head mounted display system) and one or more input devices (e.g., sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f) (e.g., one or more cameras, a touch-sensitive surface, a keyboard, integrated and/or connected motion sensors, a controller, and/or a mouse) (in some embodiments, the computer system is in communication with one or more cameras (e.g., an infrared camera, a depth camera, and/or a visible light camera)). In some embodiments, method 800 is governed by instructions that are stored in a non-transitory (or transitory) computer-readable storage medium and that are executed by one or more processors of a computer system, such as the one or more processors 202 of computer system 101 (e.g., controller 110 in FIG. 1A). Some operations in method 800 are, optionally, combined and/or the order of some operations is, optionally, changed.

While detecting, via the one or more input devices (e.g., sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f), user interaction (e.g., first movement 716a, second movement 716b, third movement 716d, and/or fourth movement 716d) with a virtual object (e.g., 710 and/or 712) (e.g., one or more user inputs (e.g., gestures, air gestures, gaze gestures, pinch gestures, gaze and pinch gestures, touch inputs, touch and hold inputs, swipes, drags, pinches, and/or flicks) that are directed to and/or determined to be directed to a virtual object, such that the computer system performs one or more operations based on the one or more user inputs, such as moving, scrolling, swiping, translating, dragging, and/or selecting the virtual object) (in some embodiments, the user interaction includes movement of an input element, such as one or more body parts of the user, and/or contact between two or more parts of the user (e.g., contact between two or more fingers and/or contact between one or more fingers and a thumb)) (in some embodiments, the virtual object includes, e.g., a representation of content, a user interface object, a three-dimensional object, an affordance, a user interface, a representation of an application, a window, and/or a representation of a three-dimensional environment) displayed via the display generation component (e.g., 700a), wherein the user interaction (e.g., first movement 716a, second movement 716b, third movement 716d, and/or fourth movement 716d) includes first movement (e.g., 716a, 716b, 716c, and/or 716d) (e.g., physical movement) of an input element (e.g., 704, 704a, 704b, 705, 705a, and/or 705b) (e.g., one or more body parts of a user of the computer system, such as a hand, a finger, an arm, an elbow, a forearm, and/or eyes), the computer system (e.g., 700) displays (802), via the one or more input devices (e.g., sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f), second movement (e.g., 716a, 716b, 716c, 716d, and/or movement of hand 704 after time 750c) (e.g., physical movement) of the input element (e.g., 704, 704a, 704b, 705, 705a, and/or 705b), wherein the second movement (e.g., 716a, 716b, 716c, 716d, and/or movement of hand 704 after time 750c) of the input element (e.g., 704, 704a, 704b, 705, 705a, and/or 705b) is a continuation of the first movement (e.g., 716a, 716b, 716c, and/or 716d) of the input element (e.g., 704, 704a, 704b, 705, 705a, and/or 705b) (e.g., the second movement is a part of the user interaction, the second movement occurs after or later in time than the first movement, the first movement and the second movement are part of the same gesture, and/or the first movement and the second movement are included in the same trajectory of movement of the input element).

In response to detecting the second movement (e.g., 716a, 716b, 716c, 716d, and/or movement of hand 704 after time 750c) of the input element (804) (e.g., 704, 704a, 704b, 705, 705a, and/or 705b) and in accordance with a determination that a change (e.g., a detected change in direction, speed, velocity, trajectory, and/or contact between one or more body parts of the user and/or a lapse in detection of the input element) in the user interaction (e.g., first movement 716a, second movement 716b, third movement 716d, and/or fourth movement 716d) that corresponds to an ambiguous input-end event (e.g., a change in position of hand 704 and/or a change in position of fingers 704a and 704b relative to one another) (e.g., a change in the input that indicates that an end of the input may have occurred such as a break in contact between two or more body parts of a user of the computer system that is not directly detected and/or a break in contact between two or more body parts of the user of the computer system that is determined to be above a first threshold confidence level and below a second threshold confidence level) (e.g., if a state of the input element can be directly observed and either clearly indicates that the input-end event has not been detected or that the input-end event has clearly been detected such as detecting a set of fingers in a pinched or un-pinched state then the ambiguous input-end event is not detected even if motion that is characteristic of an end of an input is detected; while if the state of the input element cannot be directly observed and/or does not clearly indicate that the input end-event is detected or that the input end-event has not been detected, the ambiguous input-end event can be detected when motion that is characteristic of an end of an input is detected) was detected prior to detecting the second movement (e.g., 716a, 716b, 716c, 716d, and/or movement of hand 704 after time 750c) of the input element (e.g., 704, 704a, 704b, 705, 705a, and/or 705b) (e.g., the ambiguous input-end event occurred before the second movement of the input element is detected, after the first movement of the input element is detected, and/or while the first movement of the input element is detected), the computer system (e.g., 700) updates (806) (e.g., changing, modifying, and/or altering) an appearance (e.g., a rate of movement, such as an amount of perceived momentum of the virtual object) of the virtual object (e.g., 710 and/or 712) with a first appearance update (e.g., causing movement of content 710 based on the fourth exponential decay, as indicated by fourth break velocity representation 750h) (e.g., an extrapolated, estimated, calculated, and/or determined amount of movement of the virtual object that is based on a velocity, such as a maximum velocity of the first movement, that causes the virtual object to move and/or appear to move with a simulated momentum that causes minimal disruption and/or inconvenience to the user while interacting with the virtual object), wherein the first appearance update (e.g., causing movement of content 710 based on the fourth exponential decay, as indicated by fourth break velocity representation 750h) is based on at least a portion of the first movement (e.g., 716a, 716b, 716c, and/or 716d) of the input element (e.g., 704, 704a, 704b, 705, 705a, and/or 705b) (e.g., the first movement includes one or more portions of movement that include different velocities as the first movement occurs over time, and the first appearance update is based on at least one of the one or more portions of the movement) that occurred before the ambiguous input-end event (e.g., a change in position of hand 704 and/or a change in position of fingers 704a and 704b relative to one another) was detected (e.g., the first appearance update is based on one or more portions of the first movement that were detected before the computer system determines that an ambiguous input-end event occurred) (in some embodiments, the computer system determines that the ambiguous input-end event occurred between detection of the first movement and the second movement; in some embodiments, the computer system determines that the ambiguous input-end event occurred while detecting the first movement; in some embodiments, the computer system determines that the ambiguous input-end event occurred while detecting the second movement).

In some embodiments, the ambiguous input-end event (e.g., a change in position of hand 704 and/or a change in position of fingers 704a and 704b relative to one another) is determined based on incomplete information and/or data received from the one or more input devices, based on partial information and/or data received from the one or more input devices that is inconclusive and/or indirectly indicates that a break in contact between one or more body parts (e.g., 704, 704a, 704b, 705, 705a, and/or 705b) of the user (e.g., 702) occurred, and/or based on partial and/or full occlusion of the input element (e.g., 704, 704a, 704b, 705, 705a, and/or 705b). In some embodiments, the ambiguous input-end event is based on the change in the user interaction, such as a break in contact between two or more body parts of the user of the computer system, occurring before and/or after a predefined time range, where the time range corresponds to a clear and/or unambiguous input. In some embodiments, the ambiguous input-end event (e.g., a change in position of hand 704 and/or a change in position of fingers 704a and 704b relative to one another) includes detecting motion that is characteristic of an end of an input such as a local maximum velocity of movement of the input element (e.g., an increase in velocity of the input element followed by a decrease in velocity of the input element) which is a motion that is often associated with an end of an input (e.g., because the user is attempting to end the input with velocity in a particular direction to get the movement of the object to continue with simulated inertia). In some embodiments, the ambiguous input-end event (e.g., a change in position of hand 704 and/or a change in position of fingers 704a and 704b relative to one another) is detected in part based on an inability of the device (e.g., 700) to directly observe a state of the input element (e.g., 704, 704a, 704b, 705, 705a, and/or 705b) (e.g., due to low lighting or some sensor obstruction, such as a hand being turned away from a sensor or camera) at the time that the ambiguous input-end event is detected).

In response to detecting the second movement (e.g., 716a, 716b, 716c, 716d, and/or movement of hand 704 after time 750c) of the input element (804) (e.g., 704, 704a, 704b, 705, 705a, and/or 705b) and in accordance with a determination that the user interaction (e.g., first movement 716a, second movement 716b, third movement 716d, and/or fourth movement 716d) corresponding to the virtual object (e.g., 710 and/or 712) was continuous (e.g., the computer system determines that an input-end event, such as an ambiguous input-end event, did not occur) during the first movement (e.g., 716a, 716b, 716c, and/or 716d) of the input element (e.g., 704, 704a, 704b, 705, 705a, and/or 705b) and during the second movement (e.g., 716a, 716b, 716c, 716d, and/or movement of hand 704 after time 750c) of the input element (e.g., 704, 704a, 704b, 705, 705a, and/or 705b), the computer system (e.g., 700) updates (808) the appearance of the virtual object (e.g., 710 and/or 712) with a second appearance update (e.g., causing movement of content 710 based on movement of the input element and/or hand 704) (e.g., an amount, direction, speed, and/or acceleration of movement of the virtual object) that is based on at least a portion of the second movement (e.g., 716a, 716b, 716c, 716d, and/or movement of hand 704 after time 750c) of the input element (e.g., 704, 704a, 704b, 705, 705a, and/or 705b), wherein the second appearance update (e.g., causing movement of content 710 based on movement of the input element and/or hand 704) is different from the first appearance update (e.g., causing movement of content 710 based on the fourth exponential decay, as indicated by fourth break velocity representation 750h) (e.g., the first appearance update is extrapolated, estimated, and/or determined so that the virtual object moves with a perceived simulated momentum, whereas the second appearance does not include simulated momentum).

Updating an appearance of the virtual object with a first appearance update or a second appearance update based on whether the user interaction corresponds to an ambiguous input-end event or is continuous during the first movement the input and element and during the second movement of the input element performs an operation when a set of conditions has been met without requiring any further input, provides the user with a more seamless experience when interacting with virtual objects, improves how user interfaces are scrolled, and improves how user interfaces are navigated.

In some embodiments, updating the appearance of the virtual object (e.g., 710 and/or 712) with the first appearance update (e.g., causing movement of content 710 based on the fourth exponential decay, as indicated by fourth break velocity representation 750h) includes the computer system (e.g., 700) displaying, via the display generation component (e.g., 700a), a first animation (e.g., movement of content 710 relative to display 700a over time) of the virtual object (e.g., 710 and/or 712) that changes (or progresses through multiple intermediate states) over time (e.g., movement of the virtual object over time, translation of the virtual object over time, a change, such as a gradual change, in appearance of the virtual object over time, and/or a change in which portions of the virtual object are displayed, via the display generation component, over time). The first appearance update including displaying a first animation of the virtual object that changes over time provides improved visual feedback, provides the user with a more seamless experience when interacting with virtual objects, improves how user interfaces are scrolled, and improves how user interfaces are navigated.

In some embodiments, the first animation (e.g., movement of content 710 relative to display 700a over time) of the virtual object (e.g., 710 and/or 712) is based on simulated momentum (e.g., the fourth exponential decay having the fourth decay rate, as indicated by fourth break velocity representation 750h) (e.g., based on a velocity and simulated drag) (e.g., movement of at least a portion of the virtual object that occurs after detecting the ambiguous input-end event, where the simulated momentum causes movement of the virtual object that is based on a speed of movement of the virtual object when the ambiguous input-end event was detected, based on the first movement of the input element, based on the second movement of the input element, and/or based on the user interaction). In some embodiments, the animation of the virtual object includes moving the virtual object with simulated momentum. The first animation of the virtual object being based on simulated momentum provides improved visual feedback, provides the user with a more seamless experience when interacting with virtual objects, improves how user interfaces are scrolled, and improves how user interfaces are navigated.

In some embodiments, the simulated momentum (e.g., the fourth exponential decay having the fourth decay rate, as indicated by fourth break velocity representation 750*h*) starts at a time (e.g., 750*c*) corresponding to a peak velocity (e.g., a peak of hand velocity representation 750*a* and/or virtual object velocity representation 750*b*) of movement of the virtual object (e.g., 710 and/or 712) (e.g., a detected and/or determined maximum velocity of movement of the virtual object based on the user interaction and/or detected and/or a determined maximum velocity of movement of the input element). In some embodiments, the user interaction initiates movement of the virtual object, such that a velocity of the movement of the virtual object increases to a peak velocity, and the simulated momentum is applied to continue movement of the virtual object from the time of the peak velocity. In some embodiments, the simulated movement causes the movement of the virtual object to decrease in velocity for a predetermined period of time before the virtual object eventually ceases movement. In some embodiments, movement of the input element that is included in the user interaction reaches a peak velocity, and the simulated momentum is applied to the virtual object from the time of the peak velocity of the input element. In some embodiments, the simulated movement causes the movement of the virtual object to decrease in velocity for a predetermined period of time before the virtual object eventually ceases movement. Starting simulated momentum from a time corresponding to a peak velocity of movement of the virtual object provides improved visual feedback, provides the user with a more seamless experience when interacting with virtual objects, improves how user interfaces are scrolled, and improves how user interfaces are navigated.

In some embodiments, the simulated momentum (e.g., the fourth exponential decay having the fourth decay rate, as indicated by fourth break velocity representation 750*h*) starts at a time (e.g., 750*c* and/or 750*e*) corresponding to the ambiguous input-end event (e.g., a change in position of hand 704 and/or a change in position of fingers 704*a* and 704*b* relative to one another) (e.g., a time at which the ambiguous input-end event is detected, determined to occur, and/or estimated to occur). In some embodiments, the user interaction initiates movement of the virtual object, and the simulated momentum is applied to continue movement of the virtual object from the time of the ambiguous input-end event. In some embodiments, the simulated movement causes the movement of the virtual object to decrease in velocity for a predetermined period of time before the virtual object eventually ceases movement. Starting simulated momentum from a time corresponding to the ambiguous input-end event provides improved visual feedback, provides the user with a more seamless experience when interacting with virtual objects, improves how user interfaces are scrolled, and improves how user interfaces are navigated.

In some embodiments, the computer system (e.g., 700) adjusts the simulated momentum (e.g., the fourth exponential decay having the fourth decay rate, as indicated by fourth break velocity representation 750*h*) based on a change in the movement (e.g., 716*a*, 716*b*, 716*c*, and/or 716*d*) of the input element (e.g., 704, 704*a*, 704*b*, 705, 705*a*, and/or 705*b*) that occurred after detection of the ambiguous input-end event (e.g., a change in position of hand 704 and/or a change in position of fingers 704*a* and 704*b* relative to one another) (e.g., adjusting an amount of time for which the simulated momentum lasts and/or is applied to movement of the virtual object, adjusting, such as increasing or decreasing, a decay rate of the simulated momentum applied to movement of the virtual object, and/or adjusting, such as increasing or decreasing, a speed and/or velocity generated based on the simulated momentum applied to movement of the virtual object). Adjusting the simulated momentum based on a change in the movement of the input element that occurred after detection of the ambiguous input-end event provides improved visual feedback, provides the user with a more seamless experience when interacting with virtual objects, improves how user interfaces are scrolled, and improves how user interfaces are navigated.

In some embodiments, in accordance with a determination that a direction (e.g., a direction of movement of the input element and/or a trajectory of the second movement of the input element) of the second movement (e.g., 716*a*, 716*b*, 716*c*, 716*d*, and/or movement of hand 704 after time 750*c*) of the input element (e.g., 704, 704*a*, 704*b*, 705, 705*a*, and/or 705*b*) changes after detection of the ambiguous input-end event (e.g., a change in position of hand 704 and/or a change in position of fingers 704*a* and 704*b* relative to one another) (e.g., changes over time after detecting the ambiguous input-end event), the computer system (e.g., 700) adjusts the simulated momentum (e.g., the fourth exponential decay having the fourth decay rate, as indicated by fourth break velocity representation 750*h*) based on a change in the direction of the second movement (e.g., 716*a*, 716*b*, 716*c*, 716*d*, and/or movement of hand 704 after time 750*c*) of the input element (e.g., 704, 704*a*, 704*b*, 705, 705*a*, and/or 705*b*) that occurred after detection of the ambiguous input-end event (e.g., a change in position of hand 704 and/or a change in position of fingers 704*a* and 704*b* relative to one another) (e.g., adjusting an amount of time for which the simulated momentum lasts and/or is applied to movement of the virtual object, adjusting, such as increasing or decreasing, a decay rate of the simulated momentum applied to movement of the virtual object, and/or adjusting, such as increasing or decreasing, a speed and/or velocity generated based on the simulated momentum applied to movement of the virtual object). Adjusting the simulated momentum based on a change in direction of the second movement of the input element that occurred after detection of the ambiguous input-end event provides improved visual feedback, provides the user with a more seamless experience when interacting with virtual objects, improves how user interfaces are scrolled, and improves how user interfaces are navigated.

In some embodiments, in accordance with a determination that the user interaction (e.g., first movement 716*a*, second movement 716*b*, third movement 716*d*, and/or fourth movement 716*d*) is a first type of user interaction (e.g., the user interaction is determined to correspond to a first type of user input, such as a swipe input, and/or to correspond to a first type of operation, such as a scroll), the first appearance update (e.g., causing movement of content 710 based on the fourth exponential decay, as indicated by fourth break velocity representation 750*h*) includes one or more first characteristics (e.g., a first type of simulated momentum applied to movement of the virtual object, such as simulated momentum having a first duration, a first decay rate, and/or simulated momentum generating a first speed and/or velocity profile). In accordance with a determination that the user interaction (e.g., first movement 716*a*, second movement 716*b*, third movement 716*d*, and/or fourth movement 716*d*) is a second type of user interaction, (e.g., the user interaction is determined to correspond to a second type of user input, different from the first type of user input, such as a drag input, and/or to correspond to a second type of operation different from the first type of operation, such as a pan) the first appearance update (e.g., causing movement of content 710 based on the fourth exponential decay, as indicated by fourth break velocity representation 750*h*) includes one or more second characteristics (e.g., a second type of simulated momentum applied to movement of the virtual object, such as simulated momentum having a second duration, a second decay rate, and/or simulated momentum generating a second speed and/or velocity profile), different from the one or more first characteristics. The first appearance update including one or more first characteristics or one or more second characteristics, different from the one or more first characteristics, based on whether the user interaction is a first type of user interaction or a second type of user interaction provides improved visual feedback, provides the user with a more seamless experience when interacting with virtual objects, improves how user interfaces are scrolled, and improves how user interfaces are navigated.

In some embodiments, the one or more first characteristics include simulated momentum (e.g., the fourth exponential decay having the fourth decay rate, as indicated by fourth break velocity representation 750*h*) having a first duration (e.g., the first appearance update includes first simulated momentum that causes movement of the virtual object for a first amount of time). In some embodiments, the one or more second characteristics include simulated momentum (e.g., the fourth exponential decay having the fourth decay rate, as indicated by fourth break velocity representation 750*h*) having a second duration (e.g., the first appearance update includes second simulated momentum that causes movement of the virtual object for a second amount of time), different from the first duration (e.g., longer than the first duration or shorter than the first duration). The one or more first characteristics including simulated momentum having a first duration and/or the one or more second characteristics including simulated momentum having a second duration, different from the first duration, provides improved visual feedback, provides the user with a more seamless experience when interacting with virtual objects, improves how user interfaces are scrolled, and improves how user interfaces are navigated.

In some embodiments, the first type of user interaction includes a first gaze characteristic (e.g., detecting one or more eyes of a user of the computer system viewing and/or looking in one or more first predetermined locations of the display generation component) (in some embodiments, the first gaze characteristic includes one or more eyes of the user remaining relatively fixed at a first location of the display generation component (or moving in a way that doesn't track movement of the virtual object), thereby indicating that the one or more eyes of the user are not tracking movement of the virtual object and/or other displayed virtual objects) of a gaze (e.g., 718*a*, 718*b*, and/or 718*c*) of a user (e.g., 702) of the computer system (e.g., 700). In some embodiments, the second type of user interaction includes a second gaze characteristic (e.g., detecting one or more eyes of a user of the computer system viewing and/or looking in one or more second predetermined locations of the display generation component) (in some embodiments, the second gaze characteristic includes one or more eyes of the user moving from a second location of the display generation component to a third location of the display generation component, thereby indicating that the one or more eyes of the user are tracking movement of the virtual object and/or other displayed virtual objects) of the gaze (e.g., 718*a*, 718*b*, and/or 718*c*) of the user (e.g., 702) of the computer system (e.g., 700), different from the first gaze characteristic. In some embodiments, the first appearance update includes different appearances when the first type of user interaction includes the first gaze characteristic (e.g., the virtual object (or content of the virtual object) is scrolled when the first gaze characteristic of the gaze of the user of the computer system indicates a scroll) and when the second type of user interaction includes the second gaze characteristic (e.g., the virtual object (or content of the virtual object) is dragged when the second gaze characteristic of the gaze of the user of the computer system indicates a drag). In some embodiments, the first appearance update is based on the gaze of the user of the computer system. The first type of user interaction including a first gaze characteristic of a gaze of a user of the computer system and the second type of user interaction including a second gaze characteristic of the gaze of the user of the computer system, different from the first gaze characteristic, improves an ability of the computer system to determine a type of the user interaction, which provides improved visual feedback, provides the user with a more seamless experience when interacting with virtual objects, improves how user interfaces are scrolled, and improves how user interfaces are navigated.

In some embodiments, the first type of user interaction includes a first type of movement (e.g., 716*a* and/or 716*b*) (e.g., movement having a first speed and/or velocity profile, movement having a first trajectory, and/or movement associated with a first type of input element). In some embodiments, the second type of user interaction includes a second type of movement (e.g., 716*c* and/or 716*d*) (e.g., movement having a second speed and/or velocity profile, movement having a second trajectory, and/or movement associated with a second type of input element), different from the first type of movement. In some embodiments, the first appearance update includes different appearances when the first type of user interaction includes the first type of movement (e.g., the virtual object is moved a first amount and/or at a first speed based on the first type of movement of the first type of user interaction) and when the second type of user interaction includes the second type of movement (e.g., the virtual object is moved a second amount, such as an amount that is different from the first amount, and/or at a second speed, such as a speed that is different from the first speed, based on the second type of movement of the second type of user interaction). In some embodiments, the first appearance update is based on the movement of the input element prior to detection of the ambiguous input-end event. The first type of user interaction including a first type of movement and the second type of user interaction including a second type of movement, different from the first type of movement, improves an ability of the computer system to determine a type of the user interaction, which provides improved visual feedback, provides the user with a more seamless experience when interacting with virtual objects, improves how user interfaces are scrolled, and improves how user interfaces are navigated.

In some embodiments, the first type of user interaction is based on movement (e.g., 716*a*, 716*b*, 716*c*, and/or 716*d*) of the input element (e.g., 704, 704*a*, 704*b*, 705, 705*a*, and/or 705*b*) (e.g., a first wrist motion, a first hand speed, and/or a first duration of contact between two or more fingers of a user of the computer system) that occurred prior to detecting the ambiguous input-end event (e.g., a change in position of hand 704 and/or a change in position of fingers 704*a* and 704b relative to one another). In some embodiments, the second type of the user interaction is based on movement (e.g., 716a, 716b, 716c, and/or 716d) of the input element (e.g., 704, 704a, 704b, 705, 705a, and/or 705b) (e.g., a second wrist motion, a second hand speed, and/or a second duration of contact between two or more fingers of a user of the computer system) that occurred prior to detecting the ambiguous input-end event (e.g., a change in position of hand 704 and/or a change in position of fingers 704a and 704b relative to one another). In some embodiments, the first appearance update includes different appearances for movement of the input element that occurred prior to detecting the ambiguous input-end event associated with the first type of user interaction (e.g., the virtual object is moved a first amount and/or at a first speed based on the movement of the input element that occurred prior to detecting the ambiguous input-end event) and for movement of the input element that occurred prior to detecting the ambiguous input-end event associated with the second type of user interaction (e.g., the virtual object is moved a second amount, such as an amount that is different from the first amount, and/or at a second speed, such as a speed that is different from the first speed, based on the movement of the input element that occurred prior to detecting the ambiguous input-end event). In some embodiments, the first appearance update is based on the movement of the input element that occurred prior to detection of the ambiguous input-end event. The first type of user interaction being based on movement of the input element that occurred prior to detecting the ambiguous input-end event and the second type of user interaction being based on movement of the input element that occurred prior to detecting the ambiguous input-end event, improves an ability of the computer system to determine a type of the user interaction, which provides improved visual feedback, provides the user with a more seamless experience when interacting with virtual objects, improves how user interfaces are scrolled, and improves how user interfaces are navigated.

In some embodiments, the first type of user interaction is based on movement (e.g., movement of hand 704 that occurs after time 750c and/or 750c) of the input element (e.g., 704, 704a, 704b, 705, 705a, and/or 705b) (e.g., a first wrist motion, a first hand speed, and/or a first duration of contact between two or more fingers of a user of the computer system) that occurred after detecting the ambiguous input-end event (e.g., a change in position of hand 704 and/or a change in position of fingers 704a and 704b relative to one another). In some embodiments, the second type of the user interaction is based on movement (e.g., movement of hand 704 that occurs after time 750c and/or 750c) of the input element (e.g., 704, 704a, 704b, 705, 705a, and/or 705b) (e.g., a second wrist motion, a second hand speed, and/or a second duration of contact between two or more fingers of a user of the computer system) that occurred after detecting the ambiguous input-end event (e.g., a change in position of hand 704 and/or a change in position of fingers 704a and 704b relative to one another). In some embodiments, the first appearance update includes different appearances for movement of the input element that occurred after detecting the ambiguous input-end event associated with the first type of user interaction (e.g., the virtual object is moved a first amount and/or at a first speed based on the movement of the input element that occurred after detecting the ambiguous input-end event) and for movement of the input element that occurred after detecting the ambiguous input-end event associated with the second type of user interaction (e.g., the virtual object is moved a second amount, such as an amount that is different from the first amount, and/or at a second speed, such as a speed that is different from the first speed, based on the movement of the input element that occurred after detecting the ambiguous input-end event). In some embodiments, the first appearance update is based on the movement of the input element that occurred after detection of the ambiguous input-end event. The first type of user interaction being based on movement of the input element that occurred after detecting the ambiguous input-end event and the second type of user interaction being based on movement of the input element that occurred after detecting the ambiguous input-end event, improves an ability of the computer system to determine a type of the user interaction, which provides improved visual feedback, provides the user with a more seamless experience when interacting with virtual objects, improves how user interfaces are scrolled, and improves how user interfaces are navigated.

In some embodiments, the first type of user interaction is based on one or more user interactions that occurred prior to the user interaction (e.g., first movement 716a, second movement 716b, third movement 716c, and/or fourth movement 716d) (e.g., one or more second user interactions of the same type and/or one or more second user interactions that caused the computer system to perform a first operation). In some embodiments, the second type of the user interaction is based on one or more user interactions (e.g., one or more third user interactions of the same type and/or one or more third user interactions that caused the computer system to perform a second operation) that occurred prior to the user interaction (e.g., first movement 716a, second movement 716b, third movement 716c, and/or fourth movement 716d). In some embodiments, the first appearance update includes different appearances for one or more user interactions that occurred prior to the user interaction associated with the first type of user interaction (e.g., the virtual object (or content of the virtual object) is scrolled when the one or more user interactions that occurred prior to the user interaction include a scroll) and for one or more user interactions that occurred prior to the user interaction associated with the second type of user interaction (e.g., the virtual object (or content of the virtual object) is dragged when the one or more user interactions that occurred prior to the user interaction include a drag). In some embodiments, the first appearance update is based on one or more user interactions that occurred prior to the user interaction. The first type of user interaction being based on one or more user interactions that occurred prior to the user interaction and the second type of user interaction being based on one or more user interactions that occurred prior to the user interaction, improves an ability of the computer system to determine a type of the user interaction, which provides improved visual feedback, provides the user with a more seamless experience when interacting with virtual objects, improves how user interfaces are scrolled, and improves how user interfaces are navigated.

In some embodiments, updating the appearance of the virtual object (e.g., 710 and/or 712) with the second appearance update (e.g., causing movement of content 710 based on movement of the input element and/or hand 704) includes displaying, via the display generation component (e.g., 700a), a second animation (e.g., movement of content 710 relative to display 700a over time) of the virtual object (e.g., 710 and/or 712) that changes (or progresses through multiple intermediate states) over time (e.g., movement of the virtual object over time, translation of the virtual object over time, a change, such as a gradual change, in appearance of the virtual object over time, and/or a change in which portions of the virtual object are displayed, via the display generation component, over time) (in some embodiments, the second animation of the virtual object of the second appearance update is different from an animation of the virtual object of the first appearance update). The second appearance update including a second animation of the virtual object provides improved visual feedback, provides the user with a more seamless experience when interacting with virtual objects, improves how user interfaces are scrolled, and improves how user interfaces are navigated.

In some embodiments, the second animation (e.g., movement of content 710 relative to display 700a over time) of the virtual object (e.g., 710 and/or 712) is based on respective movement (e.g., 716a, 716b, 716c, and/or 716d) the input element (e.g., 704, 704a, 704b, 705, 705a, and/or 705b) (e.g., the first movement of the input element, the second movement of the input element, and/or movement of the input element that is different from the first movement of the input element and the second movement of the input element). The second animation of the virtual object being based on respective movement of the input element provides improved visual feedback, provides the user with a more seamless experience when interacting with virtual objects, improves how user interfaces are scrolled, and improves how user interfaces are navigated.

In some embodiments, the first appearance update (e.g., causing movement of content 710 based on the fourth exponential decay, as indicated by fourth break velocity representation 750h) includes movement of the virtual object (e.g., 710 and/or 712) having a first speed that is based on simulated momentum (e.g., the fourth exponential decay having the fourth decay rate, as indicated by fourth break velocity representation 750h) (e.g., movement of at least a portion of the virtual object that occurs after detecting the input-end event, where the simulated momentum causes movement of the virtual object that is based on a speed of movement of the virtual object when the ambiguous input-end event was detected, based on the first movement of the input element, based on the second movement of the input element, and/or based on the user interaction) and the respective movement of the input element (e.g., 704, 704a, 704b, 705, 705a, and/or 705b) includes a second speed (e.g., a maximum speed of the input element that occurs as the input element moves from a first location toward a second location and/or a speed of the input element at a location when an input-end event is detected) that is greater than the first speed of the virtual object (e.g., 710 and/or 712) that is based on the simulated momentum (e.g., the fourth exponential decay having the fourth decay rate, as indicated by fourth break velocity representation 750h) (e.g., a maximum speed of movement of the virtual object caused by the simulated momentum, an average speed of movement the virtual object caused by the simulated momentum, and/or a speed of movement of the virtual object caused by the simulated momentum that is applied to the virtual object when the ambiguous input-end event is detected is less than a speed of the input element). The first appearance update including movement of the virtual object with simulated momentum having a first speed and the respective movement of the input element having a second speed, greater than the first speed, provides improved visual feedback, provides the user with a more seamless experience when interacting with virtual objects, improves how user interfaces are scrolled, and improves how user interfaces are navigated.

In some embodiments, the first appearance update (e.g., causing movement of content 710 based on the fourth exponential decay, as indicated by fourth break velocity representation 750h) includes movement of the virtual object (e.g., 710 and/or 712) having a third speed that is based on simulated momentum (e.g., the fourth exponential decay having the fourth decay rate, as indicated by fourth break velocity representation 750h) (e.g., movement of at least a portion of the virtual object that occurs after detecting the input-end event, where the simulated momentum causes movement of the virtual object that is based on a speed of movement of the virtual object when the ambiguous input-end event was detected, based on the first movement of the input element, based on the second movement of the input element, and/or based on the user interaction) and the respective movement of the input element (e.g., 704, 704a, 704b, 705, 705a, and/or 705b) includes a fourth speed (e.g., a maximum speed of the input element that occurs as the input element moves from a first location toward a second location and/or a speed of the input element at a location when an input-end event is detected) that is less than the third speed of the virtual object (e.g., 710 and/or 712) that is based on the simulated momentum (e.g., the fourth exponential decay having the fourth decay rate, as indicated by fourth break velocity representation 750h) (e.g., a maximum speed of movement of the virtual object caused by the simulated momentum, an average speed of movement the virtual object caused by the simulated momentum, and/or a speed of movement of the virtual object caused by the simulated momentum that is applied to the virtual object when the ambiguous input-end event is detected is greater than the speed of the input element). The first appearance update including movement of the virtual object with simulated momentum having a third speed and the respective movement of the input element having a fourth speed, less than the third speed, provides improved visual feedback, provides the user with a more seamless experience when interacting with virtual objects, improves how user interfaces are scrolled, and improves how user interfaces are navigated.

In some embodiments, in accordance with a determination that a change (e.g., a detected change in direction, speed, velocity, trajectory, and/or contact between one or more body parts of the user and/or a lapse in detection of the input element) in the user interaction (e.g., first movement 716a, second movement 716b, third movement 716c, and/or fourth movement 716d) that corresponds to a clear input-end event (e.g., end of gesture and/or input detected at FIGS. 7C and 7D) (e.g., a change in the input that indicates that an end of the input occurred such as a detected break in contact between two or more body parts of a user of the computer system, a break in contact between two or more body parts of the user of the computer system that is determined to be above a second confidence threshold level, and/or a break in contact between two or more body parts of the user that occurs within a predetermined time range threshold of the duration of the user interaction) was detected prior to detecting the second movement (e.g., 716a, 716b, 716c, 716d, and/or movement of hand 704 after time 750c) of the input element (e.g., 704, 704a, 704b, 705, 705a, and/or 705b) (e.g., the clear input-end event occurred before the second movement of the input element is detected, after the first movement of the input element is detected, and/or while the first movement of the input element is detected), the computer system (e.g., 700) updates (e.g., changing, modifying, and/or altering) the appearance (e.g., a rate of movement, such as an amount of perceived momentum of the virtual object) of the virtual object (e.g., 710 and/or 712) with a third appearance update (e.g., causing movement of content 710 based on the first exponential decay, as indicated by first break velocity representation 750*d*) (e.g., an extrapolated, estimated, calculated, and/or determined amount of movement of the virtual object that is based on a velocity, such as a maximum velocity of the first movement, that causes the virtual object to move and/or appear to move with momentum), wherein the third appearance update (e.g., causing movement of content 710 based on the first exponential decay, as indicated by first break velocity representation 750*d*) is based on at least a portion of the first movement (e.g., 716*a*, 716*b*, 716*c*, and/or 716*d*) of the input element (e.g., 704, 704*a*, 704*b*, 705, 705*a*, and/or 705*b*) (e.g., the first movement includes one or more portions of movement that include different velocities as the first movement occurs over time, and the first appearance update is based on at least one of the one or more portions of the movement) that occurred before the clear input-end event (e.g., end of gesture and/or input detected at FIGS. 7C and 7D) was detected (e.g., the first appearance update is based on one or more portions of the first movement that were detected before the computer system determines that an clear input-end event occurred), and wherein the third appearance update (e.g., causing movement of content 710 based on the first exponential decay, as indicated by first break velocity representation 750*d*) is different from the first appearance update (e.g., causing movement of content 710 based on the fourth exponential decay, as indicated by fourth break velocity representation 750*h*) and different from the second appearance update (e.g., causing movement of content 710 based on movement of the input element and/or hand 704). Updating the appearance of the virtual object with a third appearance update when a change in the user interaction that corresponds to a clear input-end event was detected prior to detecting the second movement of the input element provides improved visual feedback, provides the user with a more seamless experience when interacting with virtual objects, improves how user interfaces are scrolled, and improves how user interfaces are navigated.

In some embodiments, updating the appearance of the virtual object with the third appearance update (e.g., causing movement of content 710 based on the first exponential decay, as indicated by first break velocity representation 750*d*) includes the computer system (e.g., 700) ceasing to move the virtual object (e.g., 710 and/or 712) (e.g., causing movement of the virtual object to stop, discontinuing movement of the virtual object, and/or causing a portion of the virtual object to be displayed at a predefined location of the display generation component). The third appearance update including ceasing to move the virtual object provides improved visual feedback, provides the user with a more seamless experience when interacting with virtual objects, improves how user interfaces are scrolled, and improves how user interfaces are navigated.

In some embodiments, updating the appearance of the virtual object with the third appearance update (e.g., causing movement of content 710 based on the first exponential decay, as indicated by first break velocity representation 750*d*) includes the computer system (e.g., 700) displaying, via the display generation component (e.g., 700*a*), a third animation (e.g., movement of content 710 relative to display 700*a* over time) of the virtual object (e.g., 710 and/or 712) that changes over time (e.g., progressing through a plurality of intermediate states) (e.g., movement of the virtual object over time, translation of the virtual object over time, a change, such as a gradual change, in appearance of the virtual object over time, and/or a change in which portions of the virtual object are displayed, via the display generation component, over time) (in some embodiments, the third animation of the virtual object of the third appearance update is different from an animation of the virtual object of the first appearance update and/or different from an animation of the virtual object of the second appearance update). The third appearance update including a third animation of the virtual object that changes over time provides improved visual feedback, provides the user with a more seamless experience when interacting with virtual objects, improves how user interfaces are scrolled, and improves how user interfaces are navigated.

In some embodiments, the third animation (e.g., movement of content 710 relative to display 700*a* over time) of the virtual object (e.g., 710 and/or 712) is based on second simulated momentum (e.g., the first exponential decay having the first decay rate, as indicated by first break velocity representation 750*d*) (e.g., movement of at least a portion of the virtual object that occurs after detecting the clear input-end event, where the simulated momentum causes movement of the virtual object that is based on a speed of movement of the virtual object when the clear input-end event was detected, based on the first movement of the input element, based on the second movement of the input element, and/or based on the user interaction). The third animation of the virtual object being based on second simulated momentum provides improved visual feedback, provides the user with a more seamless experience when interacting with virtual objects, improves how user interfaces are scrolled, and improves how user interfaces are navigated.

In some embodiments, the first appearance update (e.g., causing movement of content 710 based on the fourth exponential decay, as indicated by fourth break velocity representation 750*h*) is based on third simulated momentum (e.g., the fourth exponential decay having the fourth decay rate, as indicated by fourth break velocity representation 750*h*) (e.g., movement of at least a portion of the virtual object that occurs after detecting the input-end event, where the simulated momentum causes movement of the virtual object that is based on a speed of movement of the virtual object when the ambiguous input-end event was detected, based on the first movement of the input element, based on the second movement of the input element, and/or based on the user interaction) and the second simulated momentum (e.g., the first exponential decay having the first decay rate, as indicated by first break velocity representation 750*d*) causes movement of the virtual object (e.g., 710 and/or 712) to cease more rapidly as compared to the third simulated momentum (e.g., the fourth exponential decay having the fourth decay rate, as indicated by fourth break velocity representation 750*h*) (e.g., the second simulated momentum causes movement of the virtual object to stop and/or cease at a time before the third simulated momentum causes movement of the virtual object to stop and/or cease) (in some embodiments, the second simulated momentum includes a greater decay rate when compared to the third simulated momentum, such that movement of the virtual object stops at a time that is before a time at which the third simulated momentum causes movement of the virtual object to stop). The second simulated momentum causing movement of the virtual object to cease more rapidly as compared to the third simulated momentum of the first appearance update provides improved visual feedback, provides the user with a more seamless experience when interacting with virtual objects, improves how user interfaces are scrolled, and improves how user interfaces are navigated.

In some embodiments, updating the appearance of the virtual object (e.g., 710 and/or 712) with the first appearance update (e.g., causing movement of content 710 based on the fourth exponential decay, as indicated by fourth break velocity representation 750*h*) that is based on at least the portion of the first movement (e.g., 716*a*, 716*b*, 716*c*, and/or 716*d*) of the input element (e.g., 704, 704*a*, 704*b*, 705, 705*a*, and/or 705*b*) that occurred before the ambiguous input-end event (e.g., a change in position of hand 704 and/or a change in position of fingers 704*a* and 704*b* relative to one another) was detected includes the computer system (e.g., 700) ignoring at least a portion of the second movement (e.g., 716*a*, 716*b*, 716*c*, 716*d*, and/or movement of hand 704 after time 750*c*) of the input element (e.g., 704, 704*a*, 704*b*, 705, 705*a*, and/or 705*b*) that occurred after the ambiguous input-end event (e.g., a change in position of hand 704 and/or a change in position of fingers 704*a* and 704*b* relative to one another) (e.g., forgoing using, applying, and/or accounting for data corresponding to detected second movement of the input element that occurred after the ambiguous input-end event, such as forgoing using, applying, and/or accounting for the data when causing movement of the virtual object). Ignoring at least a portion of the second movement of the input element that occurred after the ambiguous input-end event provides improved visual feedback, provides the user with a more seamless experience when interacting with virtual objects, improves how user interfaces are scrolled, and improves how user interfaces are navigated.

In some embodiments, ignoring at least the portion of the second movement (e.g., 716*a*, 716*b*, 716*c*, 716*d*, and/or movement of hand 704 after time 750*c*) of the input element (e.g., 704, 704*a*, 704*b*, 705, 705*a*, and/or 705*b*) that occurred after the ambiguous input-end event (e.g., a change in position of hand 704 and/or a change in position of fingers 704*a* and 704*b* relative to one another) includes the computer system (e.g., 700) ignoring a direction of at least the portion of the second movement (e.g., 716*a*, 716*b*, 716*c*, 716*d*, and/or movement of hand 704 after time 750*c*) of the input element (e.g., 704, 704*a*, 704*b*, 705, 705*a*, and/or 705*b*) that occurred after the ambiguous input-end event (e.g., a change in position of hand 704 and/or a change in position of fingers 704*a* and 704*b* relative to one another) (e.g., forgoing using, applying, and/or accounting for data corresponding to detected one or more directions associated with the second movement of the input element that occurred after the ambiguous input-end event, such as forgoing using, applying, and/or accounting for the direction data when causing movement of the virtual object). Ignoring a direction of at least the portion of the second movement of the input element that occurred after the ambiguous input-end event provides improved visual feedback, provides the user with a more seamless experience when interacting with virtual objects, improves how user interfaces are scrolled, and improves how user interfaces are navigated.

In some embodiments, ignoring at least the portion of the second movement (e.g., 716*a*, 716*b*, 716*c*, 716*d*, and/or movement of hand 704 after time 750*c*) of the input element (e.g., 704, 704*a*, 704*b*, 705, 705*a*, and/or 705*b*) that occurred after the ambiguous input-end event (e.g., a change in position of hand 704 and/or a change in position of fingers 704*a* and 704*b* relative to one another) includes the computer system (e.g., 700) ignoring a magnitude of at least the portion of the second movement (e.g., 716*a*, 716*b*, 716*c*, 716*d*, and/or movement of hand 704 after time 750*c*) of the input element (e.g., 704, 704*a*, 704*b*, 705, 705*a*, and/or 705*b*) that occurred after the ambiguous input-end event (e.g., a change in position of hand 704 and/or a change in position of fingers 704*a* and 704*b* relative to one another) (e.g., forgoing using, applying, and/or accounting for data corresponding to detected one or more magnitudes associated with the second movement of the input element that occurred after the ambiguous input-end event, such as forgoing using, applying, and/or accounting for the magnitude data when causing movement of the virtual object). Ignoring a magnitude of at least the portion of the second movement of the input element that occurred after the ambiguous input-end event provides improved visual feedback, provides the user with a more seamless experience when interacting with virtual objects, improves how user interfaces are scrolled, and improves how user interfaces are navigated.

In some embodiments, the change in the user interaction (e.g., first movement 716*a*, second movement 716*b*, third movement 716*d*, and/or fourth movement 716*d*) that corresponds to the ambiguous input-end event (e.g., a change in position of hand 704 and/or a change in position of fingers 704*a* and 704*b* relative to one another) includes a change in a velocity of the user interaction (e.g., first movement 716*a*, second movement 716*b*, third movement 716*d*, and/or fourth movement 716*d*) (e.g., a reduction in velocity, an increase in velocity, and/or a change in direction of velocity). The change in the user interaction that corresponds to the ambiguous input-end event including a change in velocity of the user interaction improves an ability of the computer system to determine an ambiguous input-end event, which provides improved visual feedback, provides the user with a more seamless experience when interacting with virtual objects, improves how user interfaces are scrolled, and improves how user interfaces are navigated.

In some embodiments, the change in the user interaction (e.g., first movement 716*a*, second movement 716*b*, third movement 716*d*, and/or fourth movement 716*d*) that corresponds to the ambiguous input-end event (e.g., a change in position of hand 704 and/or a change in position of fingers 704*a* and 704*b* relative to one another) includes a change in an acceleration of the user interaction (e.g., first movement 716*a*, second movement 716*b*, third movement 716*d*, and/or fourth movement 716*d*). (a change in direction of acceleration of the user interaction, such as a change in direction of acceleration of a portion of the first movement and/or a change in direction of acceleration of a portion of the second movement). The change in the user interaction that corresponds to the ambiguous input-end event including a change in acceleration of the user interaction improves an ability of the computer system to determine an ambiguous input-end event, which provides improved visual feedback, provides the user with a more seamless experience when interacting with virtual objects, improves how user interfaces are scrolled, and improves how user interfaces are navigated.

In some embodiments, the input element (e.g., 704, 704*a*, 704*b*, 705, 705*a*, and/or 705*b*) includes a first finger (e.g., 704*a*, 704*b*, 705*a*, and/or 705*b*) (e.g., a first physical finger, such as an index finger, and/or a physical thumb of a hand of a user of the computer system) and a second finger (e.g., 704*a*, 704*b*, 705*a*, and/or 705*b*) (e.g., a second physical finger, such as an index finger, and/or a physical thumb of a hand of a user of the computer system) and the change in the user interaction (e.g., first movement 716*a*, second movement 716*b*, third movement 716*d*, and/or fourth movement 716*d*) that corresponds to the ambiguous input-end event (e.g., a change in position of hand 704 and/or a change in position of fingers 704*a* and 704*b* relative to one another) includes a change in position of the first finger (e.g., 704*a*, 704*b*, 705*a*, and/or 705*b*) and the second finger relative (e.g.,

704a, 704b, 705a, and/or 705b) to one another (e.g., a change in distance between the first finger and the second finger or a change in whether the first finger and second finger are in contact with each other). The change in the user interaction that corresponds to the ambiguous input-end event including a change in position of a first finger and a second finger relative to one another improves an ability of the computer system to determine an ambiguous input-end event, which provides improved visual feedback, provides the user with a more seamless experience when interacting with virtual objects, improves how user interfaces are scrolled, and improves how user interfaces are navigated.

In some embodiments, the input element (e.g., 704, 704a, 704b, 705, 705a, and/or 705b) includes a hand (e.g., 704 and/or 705) (e.g., a physical hand of a user of the computer system) and the change in the user interaction (e.g., first movement 716a, second movement 716b, third movement 716d, and/or fourth movement 716d) that corresponds to the ambiguous input-end event (e.g., a change in position of hand 704 and/or a change in position of fingers 704a and 704b relative to one another) includes a change in a position of the hand (e.g., 704 and/or 705) (e.g., a detected and/or determined position of the hand of the user) indicating a potential input-end event (e.g., a change in position of hand 704 and/or a change in position of fingers 704a and 704b relative to one another) caused by a break in contact of two or more fingers (e.g., 704a, 704b, 705a, and/or 705b) of the hand (e.g., 704 and/or 705) (e.g., the position of the hand indicates that contact between two or more fingers of the hand has been broken and/or a distance between the two or more fingers of the hand has increased). The change in the user interaction that corresponds to the ambiguous input-end event including a change in a position of a hand indicating a potential input-end event caused by a break in contact of two or more fingers of the hand improves an ability of the computer system to determine an ambiguous input-end event, which provides improved visual feedback, provides the user with a more seamless experience when interacting with virtual objects, improves how user interfaces are scrolled, and improves how user interfaces are navigated.

In some embodiments, the user interaction (e.g., first movement 716a, second movement 716b, third movement 716d, and/or fourth movement 716d) with the virtual object (e.g., 710 and/or 712) includes moving the virtual object (e.g., 710 and/or 712) (e.g., laterally moving the virtual object, rotationally moving the virtual object, and/or moving the virtual object from a first position to a second position of the display generation component). The user interaction with the virtual object including moving the virtual object provides improved visual feedback, provides the user with a more seamless experience when interacting with virtual objects, improves how user interfaces are scrolled, and improves how user interfaces are navigated.

In some embodiments, the user interaction (e.g., first movement 716a, second movement 716b, third movement 716d, and/or fourth movement 716d) with the virtual object (e.g., 710 and/or 712) includes scrolling the virtual object (e.g., 710 and/or 712) (e.g., the virtual object includes content and the content scrolls based on the user interaction) (e.g., translating the virtual object such that a first portion of the virtual object is displayed prior to detecting the user interaction and a second portion of the virtual object, different from the first portion of the virtual object, is displayed after detecting the user interaction) (in some embodiments, scrolling the virtual object does not include drawing, such as using the virtual object, a cursor, and/or another displayed element to create a drawing based on the movement of the input element). The user interaction with the virtual object including scrolling the virtual object provides improved visual feedback, provides the user with a more seamless experience when interacting with virtual objects, improves how user interfaces are scrolled, and improves how user interfaces are navigated.

In some embodiments, the user interaction (e.g., first movement 716a, second movement 716b, third movement 716d, and/or fourth movement 716d) with the virtual object (e.g., 710 and/or 712) includes drawing (e.g., using the virtual object, a cursor, and/or another displayed element to create a drawing based on the movement of the input element). The user interaction with the virtual object including drawing provides improved visual feedback, provides the user with a more seamless experience when interacting with virtual objects, improves how user interfaces are scrolled, and improves how user interfaces are navigated.

In some embodiments, the computer system (e.g., 700) detects third user interaction (e.g., movement of hand 704 and movement of hand 705, as shown at FIGS. 7M-7O) with the virtual object (e.g., 710 and/or 712) (e.g., one or more user inputs (e.g., gestures, air gestures, gaze gestures, pinch gestures, gaze and pinch gestures, touch inputs, touch and hold inputs, swipes, drags, pinches, and/or flicks) that are directed to and/or determined to be directed to a virtual object, such that the computer system performs one or more operations based on the one or more user inputs, such as moving, scrolling, swiping, translating, dragging, and/or selecting the virtual object) (in some embodiments, the third user interaction includes movement of multiple input elements, such as two or more body parts of the user, two or more arms of the user, and/or two or more hands of the user), wherein the third user interaction (e.g., movement of hand 704 and movement of hand 705, as shown at FIGS. 7M-7O) includes: the first movement (e.g., 716a, 716b, 716c, and/or 716d) of the input element (e.g., 704, 704a, and/or 704b); the second movement (e.g., 716a, 716b, 716c, 716d, and/or movement of hand 704 after time 750c) of the input element (e.g., 704, 704a, and/or 704b); and fourth movement (e.g., movement of hand 705 shown at FIGS. 7M-7O) of a second input element (e.g., 705, 705a, and/or 705b) (e.g., the input element includes a first hand and/or first arm of the user and the second input element includes a second hand and/or second arm of the user), different from the input element (e.g., 704, 704a, and/or 704b). In response to detecting the third user interaction (e.g., movement of hand 704 and movement of hand 705, as shown at FIGS. 7M-7O) and in accordance with a determination that a change in a portion of the third user interaction (e.g., movement of hand 704 and movement of hand 705, as shown at FIGS. 7M-7O) that corresponds to an ambiguous input-end event (e.g., a change in position of hand 704, a change in position of fingers 704a and 704b relative to one another, a change in position of hand 705, and/or a change in position of fingers 705a and 705b relative to one another) was detected prior to detecting the second movement (e.g., 716a, 716b, 716c, 716d, and/or movement of hand 704 after time 750c) of the input element (e.g., 704, 704a, and/or 704b), the computer system (e.g., 700) forgoes updating the appearance of the virtual object (e.g., 710 and/or 712) with the first appearance update (e.g., causing movement of content 710 based on the fourth exponential decay, as indicated by fourth break velocity representation 750h) (e.g., ignoring the ambiguous input-end event) (in some embodiments, the computer system updates the appearance of the virtual object with the second appearance update in accordance with the determination that the change in the portion of the third user interaction corresponds to the ambiguous input-end event) (in some embodiments, the computer system ignores ambiguous input-end events when the user interaction is determined to include more than one input element, such as detection of user interaction that includes both hands of a user). Forgoing updating the appearance of the virtual object with the first appearance update when a change in a portion of the third user interaction that corresponds to an ambiguous input-end event was detected prior to detecting the second movement of the input element provides improved visual feedback, provides the user with a more seamless experience when interacting with virtual objects, improves how user interfaces are scrolled, and improves how user interfaces are navigated.

In some embodiments, after updating the appearance of the virtual object (e.g., 710 and/or 712) with the first appearance update (e.g., causing movement of content 710 based on the fourth exponential decay, as indicated by fourth break velocity representation 750h), the computer system (e.g., 700) fifth movement (e.g., movement of hand 704 and/or movement of hand 705 after time 750c) of the input element (e.g., 704, 704a, 704b, 705, 705a, and/or 705b) (e.g., physical movement) (in some embodiments, the fifth movement of the input element is part of the user interaction and/or the second movement of the input element) (in some embodiments, the fifth movement occurs after or later in time than the first movement and/or the first movement, the second movement, and the fifth movement are included in the same trajectory of movement of the input element). In response to detecting the fifth movement (e.g., movement of hand 704 and/or movement of hand 705 after time 750c) of the input element (e.g., 704, 704a, 704b, 705, 705a, and/or 705b) and in accordance with a determination that the ambiguous input-end event (e.g., a change in position of hand 704 and/or a change in position of fingers 704a and 704b relative to one another) was not an actual input-end event (e.g., the computer system detects that an end of the input and/or user interaction did not actually occur, such as a break in contact between two or more body parts of the user of the computer system did not occur), the computer system (e.g., 700) updates the appearance of the virtual object (e.g., 710 and/or 712) with a fourth appearance update (e.g., causing movement of content 710 based on movement of hand 704 and/or movement of hand 705) (e.g., an amount, direction, speed, and/or acceleration of movement of the virtual object), wherein the fourth appearance update (e.g., causing movement of content 710 based on movement of hand 704 and/or movement of hand 705) is based on the fifth movement (e.g., movement of hand 704 and/or movement of hand 705 after time 750c) of the input element (e.g., 704, 704a, 704b, 705, 705a, and/or 705b), and wherein the fourth appearance update (e.g., causing movement of content 710 based on movement of hand 704 and/or movement of hand 705) is different from the first appearance update (e.g., causing movement of content 710 based on the fourth exponential decay, as indicated by fourth break velocity representation 750h) (in some embodiments, the fourth appearance update includes causing movement of the virtual object in a manner that would have occurred if the ambiguous input-end event was not detected). Updating the appearance of the virtual object with a fourth appearance update when the ambiguous input-end event was not an actual input-end event provides improved visual feedback, provides the user with a more seamless experience when interacting with virtual objects, improves how user interfaces are scrolled, and improves how user interfaces are navigated.

In some embodiments, updating the appearance of the virtual object (e.g., 710 and/or 712) with the fourth appearance update (e.g., causing movement of content 710 based on movement of hand 704 and/or movement of hand 705) includes re-establishing the user interaction (e.g., first movement 716a, second movement 716b, third movement 716d, and/or fourth movement 716d) with the virtual object (e.g., 710 and/or 712) (e.g., the user interaction is temporarily paused and/or stopped based on the detection of the ambiguous input-end event and the fourth appearance update causes the user interaction to resume from a point where the user interaction was temporarily paused). Re-establishing the user interaction with the virtual object provides improved visual feedback, provides the user with a more seamless experience when interacting with virtual objects, improves how user interfaces are scrolled, and improves how user interfaces are navigated.

In some embodiments, in accordance with a determination that the ambiguous input-end event (e.g., a change in position of hand 704 and/or a change in position of fingers 704a and 704b relative to one another) was an actual input-end event (e.g., a position of fingers 704a and 704b shown at FIGS. 7C and 7D) (e.g., the computer system detects that an end of the input and/or user interaction did actually occur, such as a break in contact between two or more body parts of the user of the computer system did occur) (in some embodiments, the computer system determines that the ambiguous input-end event was an actual input-end event based on additional data from one or more sensors of the computer system that enable the computer system to determine that an input-end event occurred above a threshold confidence level), the computer system (e.g., 700) updates the appearance of the virtual object (e.g., 710 and/or 712) with a fifth appearance update (e.g., causing movement of content 710 based on the first exponential decay, as indicated by first break velocity representation 750d) (e.g., an amount, direction, speed, and/or acceleration of movement of the virtual object), wherein the fifth appearance update (e.g., causing movement of content 710 based on the first exponential decay, as indicated by first break velocity representation 750d) is based on the first movement (e.g., 716a, 716b, 716c, and/or 716d) of the input element (e.g., 704, 704a, 704b, 705, 705a, and/or 705b) (e.g., the first movement includes one or more portions of movement that include different velocities as the first movement occurs over time, and the fifth appearance update is based on at least one of the one or more portions of the movement). Updating the appearance of the virtual object with a fifth appearance update when the ambiguous input-end event was an actual input-end event provides improved visual feedback, provides the user with a more seamless experience when interacting with virtual objects, improves how user interfaces are scrolled, and improves how user interfaces are navigated.

In some embodiments, the fifth appearance update (e.g., causing movement of content 710 based on the first exponential decay, as indicated by first break velocity representation 750d) is the same as the first appearance update (e.g., causing movement of content 710 based on the fourth exponential decay, as indicated by fourth break velocity representation 750h) (e.g., the fifth appearance update includes an extrapolated, estimated, calculated, and/or determined amount of movement of the virtual object that is based on a velocity, such as a maximum velocity of the first movement, that causes the virtual object to move and/or appear to move with a simulated momentum that causes minimal disruption and/or inconvenience to the user while interacting with the virtual object). The fifth appearance update being the same as the first appearance update provides improved visual feedback, provides the user with a more seamless experience when interacting with virtual objects, improves how user interfaces are scrolled, and improves how user interfaces are navigated.

In some embodiments, the fifth appearance update (e.g., causing movement of content 710 based on the first exponential decay, as indicated by first break velocity representation 750*d*) is different from the first appearance update (e.g., causing movement of content 710 based on the fourth exponential decay, as indicated by fourth break velocity representation 750*h*) (e.g., the fifth appearance update includes a decay rate that is greater than or less than a decay rate of the first appearance update) (in some embodiments, the difference between the fifth appearance update and the first appearance update is based on at least a portion of the first movement of the input element). The fifth appearance update being different from the first appearance update provides improved visual feedback, provides the user with a more seamless experience when interacting with virtual objects, improves how user interfaces are scrolled, and improves how user interfaces are navigated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve interactions with virtual objects. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve interactions with virtual objects. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of interacting with virtual objects, the present technology can be configured to allow users to select to "opt in" or "opt out" of participation in the collection of personal information data during registration for services or anytime thereafter. In another example, users can select not to provide data for interacting with virtual objects. In yet another example, users can select to limit the length of time data is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, interactions with virtual objects based on non-personal information data or a bare minimum amount of personal information, such as the content being requested by the device associated with a user, other non-personal information available to the service, or publicly available information.

What is claimed is:

1. A computer system configured to communicate with one or more display generation components and one or more input devices, the computer system comprising:

one or more processors; and memory storing one or more programs configured to be executed by the one or more processors, the one or more programs including instructions for:

while detecting, via the one or more input devices, user interaction with a virtual object displayed via the one or more display generation components, wherein the user interaction includes first movement of an input element, detecting, via the one or more input devices, second movement of the input element, wherein the second movement of the input element is a continuation of the first movement of the input element; and in response to detecting the second movement of the input element:

in accordance with a determination that a change in the user interaction that corresponds to an ambiguous input-end event was detected prior to detecting the second movement of the input element, updating an appearance of the virtual object with a first appearance update, wherein the first appearance update is based on at least a portion of the first movement of the input element that occurred before the ambiguous input-end event was detected; and in accordance with a determination that the user interaction corresponding to the virtual object was continuous during the first movement of the input element and during the second movement of the input element, updating the appearance of the virtual object with a second appearance update that is based on at least a portion of the second movement of the input element, wherein the second appearance update is different from the first appearance update.

2. The computer system of claim 1, wherein updating the appearance of the virtual object with the first appearance update includes displaying, via the one or more display generation components, a first animation of the virtual object that changes over time.

3. The computer system of claim 2, wherein the first animation of the virtual object is based on simulated momentum.

4. The computer system of claim 3, wherein the simulated momentum starts at a time corresponding to a peak velocity of movement of the virtual object.

5. The computer system of claim 3, wherein the simulated momentum starts at a time corresponding to the ambiguous input-end event.

6. The computer system of claim 3, wherein the one or more programs further include instructions for:

adjusting the simulated momentum based on a change in the movement of the input element that occurred after detection of the ambiguous input-end event.

7. The computer system of claim 3, wherein the one or more programs further include instructions for:

in accordance with a determination that a direction of the second movement of the input element changes after detection of the ambiguous input-end event, adjusting the simulated momentum based on a change in the direction of the second movement of the input element that occurred after detection of the ambiguous input-end event.

8. The computer system of claim 1, wherein:

in accordance with a determination that the user interaction is a first type of user interaction, the first appearance update includes one or more first characteristics; and in accordance with a determination that the user interaction is a second type of user interaction, the first appearance update includes one or more second characteristics, different from the one or more first characteristics.

9. The computer system of claim 8, wherein:

the one or more first characteristics include simulated momentum having a first duration; and the one or more second characteristics include simulated momentum having a second duration, different from the first duration.

10. The computer system of claim 8, wherein:

the first type of user interaction includes a first gaze characteristic of a gaze of a user of the computer system; and the second type of user interaction includes a second gaze characteristic of the gaze of the user of the computer system, different from the first gaze characteristic.

11. The computer system of claim 8, wherein:

the first type of user interaction includes a first type of movement; and the second type of user interaction includes a second type of movement, different from the first type of movement.

12. The computer system of claim 11, wherein:

the first type of user interaction is based on movement of the input element that occurred prior to detecting the ambiguous input-end event; and the second type of the user interaction is based on movement of the input element that occurred prior to detecting the ambiguous input-end event.

13. The computer system of claim 11, wherein:

the first type of user interaction is based on movement of the input element that occurred after detecting the ambiguous input-end event; and the second type of the user interaction is based on movement of the input element that occurred after detecting the ambiguous input-end event.

14. The computer system of claim 8, wherein:

the first type of user interaction is based on one or more user interactions that occurred prior to the user interaction; and the second type of the user interaction is based on one or more user interactions that occurred prior to the user interaction.

15. The computer system of claim 1, wherein updating the appearance of the virtual object with the second appearance update includes displaying, via the display generation components, a second animation of the virtual object that changes over time.

16. The computer system of claim 15, wherein the second animation of the virtual object is based on respective movement the input element.

17. The computer system of claim 16, wherein:

the first appearance update includes movement of the virtual object having a first speed that is based on simulated momentum; and the respective movement of the input element includes a second speed that is greater than the first speed of the virtual object that is based on the simulated momentum.

18. The computer system of claim 16, wherein:

the first appearance update includes movement of the virtual object having a third speed that is based on simulated momentum; and the respective movement of the input element includes a fourth speed that is less than the third speed of the virtual object that is based on the simulated momentum.

19. The computer system of claim 1, wherein the one or more programs further include instructions for:

in accordance with a determination that a change in the user interaction that corresponds to a clear input-end event was detected prior to detecting the second movement of the input element, updating the appearance of the virtual object with a third appearance update, wherein the third appearance update is based on at least a portion of the first movement of the input element that occurred before the clear input-end event was detected, and wherein the third appearance update is different from the first appearance update and different from the second appearance update.

20. The computer system of claim 19, wherein updating the appearance of the virtual object with the third appearance update includes ceasing to move the virtual object.

21. The computer system of claim 19, wherein updating the appearance of the virtual object with the third appearance update includes displaying, via the one or more display generation components, a third animation of the virtual object that changes over time.

22. The computer system of claim 21, wherein the third animation of the virtual object is based on second simulated momentum.

23. The computer system of claim 22, wherein:

the first appearance update is based on third simulated momentum; and the second simulated momentum causes movement of the virtual object to cease more rapidly as compared to the third simulated momentum.

24. The computer system of claim 1, wherein updating the appearance of the virtual object with the first appearance update that is based on at least the portion of the first movement of the input element that occurred before the ambiguous input-end event was detected includes ignoring at least a portion of the second movement of the input element that occurred after the ambiguous input-end event.

25. The computer system of claim 24, wherein ignoring at least the portion of the second movement of the input element that occurred after the ambiguous input-end event includes ignoring a direction of at least the portion of the second movement of the input element that occurred after the ambiguous input-end event.

26. The computer system of claim 24, wherein ignoring at least the portion of the second movement of the input element that occurred after the ambiguous input-end event includes ignoring a magnitude of at least the portion of the second movement of the input element that occurred after the ambiguous input-end event.

27. The computer system of claim 1, wherein the change in the user interaction that corresponds to the ambiguous input-end event includes a change in a velocity of the user interaction.

28. The computer system of claim 1, wherein the change in the user interaction that corresponds to the ambiguous input-end event includes a change in an acceleration of the user interaction.

29. The computer system of claim 1, wherein:

the input element includes a first finger and a second finger; and the change in the user interaction that corresponds to the ambiguous input-end event includes a change in position of the first finger and the second finger relative to one another.

30. The computer system of claim 1, wherein:

the input element includes a hand; and the change in the user interaction that corresponds to the ambiguous input-end event includes a change in a position of the hand indicating a potential input-end event caused by a break in contact of two or more fingers of the hand.

31. The computer system of claim 1, wherein the user interaction with the virtual object includes moving the virtual object.

32. The computer system of claim 1, wherein the user interaction with the virtual object includes scrolling the virtual object.

33. The computer system of claim 1, wherein the user interaction with the virtual object includes drawing.

34. The computer system of claim 1, wherein the one or more programs further include instructions for:

detecting third user interaction with the virtual object, wherein the third user interaction includes:

the first movement of the input element;

the second movement of the input element; and fourth movement of a second input element, different from the input element; and in response to detecting the third user interaction:

in accordance with a determination that a change in a portion of the third user interaction that corresponds to an ambiguous input-end event was detected prior to detecting the second movement of the input element, forgoing updating the appearance of the virtual object with the first appearance update.

35. The computer system of claim 1, wherein the one or more programs further include instructions for:

after updating the appearance of the virtual object with the first appearance update, detecting fifth movement of the input element;

in response to detecting the fifth movement of the input element:

in accordance with a determination that the ambiguous input-end event was not an actual input-end event, updating the appearance of the virtual object with a fourth appearance update, wherein the fourth appearance update is based on the fifth movement of the input element, and wherein the fourth appearance update is different from the first appearance update.

36. The computer system of claim 35, wherein updating the appearance of the virtual object with the fourth appearance update includes re-establishing the user interaction with the virtual object.

37. The computer system of claim 35, wherein the one or more programs further include instructions for:

in accordance with a determination that the ambiguous input-end event was an actual input-end event, updating the appearance of the virtual object with a fifth appearance update, wherein the fifth appearance update is based on the first movement of the input element.

38. The computer system of claim 37, wherein the fifth appearance update is the same as the first appearance update.

39. The computer system of claim 37, wherein the fifth appearance update is different from the first appearance update.

40. A non-transitory computer-readable storage medium storing one or more programs configured to be executed by one or more processors of a computer system that is in communication with one or more display generation components and one or more input devices, the one or more programs including instructions for:

while detecting, via the one or more input devices, user interaction with a virtual object displayed via the one or more display generation components, wherein the user interaction includes first movement of an input element, detecting, via the one or more input devices, second movement of the input element, wherein the second movement of the input element is a continuation of the first movement of the input element; and in response to detecting the second movement of the input element:

in accordance with a determination that a change in the user interaction that corresponds to an ambiguous input-end event was detected prior to detecting the second movement of the input element, updating an appearance of the virtual object with a first appearance update, wherein the first appearance update is based on at least a portion of the first movement of the input element that occurred before the ambiguous input-end event was detected; and in accordance with a determination that the user interaction corresponding to the virtual object was continuous during the first movement of the input element and during the second movement of the input element, updating the appearance of the virtual object with a second appearance update that is based on at least a portion of the second movement of the input element, wherein the second appearance update is different from the first appearance update.

41. The non-transitory computer-readable storage medium of claim 40, wherein updating the appearance of the virtual object with the first appearance update includes displaying, via the one or more display generation components, a first animation of the virtual object that changes over time.

42. The non-transitory computer-readable storage medium of claim 41, wherein the first animation of the virtual object is based on simulated momentum.

43. The non-transitory computer-readable storage medium of claim 42, wherein the simulated momentum starts at a time corresponding to a peak velocity of movement of the virtual object.

44. The non-transitory computer-readable storage medium of claim 42, wherein the simulated momentum starts at a time corresponding to the ambiguous input-end event.

45. The non-transitory computer-readable storage medium of claim 42, wherein the one or more programs further include instructions for:

adjusting the simulated momentum based on a change in the movement of the input element that occurred after detection of the ambiguous input-end event.

46. The non-transitory computer-readable storage medium of claim 42, wherein the one or more programs further include instructions for:

in accordance with a determination that a direction of the second movement of the input element changes after detection of the ambiguous input-end event, adjusting the simulated momentum based on a change in the direction of the second movement of the input element that occurred after detection of the ambiguous input-end event.

47. The non-transitory computer-readable storage medium of claim 40, wherein the one or more programs further include instructions for:

in accordance with a determination that a change in the user interaction that corresponds to a clear input-end event was detected prior to detecting the second movement of the input element, updating the appearance of the virtual object with a third appearance update, wherein the third appearance update is based on at least a portion of the first movement of the input element that occurred before the clear input-end event was detected, and wherein the third appearance update is different from the first appearance update and different from the second appearance update.

48. The non-transitory computer-readable storage medium of claim 40, wherein updating the appearance of the virtual object with the first appearance update that is based on at least the portion of the first movement of the input element that occurred before the ambiguous input-end event was detected includes ignoring at least a portion of the second movement of the input element that occurred after the ambiguous input-end event.

49. The non-transitory computer-readable storage medium of claim 40, wherein the change in the user interaction that corresponds to the ambiguous input-end event includes a change in a velocity of the user interaction.

50. The non-transitory computer-readable storage medium of claim 40, wherein:

the input element includes a first finger and a second finger; and the change in the user interaction that corresponds to the ambiguous input-end event includes a change in position of the first finger and the second finger relative to one another.

51. The non-transitory computer-readable storage medium of claim 40, wherein:

the input element includes a hand; and the change in the user interaction that corresponds to the ambiguous input-end event includes a change in a position of the hand indicating a potential input-end event caused by a break in contact of two or more fingers of the hand.

52. The non-transitory computer-readable storage medium of claim 40, wherein the one or more programs further include instructions for:

detecting third user interaction with the virtual object, wherein the third user interaction includes:

the first movement of the input element;

the second movement of the input element; and fourth movement of a second input element, different from the input element; and in response to detecting the third user interaction:

in accordance with a determination that a change in a portion of the third user interaction that corresponds to an ambiguous input-end event was detected prior to detecting the second movement of the input element, forgoing updating the appearance of the virtual object with the first appearance update.

53. A method, comprising:

at a computer system that is in communication with one or more display generation components and one or more input devices:

while detecting, via the one or more input devices, user interaction with a virtual object displayed via the one or more display generation components, wherein the user interaction includes first movement of an input element, detecting, via the one or more input devices, second movement of the input element, wherein the second movement of the input element is a continuation of the first movement of the input element; and in response to detecting the second movement of the input element:

in accordance with a determination that a change in the user interaction that corresponds to an ambiguous input-end event was detected prior to detecting the second movement of the input element, updating an appearance of the virtual object with a first appearance update, wherein the first appearance update is based on at least a portion of the first movement of the input element that occurred before the ambiguous input-end event was detected; and in accordance with a determination that the user interaction corresponding to the virtual object was continuous during the first movement of the input element and during the second movement of the input element, updating the appearance of the virtual object with a second appearance update that is based on at least a portion of the second movement of the input element, wherein the second appearance update is different from the first appearance update.

54. The method of claim 53, wherein updating the appearance of the virtual object with the first appearance update includes displaying, via the one or more display generation components, a first animation of the virtual object that changes over time.

55. The method of claim 54, wherein the first animation of the virtual object is based on simulated momentum.

56. The method of claim 55, wherein the simulated momentum starts at a time corresponding to a peak velocity of movement of the virtual object.

57. The method of claim 55, wherein the simulated momentum starts at a time corresponding to the ambiguous input-end event.

58. The method of claim 55, further comprising:

adjusting the simulated momentum based on a change in the movement of the input element that occurred after detection of the ambiguous input-end event.

59. The method of claim 55, further comprising:

in accordance with a determination that a direction of the second movement of the input element changes after detection of the ambiguous input-end event, adjusting the simulated momentum based on a change in the direction of the second movement of the input element that occurred after detection of the ambiguous input-end event.

60. The method of claim 53, further comprising:

in accordance with a determination that a change in the user interaction that corresponds to a clear input-end event was detected prior to detecting the second movement of the input element, updating the appearance of the virtual object with a third appearance update, wherein the third appearance update is based on at least a portion of the first movement of the input element that occurred before the clear input-end event was detected, and wherein the third appearance update is different from the first appearance update and different from the second appearance update.

61. The method of claim 53, wherein updating the appearance of the virtual object with the first appearance update that is based on at least the portion of the first movement of the input element that occurred before the ambiguous input-end event was detected includes ignoring at least a portion of the second movement of the input element that occurred after the ambiguous input-end event.

62. The method of claim 53, wherein the change in the user interaction that corresponds to the ambiguous input-end event includes a change in a velocity of the user interaction.

63. The method of claim 53, wherein:

the input element includes a first finger and a second finger; and the change in the user interaction that corresponds to the ambiguous input-end event includes a change in position of the first finger and the second finger relative to one another.

64. The method of claim 53, wherein:

the input element includes a hand; and the change in the user interaction that corresponds to the ambiguous input-end event includes a change in a position of the hand indicating a potential input-end event caused by a break in contact of two or more fingers of the hand.

65. The method of claim 53, further comprising:

detecting third user interaction with the virtual object, wherein the third user interaction includes:

the first movement of the input element;

the second movement of the input element; and fourth movement of a second input element, different from the input element; and in response to detecting the third user interaction:

in accordance with a determination that a change in a portion of the third user interaction that corresponds to an ambiguous input-end event was detected prior to detecting the second movement of the input element, forgoing updating the appearance of the virtual object with the first appearance update.

* * * * *